US012790162B2

(12) United States Patent
Kruse et al.

(10) Patent No.: US 12,790,162 B2
(45) Date of Patent: Nov. 10, 2026

(54) REEL BASED CLOSURE SYSTEM

(71) Applicant: BOA Technology, Inc., Denver, CO (US)

(72) Inventors: Randon George Kruse, Denver, CO (US); Josef Duller, Louisville, CO (US); Charles Clay Corbett, Denver, CO (US); Ryan Vogt, Denver, CO (US)

(73) Assignee: Boa Technology, Inc., Denver, CO (US)

(*) Notice: Subject to any disclaimer, the term of this patent is extended or adjusted under 35 U.S.C. 154(b) by 97 days.

(21) Appl. No.: 18/425,784

(22) Filed: Jan. 29, 2024

(65) Prior Publication Data

US 2024/0286866 A1 Aug. 29, 2024

Related U.S. Application Data

(63) Continuation of application No. 17/965,564, filed on Oct. 13, 2022, now Pat. No. 11,919,740, which is a continuation of application No. 16/864,849, filed on May 1, 2020, now Pat. No. 11,492,228.

(60) Provisional application No. 62/841,535, filed on May 1, 2019.

(51) Int. Cl.
*B65H 75/30* (2006.01)
*A43C 11/16* (2006.01)
*F16G 11/12* (2006.01)

(52) U.S. Cl.
CPC ............ *B65H 75/30* (2013.01); *A43C 11/165* (2013.01); *F16G 11/12* (2013.01)

(58) Field of Classification Search
CPC ....... B65H 75/30; A43C 11/165; A43C 11/20; A43C 11/16; F16G 11/12; Y10T 24/2183; Y10T 24/2187; Y10T 24/3724
See application file for complete search history.

(56) References Cited

U.S. PATENT DOCUMENTS

| | | | | |
|---|---|---|---|---|
| 7,174,575 B1 * | 2/2007 | Scherer | .................. | A42B 3/145 2/418 |
| 7,565,704 B2 * | 7/2009 | Wu | ........................ | A42B 3/145 2/418 |
| 7,854,024 B2 * | 12/2010 | Fang | ...................... | A42B 3/145 2/418 |

(Continued)

FOREIGN PATENT DOCUMENTS

JP 2019503738 A 2/2019

*Primary Examiner* — Jack W Lavinder
(74) *Attorney, Agent, or Firm* — Kilpatrick Townsend & Stockton LLP; Clark F. Weight

(57) ABSTRACT

A reel based closure device includes a housing, a spool positioned within the interior region of the housing, a knob that is operably coupled with the spool and with the housing, and a rotation control component that is operably coupled with the knob. The knob is rotatable in a tightening direction to cause the spool to rotate within the housing and thereby wind the tension member about the spool. The knob is also rotatable in a loosening direction to cause the spool to rotate in an opposite direction within the housing and thereby unwind the tension member from about the spool. The rotation control component is configured to prevent accidental loosening of the tension member by inhibiting rotation of the knob in the loosening direction until a sufficient rotational force is exerted on the knob in the loosening direction.

18 Claims, 28 Drawing Sheets

(56) References Cited

U.S. PATENT DOCUMENTS

| | | | | |
|---|---|---|---|---|
| 8,359,672 | B2 | 1/2013 | Moelker | |
| 10,076,160 | B2 * | 9/2018 | Burns | A43C 7/00 |
| 12,104,675 | B1 * | 10/2024 | Xiang | A43C 1/00 |
| 2010/0139057 | A1 * | 6/2010 | Soderberg | B65H 75/4434<br>242/396.2 |
| 2013/0014359 | A1 * | 1/2013 | Chen | A42B 3/145<br>24/68 SK |
| 2013/0025100 | A1 | 1/2013 | Ha | |
| 2014/0259301 | A1 * | 9/2014 | Berns | A43C 9/00<br>2/336 |
| 2015/0121669 | A1 | 5/2015 | Jungkind | |
| 2015/0191326 | A1 * | 7/2015 | Hall | A43C 11/165<br>242/396.4 |
| 2017/0303643 | A1 * | 10/2017 | Converse | A43C 11/00 |
| 2019/0008236 | A1 * | 1/2019 | Ha | A43C 11/165 |
| 2020/0345107 | A1 | 11/2020 | Burt et al. | |

* cited by examiner

REEL BASED CLOSURE SYSTEM

CROSS-REFERENCE TO RELATED APPLICATIONS

This application is a continuation application of U.S. application Ser. No. 17/965,564 by Kruse et al., entitled "REEL BASED CLOSURE SYSTEM," filed Oct. 13, 2022, which is a continuation of U.S. application Ser. No. 16/864,849 by Kruse et al., entitled "REEL BASED CLOSURE SYSTEM," filed May 1, 2020, now issued U.S. Pat. No. 11,492,228, which claims priority to U.S. Provisional Application No. 62/841,535 by Kruse et al., entitled "REEL BASED CLOSURE SYSTEM," filed May 1, 2019, the entire disclosure of which is hereby incorporated by reference, for all purposes, as if fully set forth herein.

BACKGROUND

The present disclosure is related to reel based closure devices for various articles, such as braces, medical devices, shoes, clothing, apparel, and the like. Such articles typically include some closure system, which allows the article to be placed about a body part and closed or tightened about the body part. The closure systems are typically used to maintain or secure the article about the body part. For example, shoes are typically placed over an individual's foot and the shoelace is tensioned and tied to close and secure the shoe about the foot. Conventional closure systems have been modified in an effort to increase the fit and/or comfort of the article about the body part. For example, shoe lacing configurations and/or patterns have been modified in an attempt to increase the fit and/or comfort of wearing shoes. Conventional closure systems have also been modified in an effort to decrease the time in which an article may be closed and secured about the body part. These modifications have resulted in the use of various pull cords, straps, and tensioning devices that enable the article to be quickly closed and secured to the foot.

BRIEF DESCRIPTION

The embodiments described herein provide reel based closure devices that may be used to tension a lace or tension member and thereby tighten an article or other item, such as an article of footwear. According to one aspect, a reel based closure device for tightening an article includes a housing having an interior region and a spool that is positioned within the interior region of the housing. The spool is rotatable in a first direction within the interior region of the housing to wind a tension member about the spool and is also rotatable in a second direction within the interior region of the housing to unwind the tension member from about the spool. The reel based closure device also includes a knob that is operably coupled with the spool and with the housing. The knob is rotatable in a tightening direction to cause the spool to rotate in the first direction and thereby wind the tension member about the spool and the knob is rotatable in a loosening direction to cause the spool to rotate in the second direction and thereby unwind the tension member from about the spool. The reel based closure device further includes a rotation control component that is operably coupled with the knob and that is configured to prevent accidental loosening of the tension member by inhibiting rotation of the knob in the loosening direction until a sufficient rotational force is exerted on the knob in the loosening direction.

According to one aspect, a reel based closure device includes a housing having an interior region and a spool that is positioned within the interior region of the housing. The spool is rotatable in a first direction to wind a tension member about the spool and is also rotatable in a second direction to unwind the tension member from about the spool. The reel base closure device also includes a knob that is operably coupled with the spool so that the knob is rotatable in a tightening direction to cause the spool to rotate in the first direction and so that the knob is rotatable in a loosening direction to cause the spool to rotate in the second direction. The reel based closure device further includes a rotation control component that is operably coupled with the knob to impede rotation of the knob in the loosening direction until a sufficient rotational force is exerted on the knob.

According to another embodiment, a method of coupling a reel based closure device with an article includes providing a reel based closure device and coupling the reel based closure device with the article. The reel based closure device includes a housing having an interior region, a spool that is positioned within the interior region of the housing, a knob that is operably coupled with the spool and with the housing, and a rotation control component that is operably coupled with the knob. The knob is operably coupled with the spool so that a rotation of the knob in a tightening direction causes the spool to rotate in a first direction and thereby wind a tension member about the spool. The knob is also operably coupled with the spool so that a rotation of the knob in a loosening direction causes the spool to rotate in a second direction and thereby unwind the tension member from about the spool. The rotation control component is operably coupled with the knob to prevent accidental loosening of the tension member by inhibiting rotation of the knob in the loosening direction until a sufficient rotational force is exerted on the knob in the loosening direction.

According to another aspect, a reel based closure device for tightening an article includes a housing having an interior region and a spool that is positioned within the interior region of the housing. The spool is rotatable in a first direction within the interior region to wind a tension member about the spool and is rotatable in a second direction within the interior region to unwind the tension member from about the spool. The reel based closure device also includes a knob that is operably coupled with the spool and with the housing. The knob is operable to cause the spool to rotate in the first direction within the interior region of the housing and thereby wind the tension member about the spool. The reel based closure device further includes a seat component that is releasably coupled with a bottom end of the housing. The seat component includes a spool engagement feature that is configured to engage a bottom end of the spool as a tension in the tension member decreases. Engagement of the bottom end of the spool and the spool engagement feature prevents rotation of the spool in the second direction.

According to another aspect, a method of coupling a reel based closure device with an article includes providing a reel based closure device and coupling the reel based closure device with the article. The reel based closure device includes a housing having an interior region, a spool that is positioned within the interior region of the housing, a knob that is operably coupled with the spool and with the housing, and a seat component that is releasably coupled with a bottom end of the housing. The knob is operable to cause the spool to rotate in a first direction within the interior region of the housing and thereby wind a tension member about the spool. The seat component includes a spool engagement feature that is configured to engage a bottom end of the spool as a tension in the tension member decreases. Engagement of the bottom end of the spool and the spool engagement feature prevents rotation of the spool in a second direction in which the tension member is unwound from about the spool.

According to another embodiment, a reel based closure device for tightening an article includes a housing having an interior region and a spool that is positioned within the interior region of the housing. The spool is rotatable in a first direction within the interior region to wind a tension member about the spool and is rotatable in a second direction within the interior region to unwind the tension member from about the spool. The reel based closure device also includes a knob that is operably coupled with the spool. The knob is operable to cause the spool to rotate in the first direction within the interior region of the housing and thereby wind the tension member about the spool. The reel based closure device further includes a biasing component that is positioned within the interior region of the housing and that is operably engaged with the spool to allow the spool to move axially within the interior region of the housing. The biasing component is configured to bias the spool axially into operably engagement with the knob.

According to another aspect, a method of coupling a reel based closure device with an article includes providing a reel based closure device and coupling the reel based closure device with the article. The reel based closure device includes a housing having an interior region, a spool positioned within the interior region of the housing, a knob that is operably coupled with the spool, and a biasing component that is positioned within the interior region of the housing. The knob is operable to cause the spool to rotate within the interior region of the housing and thereby wind a tension member about the spool and the biasing component is operably engaged with the spool to allow the spool to move axially within the interior region of the housing. The biasing component is configured to bias the spool axially into operable engagement with the knob.

According to another aspect, a reel based closure system for tightening an article includes a housing having an interior region and a plurality of housing teeth. The reel based closure system also includes a tension member, a spool that is rotatably positioned within the interior region of the housing, and a knob. The spool includes a plurality of spool teeth. The reel based closure system further includes a clutch mechanism that is positioned axially above the spool and that is configured to operably couple the spool and the knob. The clutch mechanism includes a plurality of clutch teeth that are configured to operably engage the spool teeth and a plurality of disc teeth that are configured to engage the housing teeth to prevent rotation of the spool in a second direction. The reel based closure system additionally includes a coupling component that engages the clutch mechanism to maintain the clutch mechanism in a first position and a second position. In the first position, the clutch mechanism is operably coupled with the spool such that 1) a rotation of the knob in a first direction causes the spool to rotate in the first direction within the interior region of the housing to wind the tension member about the spool and 2) a rotation of the knob in a second direction causes the spool to rotate in the second direction within the interior region of the housing and thereby incrementally unwind the tension member from about the spool. In the second position, the clutch mechanism is uncoupled from the spool to allow the spool to freely rotate within the interior region of the housing in the second direction to unwind the tension member from about the spool.

According to another aspect, a tension member guide is described herein. The tension member guide is coupleable with footwear and is configured to direct or route a tension member about a path of the footwear. The tension member guide includes a first material having a longitudinal length; and a lateral width. The first material is folded along its longitudinal length to form a loop or channel within which the tension member is insertable. The loop or channel defines, or has, an inner surface adjacent which the tension member is positioned when the tension member is inserted through the loop or channel. The loop or channel also defines, or has, an outer surface that is opposite the inner surface. The tension member guide also includes a second material having a longitudinal length and a lateral width. The lateral width of the second material is less, or shorter, than the lateral width of the first material. The second material is formed of a lower friction material than the first material and the second material is coupled with the first material so that the second material is longitudinally aligned with the first material and so that the second material is positioned on the inner surface of the loop or channel so as to be in direct contact with the tension member when the tension member is inserted through the loop or channel.

According to another aspect, a tension member guide includes a first material and a second material. The first material has a longitudinal length and a lateral width. The first material is folded along its longitudinal length to form a loop or channel within which a tension member is insertable. The second material also has a longitudinal length and a lateral width, in which the lateral width of the second material is less than, or shorter than, the lateral width of the first material. The second material is formed of a lower friction material than the first material and the second material is coupled with the first material so that the second material is positioned on an inner surface of the loop or channel in order to be in direct contact with the tension member when the tension member is inserted within the loop or channel.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide reel based closure devices (hereinafter closure system or reel based device/system) that may be used to tension a lace or tension member and thereby tighten an article or other item. The article may be a variety of items including a pack (i.e., back pack, book bag, etc.), an article of clothing (i.e., hats, gloves, belt, etc.), sports apparel (boots, snowboard boots, ski boots, etc.), medical braces (i.e., back braces, knee braces, wrist brace, ankle brace, etc.), and various other items or apparel. A specific embodiment in which the closure system may be employed involves footwear, such as shoes, boots, sandals, etc.

Figure 1A:
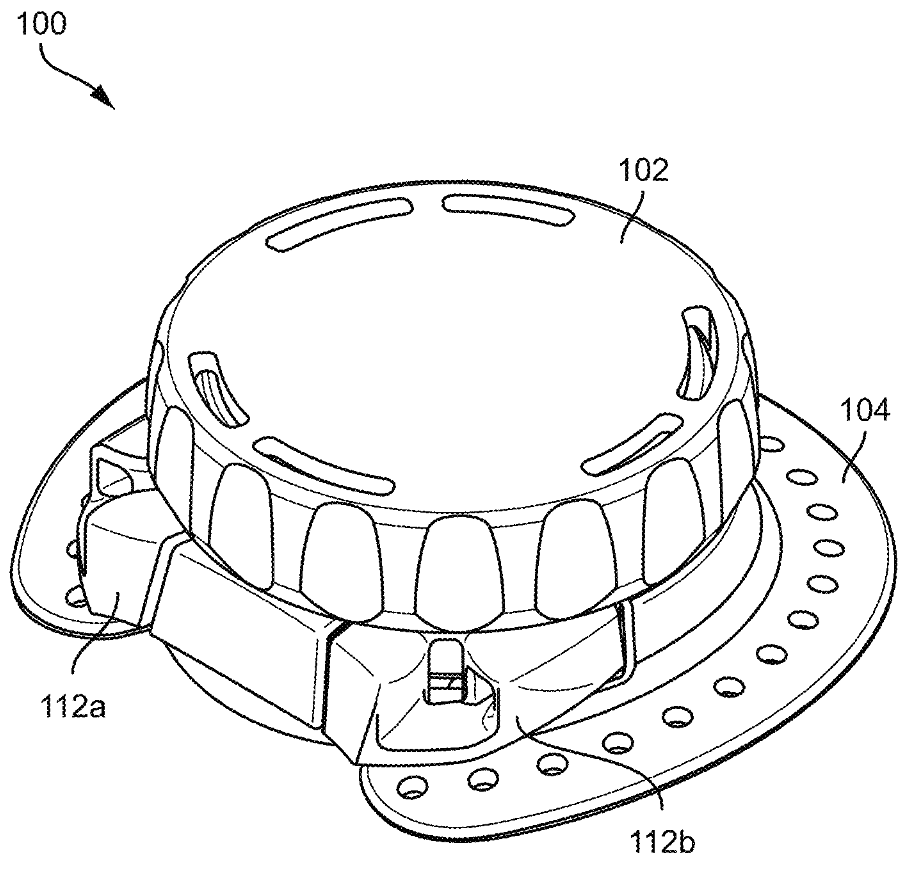
FIGS. 1A-M illustrate an embodiment of a reel based closure device that may be used to tighten an article.
Figure 1B:
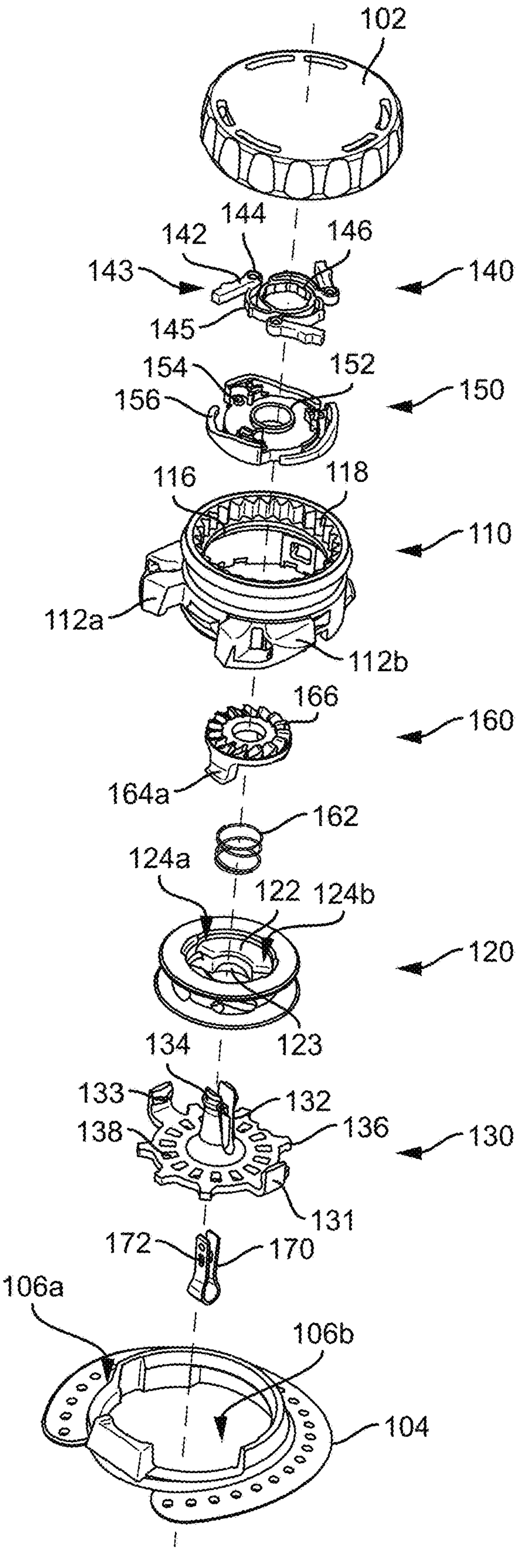
Figure 1C:
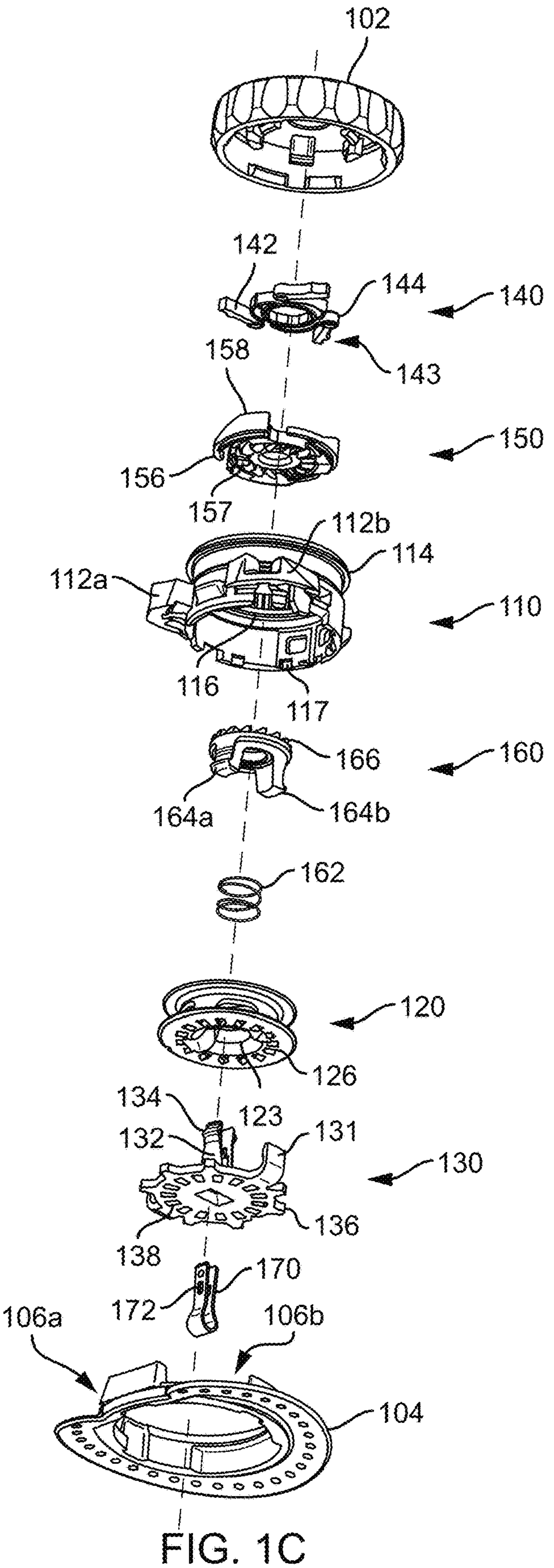

Referring to FIGS. 1A-M, illustrated is another embodiment of a reel based closure device 100 that may be used to tighten an article, such as a shoe, boot, or other article of footwear. The reel based closure device 100 may also be used to tighten other non-footwear articles, such as backpacks, helmets, jackets, etc. The reel based closure device 100 may be used to tighten essentially anything that is closed and/or tightened via a tension member, cord, lace, rope, and the like. FIG. 1A illustrates an assembled view of the reel based closure device 100 while FIGS. 1B and 1C illustrated exploded perspective views of the reel based closure device 100. The various internal components are illustrated in the exploded perspective views of FIGS. 1B and 1C.

The reel based closure device 100 includes a housing 110 that has an interior region within which various components of the reel based closure device 100 are positioned. For example, a spool 120 is positioned within the interior region of the housing 110. The spool 120 is rotatable within the interior region of the housing in a first direction to wind a tension member (not shown) about the spool and is also rotatable in a second direction within the interior region of the housing 110 to unwind the tension member from about the spool 120. The spool 120 typically includes an annular channel about with the tension member is wound and unwound. A knob 102 is operably coupled with the spool 120 and with the housing 110. The knob 102 is user rotatable in a tightening direction to cause the spool 120 to rotate in the first direction and thereby wind the tension member about the spool 120. The knob is also rotatable in a loosening direction to cause the spool 120 to rotate in the second direction and thereby unwind the tension member from about the spool 120. The tightening direction typically is the same rotational direction as the first direction (e.g., clockwise), but in some instances, the tightening direction may be an opposite direction of the first direction. Likewise, the loosening direction is typically the same rotational direction as the second direction (e.g., counterclockwise), but in some instances, the loosening direction may be opposite of the second direction. For convenience in describing the reel based closure device 100, the spool 120 will hereinafter be described as being rotatable in the tightening direction to wind the tension member and as being rotatable in the loosening direction to unwind the tension member. Other components of the reel based closure device 100 include the pawl disc 140, the knob core 150, and the seat component 130.

The housing 110 is positionable within a base member 104 or bayonet (hereinafter base member 104) that is attachable to the article. Specifically, as illustrated in FIG. 1G, the housing 110 includes a pair of radially outward extending tabs that snap together couple with a pair of radially inward extending lips of the base member 104. The coupling of the housing's tabs and the base member's lips attach or couple the housing 110 to the base member. The coupling of one of the housing's tabs and one of the base member's lips is illustrated at 190 of FIG. 1G. The other coupling of the housing's tabs and the base member's lips is illustrated at 192 of FIG. 1G. As illustrated, the housing's tabs are positioned near the bottom end of the housing 110 and on opposing sides of the housing. Likewise, the base member's lips are positioned on opposing sides of the base member and near an upper end of the base member. The material of the housing 110 and base member 104 is semi-resilient, which allows the tabs and lips to be snap together coupled.

When the housing 110 is coupled with the base member 104, a pair of lace ports, 112*a* and 112*b*, of the housing 110 are positioned within corresponding openings or windows, 106*a* and 106*b*, of the base member 104. Positioning of the lace ports, 112*a* and 112*b*, within the openings, 106*a* and 106*b*, of the base member 104 allows the reel based closure device 100 to have a more seamless appearance. The lace ports, 112*a* and 112*b*, provide interior access to the tension member, which allows the tension member to access the spool so that the tension member is windable and unwindable about the spool. The housing 110 also includes an inner annular ridge 116 that encircles the interior region of the housing 110 and partitions the interior region into an upper portion and a lower portion. In some embodiments, the inner annular ridge 116 functions to prevent the components that are positioned in the lower portion from moving into the upper portion of the housing and to prevent the components that are position in the upper portion from moving into the lower portion of the housing.

The housing 110 further includes depressions or teeth 118 that are configured to engage with one or more teeth of the pawl disc 140. The teeth 118 may be formed on the inner surface of the housing 110 so that the teeth 118 are radially inward facing as illustrated in FIGS. 1B and 1C. In other instances, the teeth 118 may be formed on an upper surface of the housing 110 so that the teeth 118 are axially upward facing (not shown). In yet other instances, the teeth 118 may be formed on a separate component (not shown) that is coupleable with the housing 110. The teeth 118 may face axially or radially on the separate component as desired or required by a given operation of the device. The teeth 118 may have a triangular shaped configuration as in FIGS. 1B and 1C or may be formed of voids or apertures similar to the teeth 138 of the bottom or seat component 130 (hereinafter seat component 130).

The housing 110 includes a coupling component that is configured to snap fit couple with the knob 102. In one instance, the housing's coupling component is an annular ridge or ring 524 that extends partially or fully around the upper surface of the housing 110. The knob 102 includes one or more radially inward protruding tabs 103 that are configured to snap over the housing's annular ridge 114 in order to attach the knob 102 to the housing 110. The annular ridge 114 has a diameter that is larger than an inner diameter that is defined by the one or more radially inward protruding tabs 103. As such, when the knob 102 is axially aligned with the housing 110 and the knob 102 is pressed axially downward about the housing 110, the knob 102 is forced to flex or slightly bend radially outward, which enables the knob 102 to be moved axially downward relative to the housing 110 and allows the radially inward protruding tabs 103 to be positioned under the annular ridge 114 as illustrated in FIGS. 1G-I. A top end of the annular ridge 114 and a bottom end of the one or more radially inward protruding tabs 103 is chamfered or angled, which aids in snap fit coupling the knob 102 and housing 110 as described herein. The larger diameter annular ridge 114 prevents the knob 102 from uncoupling or detaching from the housing 110. The snap fit coupling of the knob 102 and housing 110 allows the reel based closure device 100 to be coupled without requiring the use of a bolt, screw, rivet, or other similar mechanical fastener. Additional details of the coupling of the knob 102 and housing 110 are provided in U.S. patent application Ser. No. 14/991,788, filed Jan. 8, 2016, entitled “Integrated Closure Device Components and Methods,” the entire disclosure of which is incorporated by reference herein.

The reel based closure device 100 also includes a seat component 130 that is positioned axially below the spool 120 and that is releasably coupled with a bottom end of the housing 110. The seat component 130 typically includes a circular base and a central boss or protrusion 132 that protrudes axially upward from the circular base into the interior region of the housing 110 when the seat component 130 is coupled with the bottom end of the housing 110. The circular base functions as the bottom surface of the housing 110 when the seat component 130 is attached to the housing 110. The circular base matches an opening in the bottom end of the housing 110 so that when the seat component 130 is coupled with the housing 110, the bottom end of the housing 110 is fully covered and enclosed by the circular base. The central boss 132 is configured to be inserted through an aperture of the spool 120, and more specifically through a central aperture of the spool’s inner member 160. The central boss 132 is also axially insertable through a central aperture 152 of the knob core 150. As described herein, the central boss 132 and the knob core 150 operably engage to allow the reel based closure device 100 to be moved between an engaged state and a disengaged state.

The spool 120 is rotationally positioned about the seat component 130 by inserting the central boss 132 through the spool’s central aperture. The spool 120 is able to spin or rotation about the central boss 132 with negligible friction. The seat component 130 includes a plurality of radially extending fingers 136 that are configured for positioning in corresponding recesses 117 on the bottom end of the housing 110. Insertion of the radially extending fingers 136 within the recesses 117 keys the seat component 130 into the housing 110 and thereby rotationally locks the seat component 130 relative to the housing 110 by preventing relative rotation of the two components. The seat component 130 also includes a pair of coupling arms 131 that are positioned on opposing sides of the seat component 130 and that couple the seat component 130 with the housing 110. The coupling arms 131 extend radially from the seat component 130 and releasably engage the bottom end of the housing 110 in order to releasably couple the seat component 130 with the bottom end of the housing 110. The coupling arms 131 include an upward turned lip that is configured to flex, bend, or curve around or over a bottom edge of the housing 110 to secure the seat component 130 to the bottom end of the housing 110. The bottom end of the housing 110 includes a pair of small channels within which the coupling arms 131 are positioned so that when the seat component 130 is coupled with the housing 110, a bottom surface of the seat component 130 is aligned with a bottom surface of the housing 110.

Each upward turned lip includes a radially inward facing protrusion 133 that is designed for positioning within a small recess on the exterior of the housing 110. Positioning of each protrusion 133 within the corresponding recess secures the seat component 130 to the housing 110. The seat component 130 may be detached from the housing 110 by flexing or bending the upward turned lip radially outward so that the protrusion 133 is removed from the housing’s recess. An axial downward force may simultaneously be applied to the seat component 130 to cause the seat component 130 to move axially downward relative to the housing 110.

Figure 1D:
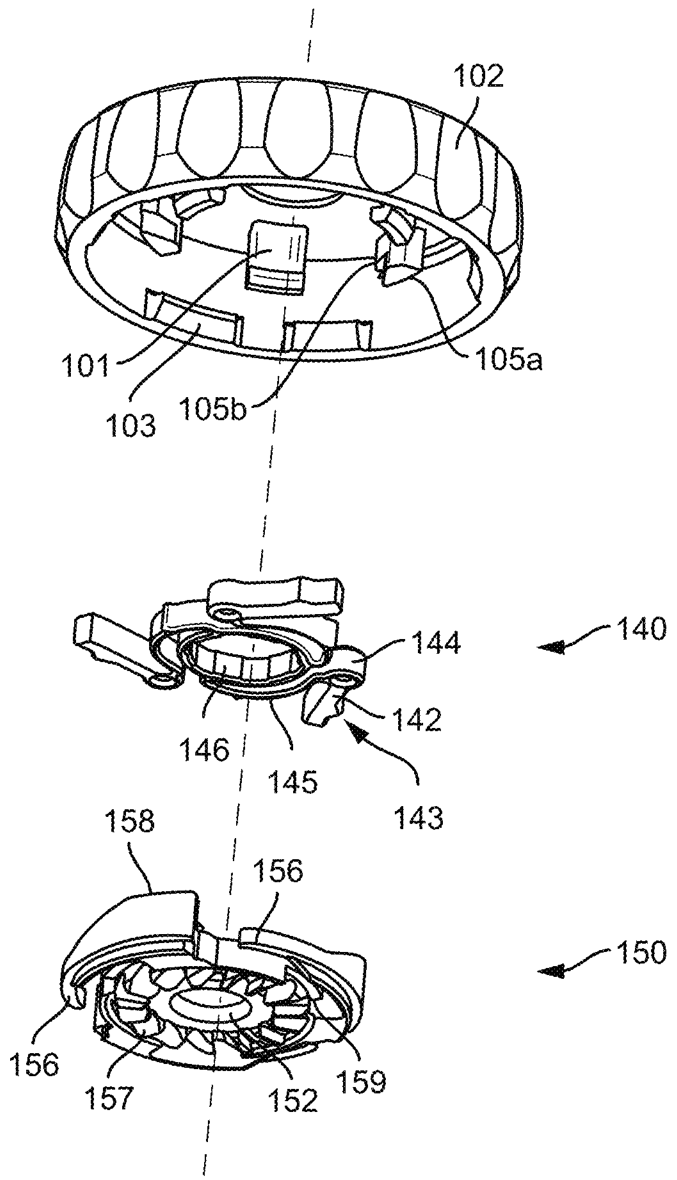
Figure 1E:
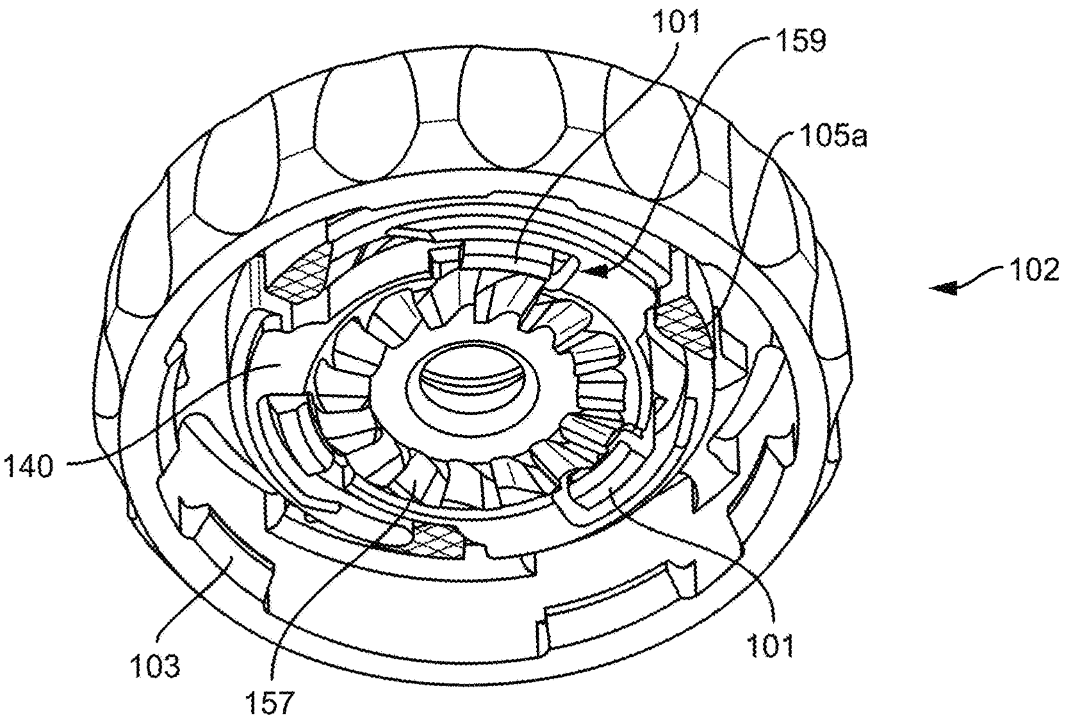
Figure 1F:
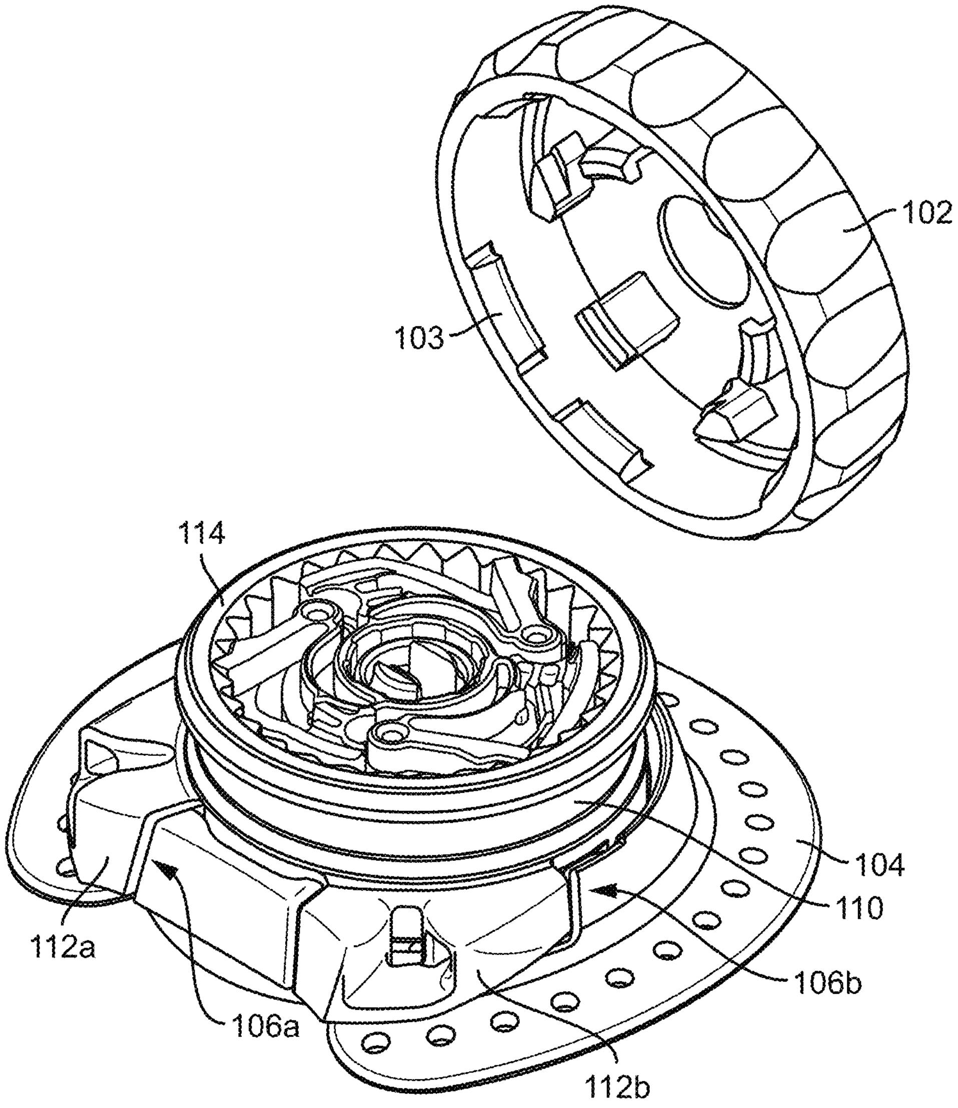
Figure 1G:
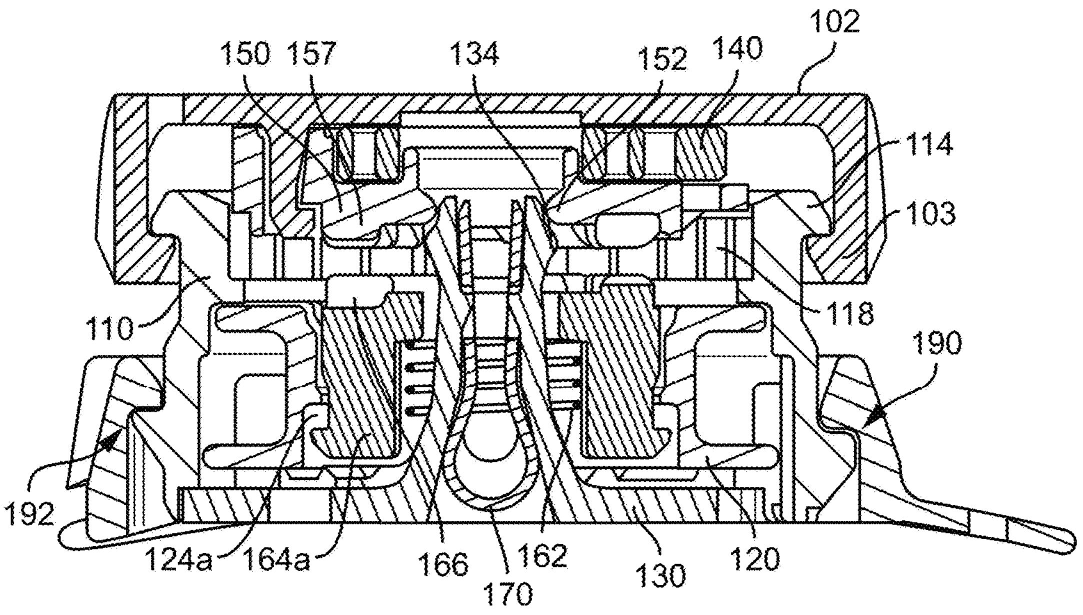
Figure 1H:
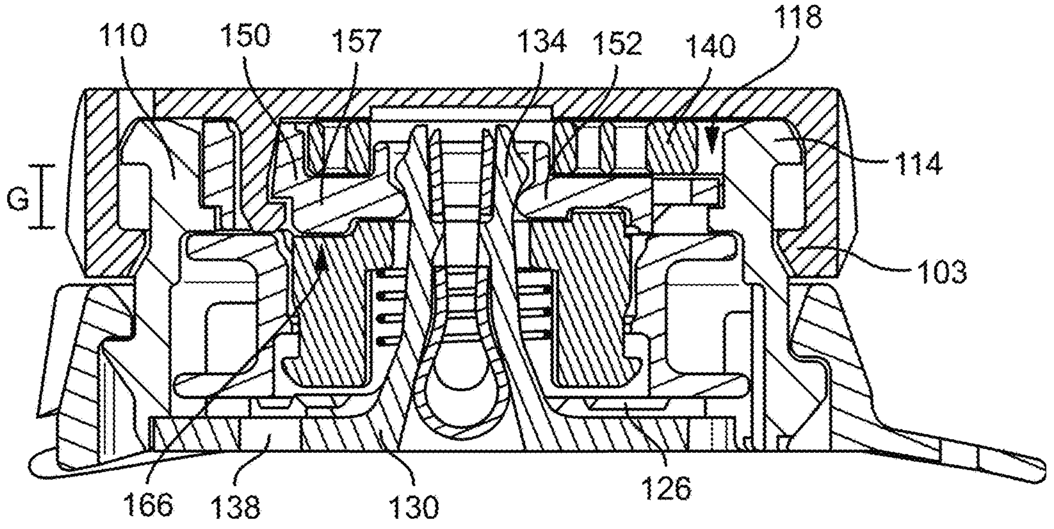
Figure 1I:
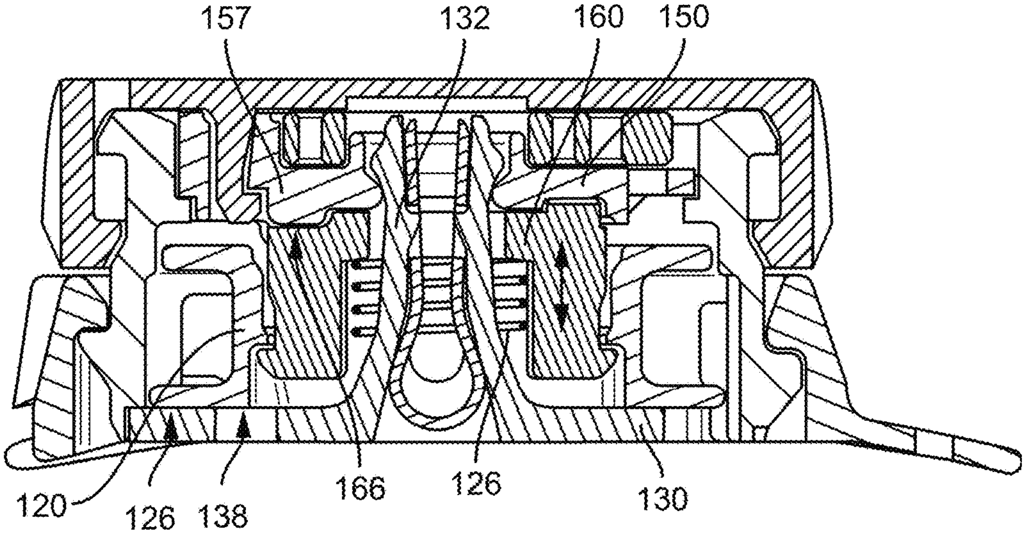

FIGS. 1D and 1E illustrate how the knob 102, pawl disc 140, and knob core 150 are coupled together. In coupling these components together, the pawl disc 140 is typically first inserted or positioned within the knob core 150. The upper surface of the knob core 150 is designed to accommodate and support the pawl disc 140. For example, the knob core 150 includes pivot bosses 154 that are designed to couple with a pivot end 144 of the pawl disc’s pawl arms 145. The pawl disc 140 typically includes a plurality of pawl arms 145 that are attached to a central base 146 of the pawl disc 140. The central base 146 in the illustrated embodiment is an annular ring that is configured to fit around the central aperture 152 of the knob core 150 when the two components are coupled together. In the illustrated embodiment, the pawl disc 140 includes three pawl arms 145, although in other embodiments the pawl disc 140 may include a single pawl arm, two pawl arms, four pawl arms, and the like.

Each pawl arm 145 is fixedly attached to the central base 146 at a proximal end and each pawl arm 145 extends from the central base 146 to the pivot end 144. A finger or pawl 142 extends from the pivot end 144 in a direction that is opposite of the pawl arm 145. The pawl 142 includes one or more teeth 143 that are positioned on the distal end of the pawl 142. As described in greater detail herein, the one or more pawls 142 are configured to engage the teeth 118 of the housing 110 in a ratchet like manner in order to allow a one way rotational movement of the pawl disc 140 and knob core 150 relative to the housing 110. Engagement of the pawls 142 with the teeth 118 lock the pawl disc 140 and knob core 150 in rotational position relative to the knob 102 and housing 110. Engagement of the pawls 142 with the teeth 118 also locks the spool 120 in rotational position relative to the housing 110 due to engagement of the spool’ teeth 166 and the knob core’s teeth 157. Each pawl arm 145 functions as a spring member that biases the respective pawl 142 radially outward and into engagement with one or more teeth of the teeth 118.

The pivot end 144 of the pawl arm 145 includes a small aperture within which a pivot boss 154 of the knob core 150 is inserted. The pivot end 144 of the pawl arms 145 pivots around the pivot boss 154 when the pawl 142 is deflected into and out of engagement with the teeth 118 as described herein below. The knob core 150 includes a support wall that is positioned immediately adjacent the pivot bosses 154. The support wall is shaped and sized to correspond to the pivot end 144 of the pawl arm 145. For example, the support wall is semi-circular and has a radius that corresponds to a radius of the pivot end 144 of the pawl arm 145. The pivot end 144 of the pawl arm 145 contacts the support wall when a sufficient load is exerted on the pawl 142. In this manner, the knob core 150 supports and reinforces the pawl disc 140 when the pawl disc is bearing or holding a load.

When the pawl disc 140 is positioned within the knob core 150, the distal end of the pawls 142 extend radially outward from out outer circumference or perimeter of the knob core 150. For example, the knob core 150 includes one or more arms 156 that extend circumferentially from a main body of the knob core 150. A proximal end of the arms 156 is fixedly secured to the main body adjacent the support wall and a distal end of the arms 156 extends circumferentially from the main body in a cantilevered manner. The distal end of the arm 156 is detached from the main body in order to allow the distal end of the arm 156 to engage with the knob and function as a rotation control component to ensure that a sufficient rotational force is exerted on the knob 102 in the loosening direction before the pawls 142 are disengaged from the teeth 118. The distal end of the arm 156 functions as a bias spring that engages with the knob when the knob is rotated in the loosening direction to inhibit accidental rotation of the knob 102 in the loosening direction. The arms 156 define an outer perimeter or circumference of the knob core 150. When the pawl disc 140 is coupled with the knob core 150, the distal end of the pawl 142 extends, or is pivoted, radially outward of the outer perimeter or circumference of the knob core 150 that is defined by the knob core's arms 156. The arms 156 slope downward from the proximal end (i.e., wall 158) to the distal end, which allows the pawls 142 to pivot and extend outward of the knob core's outer perimeter.

When the pawl disc 140 is positioned within the knob core 150, the knob core 150 may be snap together coupled with the knob 102. Coupling of the knob core 150 with the knob 102 traps or sandwiches the pawl disc 140 between the knob 102 and the knob core 150. The knob includes a plurality of axially extending tabs 101 that are configured to snap together couple with the main body of the knob core 150. Specifically, a distal end of the axially extending tabs 101 includes a lip that is shaped and sized to be positioned within a recess or pocket 159 of the knob core 150. To couple the knob 102 and the knob core 150, the knob core is axially aligned with the knob 102 and the recesses 159 are aligned with the axially extending tabs 101. The knob core 150 may then be pressed axially upward into the interior of the knob 102, which causes the axially extending tabs 101 to flex radially outward and around the main body of the knob core 150 until the lips are positioned within the recesses 159. Positioning of the lips within the recesses 159 causes the axially extending tabs 101 to return to an unflexed position, which locks or secure the knob core 150 within the interior of the knob 102 as shown in FIG. 1E.

As illustrated in FIG. 1E, the knob's recesses 159 have a circumferential length that is greater than a circumferential width of the axially extending tabs 101, which allows the knob 102 to be rotated relative to the knob core 150 and pawl disc 140. This rotational motion of the knob 102 in relation to the knob core 150 and pawl disc 140 allows the knob to be rotated in the loosening direction to disengage the pawls 142 from the teeth 118 and thereby incrementally loosen tension in the tension member. This incremental loosening process and the function of the rotational control component (i.e., the arms 156) is described in greater detail herein below.

FIG. 1D also illustrates an axially extending protrusion or sweeper of the knob 102 (hereinafter sweeper). The sweeper extends axially downward from the knob 102 and is configured to contact and engage a pawl 142 of the pawl disc 140 and to move or pivot the pawl 142 radially inward in order to disengage the pawl 142 from the teeth 118 of the reel based closure device 100. Disengagement of the pawls 142 from the teeth 118 enables the spool 120 to rotate in the second direction, which allows loosening of the tension in the tension member. The sweeper is also configured to contact and engage the distal end of the arms 156 of the knob core 150. The arms 156 function as a rotation control component that prevents accidental loosening of the tension member by inhibiting rotation of the knob 102 in the loosening direction until a sufficient rotational force is exerted on the knob in the loosening direction. In some conventional reel based systems, rotation of the knob in a loosening direction is not inhibited and the pawls are able to easily disengage from the teeth upon rotation of the knob in the loosening direction. This configuration may result in an unwanted loosening of the tension member upon incidental contact of the knob with external objects. For example, a user may brush his or her feet past an object and the object may contact the knob and cause the knob to rotate in the loosening direction. The rotation of the knob in the loosening direction may cause the pawls to disengage from the teeth, thereby loosening the tension member. This may frustrate the user by requiring the user to frequently retighten and readjust the tension member.

Since the reel based closure device 100 described herein requires that a sufficient rotational force must be exerted on the knob 102 in order to rotate the knob in the loosening direction, the sweeper is unable to contact and disengage the pawl 142 until and unless a sufficient rotational force is exerted on the knob 102. Stated differently, the rotation control component ensures that an appreciable rotational force in the loosening direction is required in order to engage the sweeper and the one or more pawls 142 and thereby disengage the one or more pawls 142 from the teeth 118. The terms "appreciable" or "sufficient" force means a force that is greater than the force exerted on the knob 102 from incidental contact with external object, such as a foot brushing past an object. Rather, the terms describe a level of force that is exerted by a user on the knob 102 for the purpose or intention of loosening the tension in the tension member. In this manner, the rotation control component prevents accidental loosening of the tension member by ensuring that incidental contact between the knob 102 and external objects will not loosen the tension member. The rotation control component does not perform any function other than inhibiting rotation of the knob 102 in the loosening direction. The rotation control component is also configured so that the knob 102 engages the rotation control component only when the knob 102 is rotated in the loosening direction.

As illustrated in FIG. 1D, the sweeper includes a first portion or arm 105*b* and a second portion or arm 105*a*. The second arm 105*a* extends axially farther from the knob 102 than the first arm 105*b*. The sweeper's first arm 105*b* is configured to contact and engage a pawl 142 of the pawl disc 140 in order to disengage the pawl 142 from the teeth 118 of the reel based closure device 100 and thereby allow the spool to be rotated in the second direction. The sweeper's second arm 105*a* is configured to contact and engage the distal end of the knob core's arm 156 and to deflect the arm 156 radially as the knob 102 is rotated in the loosening direction. The sweeper's second arm 105*a* contacts and engages the knob core's arm 156 before the sweeper's first arm 105*b* contacts and engages the pawl 142. The sweeper's first arm 105*b* is unable to contact the pawl 142 until the knob core's arm 156 is deflected radially by the sweeper's second arm 105*a*.

The sweeper's first arm **105*b* includes a sloped or tapered surface that engages with the pawl 142 and the sweeper's second arm 105*a* also includes a sloped or tapered surface that engages with the knob core's arm 156. The sloped or tapered surface of the first arm 105*b* aids in pivoting or moving the pawl 142 out of engagement with the teeth 118 in an easy and efficient manner and the sloped or tapered surface of the second arm 105*a* aids in deflecting the knob core's arm 156 radially. In some embodiments, the first arm 105*b* has a different slope or taper angle than the second arm 150*a***.

Figure 1J:
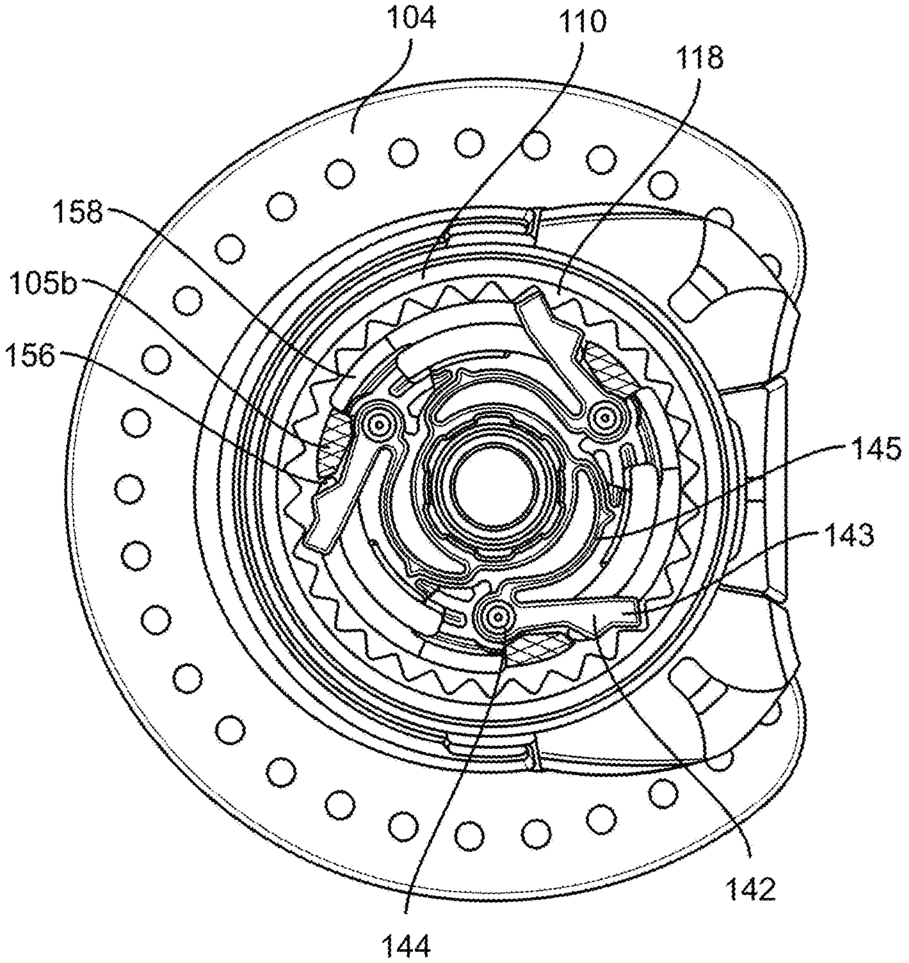

The engagement and function of the first and second arms, **105*b* and 105*a*, is illustrated in greater detail in FIGS. 1J-M. FIG. 1J illustrates the teeth 143 of the one or more pawls 142 engaged with the teeth 118 of the reel based closure device 100. FIG. 1J is a top view of the reel based closure device 100 with an upper portion of the knob 102 removed so that the internal components of the system are visible. Engagement of the pawls' teeth 143 with the teeth 118 locks the pawl disc 140 and knob core 150 in rotational position relative to the knob 102 and housing 110 and also locks the spool 120 in rotational position relative to the housing 110, thereby preventing rotation of the spool 120 in the loosening direction. The knob core 150 is operationally engaged with the spool 120, which prevents the spool from rotating in the loosening direction. The force or load that is exerted on the pawls 142 from the tension in the tension member is transferred to the pivot end 144 of the pawl, which contacts the support wall of the knob core 150** as described herein.

The first and second arms, **105*b* and 105*a*, do not contact and are not engaged with the pawls 142 or the knob core's arms 156. The knob core's arms 156 are visible under the pawls 142 and may not contact the first arms 105*b*, or may slightly contact a distal end of the first arms 105*b*. The sweeper is rotated away from the pawls 142 and into contact with a wall 158 of the knob core. Engagement of the sweeper (i.e., the first and second arms, 105*b* and 105*a*) and the wall 158 allows the knob core 150, pawl disc 140, and spool 120 to be rotated in the tightening direction when the knob 102 is rotated in the tightening direction. For example, in the illustrated embodiment, when the knob 102 is rotated in the clockwise direction (e.g., the tightening direction), the sweeper exerts a rotational force on the wall 158 in the clockwise direction, which causes the knob core 150 to rotate in the clockwise direction. The coupling of the knob core 150 and the spool 120, via the engagement of the knob core's teeth 157 and the spool's teeth 166, transfers the rotational force to the spool, which causes the spool to also rotate in the clockwise direction. The rotational force is likewise transferred to the pawl disc 140 via coupling of the pivot end 144 of the pawl arms 145 and pivot bosses 154, sandwiching of the pawl disc 140 between the knob 102 and the knob core 150, and the coupling of the pawl disc's central base 146 and the knob core's central aperture 152. The rotation force causes the pawl disc 140 to rotate in the clockwise direction, which causes the pawls 142 to deflect radially inward as the pawls 142 move between the teeth 118. The pawl arms 145 bias the pawls 142 back into engagement with the teeth 118 as the pawl disc 140 is rotated in the clockwise direction. In this manner, the knob 102 is rotatable by a user in order to rotate the spool 120 within the housing 110 and thereby wind the tension member about the spool 120**.

It should be realized that the direction or orientation of the pawls 142 may be adjusted. For example, the system may be configured so that the knob 102, pawl disc 140, knob core 150, and/or spool 120 are rotatable in the counterclockwise direction to wind the tension member about the spool 120. In other instances, the pawls 142 may be oriented to engage with axially oriented teeth 118. In such embodiments, the pawls 142 may displace or move axially in response to rotation of the pawl disc 140 and knob core 150. In any embodiment, the sweeper may function as a drive component to transfer rotational forces from the knob 102 to one or more internal components, such as the knob core 150, pawl disc 140, and spool 120 as described herein. In this manner, the sweeper may function as both the component that drives rotation of the internal components and as the component that enables incremental loosening of the tension member.

Figure 1K:
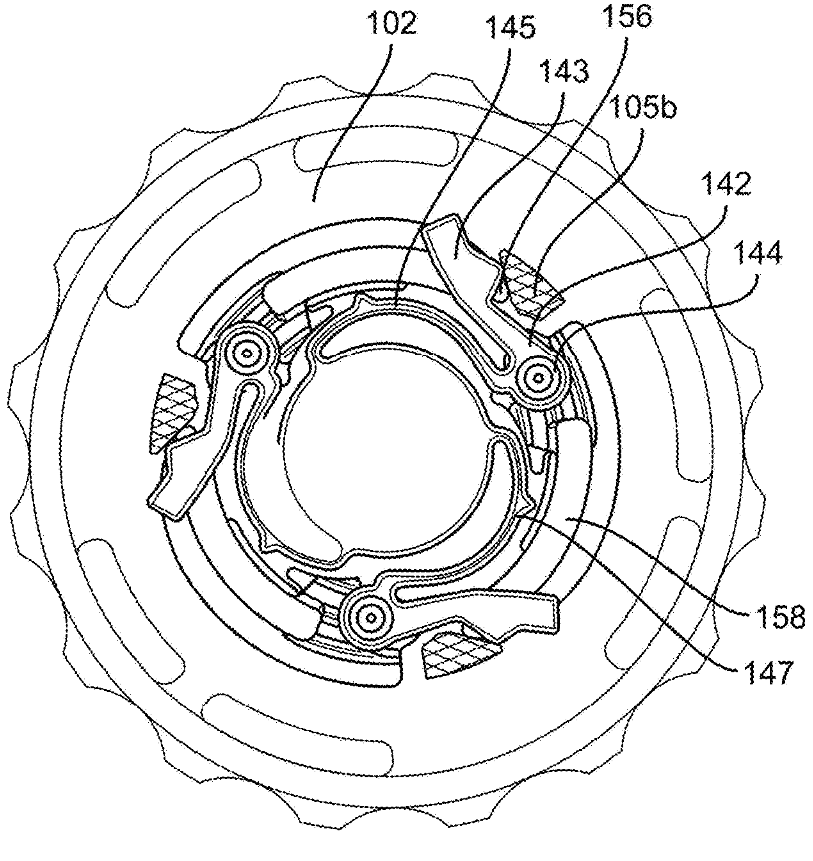

FIG. 1K illustrates the sweeper rotated into contact with the pawls 142 and with the knob core's arms 156. To simply the illustration, the housing 110 is removed from the view and the knob 102 is illustrated as a transparent component so that the pawl disc 140 and knob core 150 are visible through the knob 102. The sweeper is rotated counterclockwise relative to the image shown in FIG. 1J, which causes the sweeper to contact and engage the pawls 142 and the knob core's arm 156. Specifically, the first arm **105*b* contacts and engages a pawl 142 while the second arm 105*a* contacts and engages an arm 156 of the knob core 150. As described herein, the system is configured so that the second arm 105*a* contacts and engages the knob core's arm 156 before the first arm 105*b* contacts and engages the pawl 142, which allows the knob core's arm 156 to function as a rotation control component that inhibits rotation of the knob 102 in the loosening direction as described herein. The rotation control function is provided because the knob core's arm 156 functions as a bias spring that engages with the knob 102, and more specifically the knob's second arm 105*a*, when the knob is rotated in the loosening direction and counters rotation of the knob 102 in the loosening direction. The first arm 105*b* is unable to contact the pawl 142 until the knob core's arm 156 is deflected radially by the second arm 105*a***.

The pawl 142 is also shown in a flexed state in which the pawl 142 is pivoted about the pawl's pivot end 144 and is displaced closer to the pawl arm 145. The flexed state creates or increases elastic potential energy within the pawl arm 145, which is released when the first arm **105*b* is rotated out of engagement with the pawl arm 145. Rotation of the first arm 105*b* out of engagement with the pawl arm 145 may occur due to rotation of the knob 102 in the tightening direction or due to rotation of the spool 120 in the loosening direction via tension in the tension member. The released elastic potential energy causes the pawls 142 to pivot into engagement with the teeth 118, thereby relocking the pawl disc 140, knob core 150, and spool 120 in position relative to the housing 110. The pawl arm 145 may include a nub 147 that engages with the wall 158 to prevent the pawl arm 145 from bowing outward, which may increase the elastic potential energy that is created and stored within the pawl arm 145 due to displacement of the pawl 142**.

Displacement of the pawl 142 via engagement of the first arm **105*b* causes the pawl arm to displace from the teeth 118, which unlocks the pawl disc 140, knob core 150, and spool 120 from the housing. With these components unlocked, the spool 120 is able to spin in the loosening direction due to tension in the tension member. A rotational force in the loosening direction is transferred from the spool 120 to the knob core 150 and pawl disc 140 due to the coupling of the spool 120 and the knob core 150, which causes the knob core 150 and pawl disc 140 to spin in the loosening direction. Rotation of the pawl disc 140 in the loosening direction causes the pawl 142 to disengage from the first arm 105*b*, which causes the pawl 142 to displace or pivot radially outward into contact with the teeth 118 of the housing 110. This temporary disengagement of the pawl 142 and the teeth 118 results in an incremental loosening or decrease of tension in the tension member. The pawl 142 remains engaged and locked with the teeth 118 until the knob 102 is further rotated in the loosening direction, which causes the first arm 105***b* to reengage the pawl 142 and effects the chain of events just described. In this manner, the knob 105*b* may be rotated in the loosening direction to effect or cause an incremental loosening or decrease in the tension member's tension. The incremental loosening of the tension member allows a user to make minor adjustment in tension.

Figure 1L:
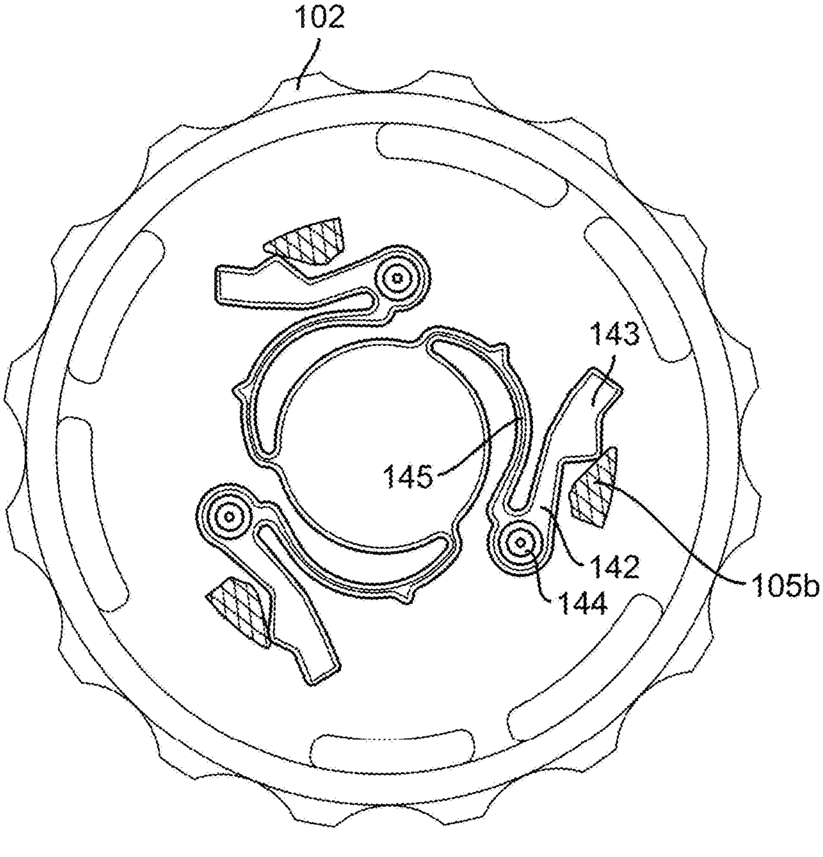
Figure 1M:
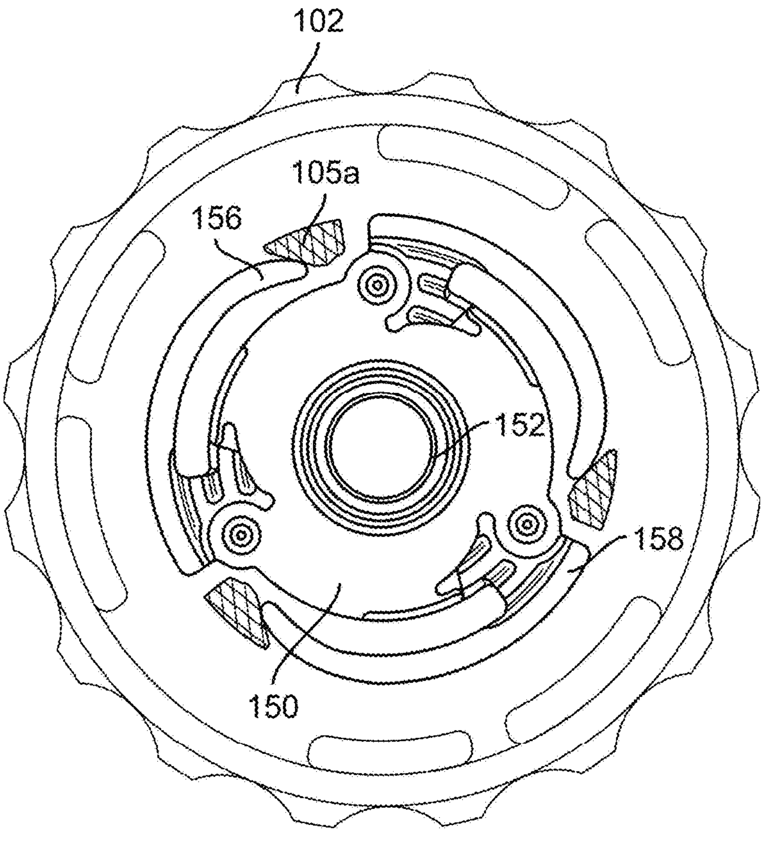

FIGS. 1L and 1M illustrate the engagement of the first arm 105*b* and pawl 142 and the engagement of the second arm 105*a* and the knob core's arm 156 in greater detail. For simplicity in illustrating the engagement, the only components that are illustrated in FIGS. 1L and 1M are the knob 102 and pawl disc 140 or knob core 150. Referring to FIG. 1L, the engagement of the first arm 105*b* and the pawls 142 is illustrated. The engagement of these components effects the incremental tension member loosening function described above. The first arm 105*b* is illustrated as displacing or pivoting the pawls 142 radially inward. As illustrated, the pawls 142 may include a tooth or projection that facilitates in engagement of the first arm 105*b* and the pawls 142. The projection allows the first arm 105*b* to engage a pawl 142 without requiring a substantial rotation of the first arm 105*b* relative to the pawl disc 140. FIG. 1M illustrates the engagement of the second arm 105*a* and the knob core's arm 156. The engagement of these components provides a counter force to the rotation of the knob 102 in the loosening direction. Specifically, the knob core's arm 156 engages a distal end of the second arm 105*a* and is displaced radially inward as the second arm 105*a* is rotated in the loosening direction (e.g., counterclockwise) relative to the knob core 150. Displacement of the knob core's arm 156 radially inward provides a spring force that counters rotation of the second arm 105*a* in the loosening direction. To continue to rotate the second arm 105*a* in the loosening direction, the rotational force exerted on the knob 102 must be greater than the countering force from the knob core's arm 156. Since the second arm 105*a* engages with the knob core's arm 156 before the first arm 105*b* contacts the pawl 142, a rotational force that is greater than the countering force of the knob core's arm 156 must be exerted on the knob 102 in order to engage the first arm 105*b* and pawl 142 and incrementally loosen the tension member's tension. As such, the knob core's arm 156 functions as a rotation control component that controls or regulates rotation of the knob 102 in the loosening direction and inhibits or prevents accidental loosening of the tension member. The countering spring force of the knob core's arm 156 may be varied by varying the thickness of the knob core's arm 156, the slope or taper of the second arm 105*a*, the cantilevered configuration of the knob core's arm 156, the material properties of the knob core's arm 156, and the like. Ideally, the countering force is sufficient to prevent accidental loosening of the tension member without being too substantial so as to discourage or frustrate a user.

FIGS. 1G and 1H illustrate the knob core 150 being operationally engaged with the central boss 132 in a manner that enables the pawl disc 140 and knob core 150 to be supported in one of two positions: an engaged position and a disengaged position. In the engaged position, the pawl disc 140 and knob core 150 are positioned axially downward with respect to the housing 110 and spool 120, which enables the knob 102 to be operated to tighten and incrementally loosen the tension member as described herein. In the disengaged position, the pawl disc 140 and knob core 150 are positioned axially upward with respect to the housing 110 and spool 120, which enables the spool 120 to freely spin in the loosening direction to freely loosen the tension member's tension.

FIG. 1G illustrates the disengaged position in which the knob core 150 and pawl disc 140 are positioned axially upward relative to the housing 110 and spool 120. In the disengaged position, axially oriented teeth 166 of the spool 120 are disengaged from, and do not contact, axially oriented teeth 157 of the knob core 150. Since the axially oriented teeth, 166 and 157, of the spool 120 and knob core 150 are disengaged, the spool 120 is able to spin or rotate freely within the housing 110 in the loosening direction. In the disengaged position, the pawls 142 of the pawl disc 140 may disengage from the housing's teeth 118, which may allow the knob 102, pawl disc 140, and knob core 150 to be rotated in the loosening direction. In other embodiments, the pawls 142 may remain engaged with the housing's teeth 118 in the disengaged position, which may prevent rotation of the knob 102, pawl disc 140, and knob core 150 in the loosening direction.

In some embodiments, the knob 102 may likewise be positioned axially upward with respect to the housing 110 and spool 120 in the disengaged position. Axially upward movement of the knob 102, pawl disc 140, and knob core 150 into the disengaged position may be achieved by pulling axially upward on the knob 102. When the knob 102 is moved axially upward relative to the housing 110, the radially inward protruding tabs 103 of the knob 102 may contact the housing's annular ridge 114 as illustrated in FIG. 1G. In other embodiments, the knob 102 may remain axially stationary with respect to the housing 110 and spool 120 while the pawl disc 140 and knob core 150 are moved to the axially upward position. In such embodiments, axial upward movement of the pawl disc 140 and knob core 150 may be achieved by rotating the knob 102 in the loosening direction and/or by employing a separate release mechanism or button, such as a lever, button, clamp, and the like. To move the pawl disc 140 and knob core 150 axially upward, the knob 102 and/or knob core 150 may include cammed, ramped, or sloped surfaces, or another mechanism, that moves the pawl disc 140 and knob core 150 axially upward as the knob 102 is rotated in the loosening direction.

FIG. 1H illustrates the engaged position in which the knob core 150 and pawl disc 140 are positioned axially downward relative to the housing 110 and spool 120. In the engaged position, the spool's axially oriented teeth 166 are engaged with, and directly contact, the knob core's axially oriented teeth 157. Engagement of the axially oriented teeth, 166 and 157, of the spool 120 and knob core 150 operationally locks the knob core 150 and the spool 120 together so that a rotation of the knob core 150 in the tightening direction causes the spool 120 to rotate in the tightening direction. The spool 120 and knob core 150 are also operationally locked so that a rotation of the spool 120 in the loosening direction causes the knob core 150 to rotate in the loosening direction. In the engaged position, the pawls 142 of the pawl disc 140 are engaged with the housing's teeth 118, which locks the pawl disc 140, knob core 150, and spool 120 in rotational position relative to the housing 110 as described herein. The knob 102 is likewise positioned axially downward with respect to the housing 110 and spool 120 in the engaged position. When the knob 102 is positioned axially downward relative to the housing 110, a gap G exists between the knob's radially inward protruding tabs 103 and the housing's annular ridge 114 as illustrated in FIG. 1H.

The central boss 132 supports and maintains the pawl disc 140, knob core 150, and/or knob 102 in the engaged and disengaged positions via an annular projection or member 134. The annular member 134 has a diameter that is greater than the diameter of the knob core's central aperture 152, which causes the annular member 134 to interfere with and impede axially upward and downward movement of the knob core 150 about the top end of the central boss 132. While the annular member 134 impedes axial movement of the knob core 150, the annular member 134 does not prevent axial movement of the knob core 150 due to the ability of the central boss 132 to displace or flex radially inward. Specifically, the central boss 132 is formed of a pair of fingers or protrusions that extend axially upward from the circular base of the seat component 130. The pair of protrusions flex radially inward toward one another as the knob core 150 is moved axially upward and downward in relation to the annular member 134. Specifically, the engagement of the annular member 134 and the knob core's central aperture 152 forces the pair of protrusions to flex inward as the knob core 150 is moved axially upward and downward about the annular member 134. After the knob core 150 is moved axially upward or downward about the annular member 134, the pair of protrusions resiliently flex outward to resume an un-deflected configuration. In operation, the knob core's central aperture 152 is positioned above or below the annular member 134, which supports and maintains the knob core 150, pawl disc 140, and/or knob 102 in either the engaged or disengaged position.

The reel based closure device 100 may include a reinforcement spring 170 to strengthen and reinforce the pair of protrusions of the seat component 130. To reinforce the pair of protrusions, the reinforcement spring 170 is inserted axially within an axially extending gap between the pair of protrusions of the seat component 130. The reinforcement spring 170 is made of a flexible and resilient material, such as spring steel or a metal free (e.g., PEAK) material. The reinforcement spring 170 aids in resiliently deflecting the pair of protrusions as the knob core 150 is moved axially upward and downward about the annular member 134. The reinforcement spring 170 may also stiffen the pair of protrusions and prevent the pair of protrusions from plastically deforming due to extended use of the reel based closure device 100. As illustrated, the reinforcement spring 170 may have a U-shaped configuration.

The reinforcement spring 170 may include an aperture 172 that engages with a small projection that is positioned on the inner surface of the pair of protrusions. Engagement of the apertures 172 and projections lock or retain the reinforcement spring 170 in position relative to the pair of protrusions. The reinforcement spring 170 may be inserted axially through a bottom aperture of the seat component 130 to position the reinforcement spring 170 between the pair of protrusions.

As illustrated in FIGS. 1B and 1C, the seat component 130 includes a spool engagement feature 138 that is configured to engage a bottom end of the spool 120 as a tension in the tension member decreases. Typically the spool engagement feature 138 and the spool 120 do not engage until a tension in the tension member is at or near a tension threshold, such as a nominal or zero amount of tension. Engagement of the bottom end of the spool 120 and the spool engagement feature 138 prevents rotation of the spool 120 in the loosening direction. Stated differently, the spool 120 is rotatable in the loosening direction until the bottom end of the spool 120 contacts and engages with the spool engagement feature 138. After engagement of the spool 120 and the spool engagement feature 138, rotation of the spool 120 in the loosening direction is prevented.

In one embodiment, the spool 120 includes teeth 126 that are positioned on and axially extend from a bottom surface of the spool 120. The teeth 126 are configured to engage with circumferentially spaced apertures that are formed on the seat component's circular base. The apertures function as the spool engagement feature 138 (hereinafter apertures 138) such that engagement of the spool's teeth with the circumferentially spaced apertures prevents rotation of the spool 120 in the loosening direction. In other embodiments, the spool engagement feature may be teeth that are formed on the circular base, or may be other frictional components, such as a rubber type gasket or material, abrasive materials, tacky materials, and the like.

The spool's teeth 126 and the apertures 138 are configured to be disengaged until the tension member's tension is at or near the tension threshold. Disengagement of the teeth 126 and apertures 138 allows the spool 120 to rotate in the tightening and loosening direction as described herein to tension and loosen the tension member. After the teeth 126 and apertures 138 engage, further rotation of the spool 120 in the loosening direction is prevented or limited. To allow engagement and disengagement of the teeth 126 and apertures 138, the spool 120 is configured to move axially upward and downward relative to housing 110 as illustrated in FIGS. 1H and 1I. The axial upward positioning of the spool 120 is illustrated in FIG. 1H, which shows the bottom of the spool 120 disengaged and axially separated from the top of the seat component 130. An axial gap is present between the bottom of the spool 120 and the top of the seat component 130 and as such, the spool's teeth 126 and the seat component's apertures 138 do not contact and engage with one another.

Disengagement of the teeth 126 and apertures 138 may be facilitated or achieved by providing a slight taper or sloped configuration on spool's teeth 166 and the knob core's teeth 157. The taper/slope of teeth, 166 and 157, may be oriented so that the spool 120 is forced or pulled axially upward relative to housing 110 and into engagement with the knob core 150 when the knob core 150 rotates in the first or tightening direction. For example, the taper/slope configuration of the teeth, 166 and 157, may cause the spool's teeth 166 to slide axially upward relative to and into further engagement with the knob core's teeth 157 as the knob core 150 rotates in the tightening direction. In this manner, the spool 120 may be pulled into the axially upward configuration illustrated in FIG. 1H.

As described herein, in some embodiments the spool includes an inner member 160 and an outer member 120. In such embodiments, the engagement of the spool's teeth 166 and the knob core's teeth 157 causes both the inner member 160 and the outer member 120 to move axially upward when the knob core 150 is rotated in the tightening direction. The outer member 120 may be pulled axially upward due to an interaction of the inner member's legs, 164*a* and 164*b*, and the outer member's channels, 124*a* and 124*b*. Outward projecting tabs on the legs, 164*a* and 164*b*, may pull axially upward on a recess or tab of the channels, 124*a* and 124*b*, to pull the outer member 120 axially upward. A similar axially upward movement is achieved when some amount of tension exists in the tension member since the tension will urge the spool 120 toward a counter-rotation relative to the knob core 150, which will cause the spool's teeth 166 to slide axially upward relative to and into further engagement with the knob core's teeth 157 due to the shape of the taper/slope of the teeth, 166 and 157.

As the tension in the tension member is decreased, at some point the tension will achieve or exceed the tension threshold, which will cause the spool 120 to move axially downward relative to housing 110 and will cause the spool's teeth 126 to contact and engage with the seat component's teeth 138. The axial downward position of the spool 120 relative to the housing 110 is illustrated in FIG. 1I, which shows the bottom of the spool 120 contacting and engaged with the top of the seat component 130. Since the spool 120 directly contacts the seat component 130, the spool's teeth 126 frictionally engage with the apertures 138.

Frictional engagement of the teeth 126 and apertures 138 prevents or limits further rotational movement of spool 120 in the loosening direction. The spool 120 will remain in the axially downward position until the knob core 150 is rotated in the tightening direction, which will cause the spool 120 to move axially upward as previously described. Rotation of the spool 120 in the loosening direction is prevented even if and when the knob 102 is rotated in the loosening direction. The reel based closure device 100 is configured so that when the teeth 126 and apertures 138 engage, the engagement of the teeth 126 and apertures 138 is undetectable upon further rotation of the knob 102 in the loosening direction. Stated differently, if a user rotates the knob 102 in the loosening direction after engagement of the teeth 126 and apertures 138, the system is designed so that the engagement of the teeth 126 and apertures 138 will not be noticed by the user.

One way in which the engagement is not detectable is that the knob 102 does not move or bounce axially when the knob 102 is rotated in the loosening direction after engagement of the teeth 126 and apertures 138. To minimize the effects on the knob 102 due to engagement of the teeth 126 and apertures 138, the reel based closure device 100 includes a biasing component that is positioned within the interior region of the housing 110 and that is operably engaged with the spool 120 to allow the spool to move axially upward and downward within the interior region of the housing 110. The biasing component is configured to bias the spool 120 axially into operable engagement with the knob 102.

In some embodiments, the biasing component is a coil spring 162 that is aligned coaxially with the spool 120 and that is engaged with the spool. To further minimize the effects on the knob 102 due to engagement of the teeth 126 and apertures 138, the spool 120 may be formed of two or more components. For example, the spool 120 may be formed of an outer member 120 (hereinafter outer member 120) and an inner member 160. The inner member 160 may be coupled with the outer member 120 so that the inner member 160 is axially moveable relative to and within the outer member 120. The inner member 160 and the outer member 120 may be rotationally locked in relation to one another. To rotationally lock the inner and outer members, the outer member 120 may include a pair of channels, 124*a* and 124*b*, within which a pair of legs, 164*a* and 164*b*, are positioned. The channels, 124*a* and 124*b*, and legs, 164*a* and 164*b*, are shaped and sized so that insertion of the legs, 164*a* and 164*b*, within the channels, 124*a* and 124*b*, rotationally keys or locks the two components together. A distal end of the legs, 164*a* and 164*b*, includes tabs that engage with a bottom end of the channels, 124*a* and 124*b*, to lock the inner member 160 within the channels, 124*a* and 124*b*, of the outer member 120 as shown in FIG. 1G. A surface of the inner member 160 may rest on a ledge or step 122 of the outer member 120 when the inner member and outer member are coupled together.

The inner member 160 is operably engaged with the coil spring 162 and more specifically, the coil spring 162 is coaxially aligned with and inserted within a cylindrical channel of the inner member 160. An opposite end of the coil spring 162 contacts and is supported by a ledge or ridge 123 of the outer member 120. Since the coil spring 162 contacts both the inner member 160 and the outer member 120, the coil spring 162 biases or urges these components axially apart. Specifically, the coil spring 162 axially biases the inner member 160 relative to the outer member 120 into engagement with the knob core 150. The spool's teeth 166 axially extend from an upper surface of the inner member 160 and as such, biasing the inner member 160 into engagement with the knob core 150 biases the spool's teeth 166 into engagement with the knob core's teeth 157. Since the inner member 160 is locked rotationally with the outer member 120 via insertion of the legs, 164*a* and 164*b*, within the channels, 124*a* and 124*b*, when the knob core 150 is rotated in the tightening direction, the rotational force that is exerted on the inner member 160 from the knob core 150 is transferred to the outer member 120, which causes the outer member 120 to rotation in the tightening direction. Similarly, rotation of the outer member 120 in the loosening direction via tension in the tension member, causes the inner member 160 to rotate in the loosening direction.

The spool's other teeth 126 are positioned on the outer member 120 and thus, the outer member 120 is configured to move axially downward and into engagement with the seat component 130 as previously described. As illustrated in FIG. 1I, when the outer member 120 is positioned axially downward and engaged with the seat component 130, the coil spring 162 biases the inner member 160 axially upward so that the inner member 160 remains at least partially engaged with the knob core 150. The coil spring 162 aids in engaging the outer member 120 with the seat component 130 by biasing the outer member 120 axially downward relative to the inner member 160 as the tension member's tension is decreased as described herein. The engagement of the coil spring 162 and the outer member's ridge 123 biases the outer member 120 axially downward as the tension member's tension is decreased to near or beyond the tension threshold. As the outer member 120 is moved axially upward, or the inner member 160 is moved axially downward, the coil spring 162 is compressed. FIGS. 1H and 5I illustrate the relative axial movement of the outer and inner members, 120 and 160.

To reduce or prevent axial movement of the knob 102 when the outer member 120 is engaged with the seat component 130, the inner member 160 is configured to be pressed axially downward as the knob 102 is rotated in the loosening direction. Specifically, as the knob 102 and knob core 150 are rotated in the loosening direction after engagement of the outer member 120 and the seat component 130, a rear surface of knob core's teeth 157 contacts a rear surface of the spool's teeth 166. The rear surfaces of these teeth, 157 and 166, are sloped or ramped so that contact between the rear surfaces of the teeth, 157 and 166, presses or forces the inner member 160 axially downward relative to the outer member 120. The downward force on the inner member 160 causes the inner member 160 to move axially downward within and relative to the outer member 120. The axial downward movement of the inner member 160 also allows the knob core's teeth 157 to rotate past the spool's teeth 166 in the loosening direction. Since the inner member 160 is pressed axially downward, the knob 102 is not forced to move or bounce axially upward when the knob core's teeth 157 rotate past the spool's teeth 166. Rather, the inner member 160 moves or bounces axially downward as the knob core's teeth 157 slide along the slope or taper of the spool's teeth 166 and rotate past the spool's teeth 166. In this manner, the knob 102, knob core 150, and pawl disc 140 are rotatable in the loosening direction without causing any axial movement or motion of the knob 102 after engagement of the outer member 120 and the seat component 130.

Figure 2A:
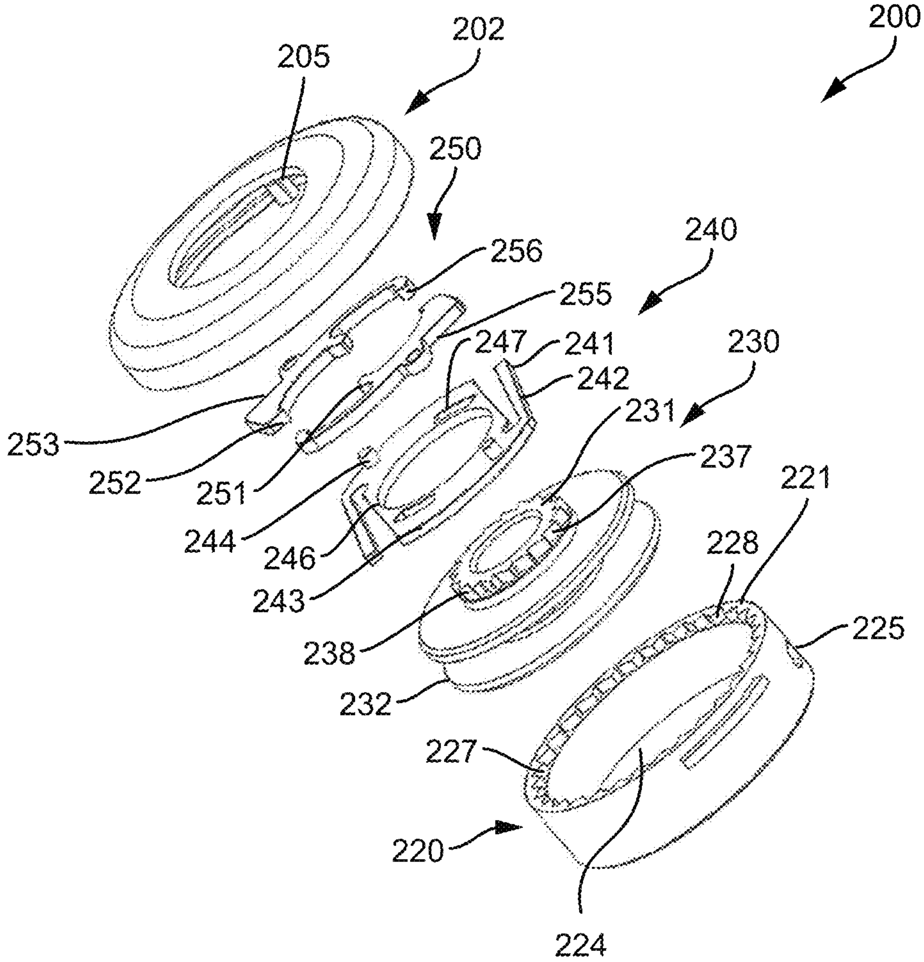
FIGS. 2A-D illustrate another embodiment of a reel based closure device that may be used to tighten an article.
Figure 2B:
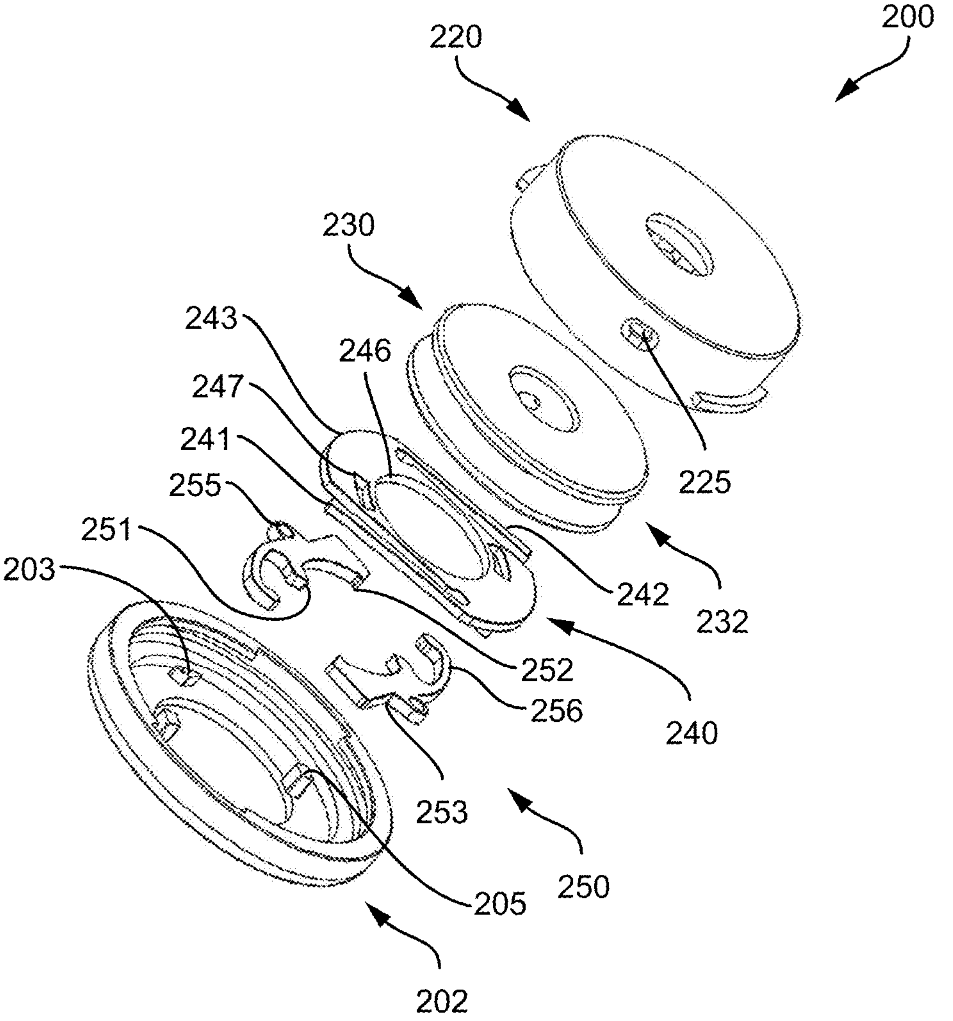

Referring now to FIGS. 2A and 2B, illustrated are exploded perspective views of the reel based lacing device or system 200 (hereinafter lacing system 200) in a disassembled state. The lacing system 200 includes a tightening component 202, such as a reel or knob (hereinafter knob 202), that is designed to be grasped and rotated by a user. The knob 202 is positioned with respect to the lacing system 200 so that it is easily accessible to a user. The knob 202 is illustrated as having a cylindrical profile or shape when viewed from a top surface, although various other knob shapes or configurations may be employed, such as hexagonal, octagonal, triangular, and the like. The knob 202 is attached to a housing or housing component 220 (hereinafter housing 220). The housing 220 includes an interior region within which one or more components of the lacing system 200 are positioned. The housing 220 is configured to be attached to the article (e.g., shoe, boot, etc.) that employs the lacing system 200 for adjusting the tightness or fit of the article. For example, the housing 220 may include a flange that is stitched, adhered, adhesively bonded, welded (RF, ultrasonic, etc.), or otherwise attached to the article. In some instances, the housing 220 or the flange may be insert molded onto the article that employs the lacing system 200.

As noted above, the housing 220 includes a cylindrical portion having an interior region within which one or more components of the lacing system 200 are positioned. Within the interior cylindrical portion are housing teeth 221. The housing teeth 221 may be formed during the molding process, or may be subsequently cut therein. Each tooth defines a sloped portion 227 and a substantially radial surface 228. In one embodiment, the sloped portion 227 of each housing tooth 221 allows relative clockwise rotation of a cooperating pawl, while inhibiting relative counterclockwise rotation of the engaging pawl. Of course, the tooth direction could be reversed as desired. The number and spacing of housing teeth 221 controls the fineness of adjustment possible, and the specific number and spacing can be designed to suit the intended purpose by one of skill in the art in light of this disclosure. However, in many applications it is desirable to have a fine adjustment of the lace tension and the inventors hereof have found that approximately 20 to 40 housing teeth 221 are sufficient to provide an adequately fine adjustment of the lace tension.

The housing 220 additionally contains a pair of tension member entry holes 225 (hereinafter entry holes 225) for allowing each end of a tension member, e.g., lace, to enter herein. The housing 220 entry holes 225 may be made more robust by the addition of higher durometer materials either as inserts or coatings to reduce the wear caused by the tension member abrading against the housing 220 entry holes 225. Additionally, the site of the entry holes 225 can be rounded or chamfered to provide a larger area of contract with the tension member to further reduce the pressure abrasion effects of the tension member rubbing on the housing 220 unit.

The housing 220 is preferably injection molded out of any suitable material. For example, the housing 220 may be formed of nylon. Of course, any suitable manufacturing process that produces mating parts fitting within the design tolerances is suitable for the manufacture of the components disclosed herein. In embodiments, it is preferable that an inner bottom surface 224 of the housing 220 be highly lubricious to allow mating components an efficient sliding engagement therewith. For example, the inner bottom surface 224 of the housing 220 may be coated with any of a number of coatings desired to reduce its coefficient of friction and thereby allow any components sharing surface contract therewith to easily slide.

With additional reference to FIGS. 2A and 2B, a spool 230 is configured to reside within the cylindrical portion of the housing 220 and is configured with sloped spool teeth 231 raised from a top surface of the spool 230. The spool 230 is rotatably positioned within the interior region of the housing 220 and is configured so that a tension member (not shown) is windable about the spool 230 in order to tension the tension member and tighten the article. In embodiments, the spool 230 is formed of metal, such as aluminum, by any standard chip producing, material removal machining operation. Alternatively, the spool 230 may be cast or molded and may be formed of any suitable polymer. In another preferred embodiment, the spool 230 is formed of nylon and may optionally have a metal plate insert.

The spool 230 is configured to receive and wind a tension member (not shown), such as a lace or a cord, around an internal column (not shown). The tension member passes through entry holes 225 of the housing 220 and is securely held in the spool. In one embodiment, the tension member has two ends that are tied together. In such an embodiment, the spool 230 can be configured with a recess to accompany the knot formed by the tension ends.

It is preferable that the tension member is attached to the spool 230 at substantially diametrically opposed locations to provide a simultaneous and equivalent tension to each tension member as a winding force is imparted to the spool 230. Moreover, a preferred tension member attachment configuration applies balanced forces to the spool 230 to protect the spool 230 from transverse bending forces that could cause the journal connection to prematurely wear. For example, if the tension member engages the spool 230 from directions forming a ninety-degree angle, the forces imparted by the tension in the wound tension member would apply a shear force to the internal column of the spool 230 around which the tension member winds. If, however, the tension member was diametrically attached to the spool 230, the resultant force on the spool 230 from the equivalent opposing tension forces would be zero, thus protecting the spool 230 and its journaled connection from wear resulting from transverse forces.

The spool 230 comprises a central annular groove 232 configured to receive the wound up tension member. As the spool 230 is rotated in the tightening direction the tension member that is attached to the spool 230 is wound around the annular groove 232 of the spool 230. The annular groove 232 is preferably configured to contain the full length of the tension member, while minimizing any tendency for the tension member to become loose within the housing 220 and potentially becoming jammed, or interfering with additional components contained within the housing 220. In some embodiments (not shown), two annular grooves separated by an annular ridge may be provided to segregate each end of the lace to reduce the likelihood of jamming or binding the mechanism.

As noted above, the spool 230 is preferably circular in shape and is configured to reside within the interior region of the housing 220. To reduce rotational friction between the spool 230 and the housing 220, the spool 230 is detachable from the housing 220. Instead a rotatable connection maintains the spool 230 at the center of the housing 220 and thereby inhibits friction caused by the outer periphery of the spool 230 contacting the inner periphery of the housing 220, while still allowing the spool 230 to freely spin within the housing 220. The spool 230 is rotatably connected to the housing 220 via a pawl disc 240. By using the pawl disc 240 to rotatably connect the spool 230 to the housing 220, the spool 230 is allowed to freely rotate in either direction within the housing 220.

As evident in the exploded perspective views of FIG. 2A-B, the lacing system 200 includes additional components. These additional components are also housed or contained within the housing 220 of the lacing system 200 when the system is assembled and thus, these additional components are typically not visible in an assembled view of the lacing system 200. The additional components include the pawl disc 240 and pivoting arms 250, which are described in further detail below.

The pawl disc 240 is positioned axially above the spool 230 and rotatably couples the spool 230 to housing 220 by means of a pair of pivoting arms 250. The pawl disc 240 in combination with pivoting arms 250 allows the spool 230 to rotate in one direction (i.e., the tightening direction) while preventing rotation of the spool 230 in the opposite direction (i.e., the loosening direction) within the housing 220. The tightening direction may be a clockwise or counterclockwise direction as desired while the loosening direction would be the opposite direction. However, for the discussion herein, the tightening direction is clockwise and the loosening direction is counterclockwise.

The pawl disc 240 is operably coupled to the spool 230 via the pair of pivoting arms 250 such that the pawl disc 240 allows the spool 230 to rotate in the tightening direction, while preventing the spool 230 from rotating in the loosening direction within the house 220 when the lacing system 200 is in an engaged state. The pivoting arms 250 are positioned axially above the pawl disc 240 but axially below the knob 202. The knob 202 is rotatably coupled with the housing 220 and is positioned axially above the pivoting arms 250 and operably coupled therewith so that an operation of the knob 202 (e.g., rotation of the knob 202) causes the spool 230 to rotate within the interior region of the housing 220 in the first direction to wind the tension member about the spool 230.

As briefly noted above, the spool teeth 231 are raised from a top surface of the spool 230 and, when the lacing system 200 is assembled, the spool teeth 231 extend through a central circular opening 246 in a circular section 243 of the pawl disc 240. The extent that the spool teeth 231 extend beyond the top surface of the spool 230 corresponds to the thickness of both the pawl disc 240 and the pivoting arms 250 combined when assembled. That is, once the spool teeth 231 are positioned through the circular opening 246, a top surface of the spool teeth 231 becomes flush with a top surface of the pivoting arms 250 after the pivoting arms 250 are assembled atop the pawl disc 240 and the pawl disc 240 is assembled atop the top surface of the spool 230.

Each tooth of the spool teeth 231 defines a sloped portion 237 and a substantially radial surface 238. In one embodiment, the sloped portion 237 of each spool tooth 231 in combination with the cooperating pivoting arms 250, allows relative counterclockwise rotation of the spool 230, while inhibiting relative clockwise rotation of the spool 230 when the pivoting arms 250 are engaged with the spool teeth 231. Of course, the tooth direction could be reversed as desired. The number and spacing of spool teeth 231 controls the fineness of adjustment possible, and the specific number and spacing can be designed to suit the intended purpose by the one of skill in the art in light of this disclosure.

It should be noted that the slope orientation of the spool teeth 231 and the housing teeth 221 are opposite of each other. Accordingly, this provides that the each of the teeth, spool teeth 231 and the housing teeth 221, allow rotation and inhibit rotation of the spool 230 in opposite directions. To allow the spool 230 to rotate freely in either direction, in accordance to a user's rotation of the knob 202, the spool 230 is mechanically coupled with the pawl disc 240 and the pivoting arms 250 in an arrangement that provides for a tightening engagement and loosening engagement. When in the tightening engagement arrangement, the coupling of the pawl disc 240 and pivoting arms 250 with the spool 230 allows for rotation of the spool 230 in the tightening direction (e.g., clockwise), while inhibiting rotation of the spool 230 in the loosening direction (e.g., counterclockwise). Conversely, when in the loosening engagement arrangement, the coupling of the pawl disc 240 and the pivoting arms 250 with the spool 230 allows for rotation of the spool 230 in the loosening direction, while inhibiting rotation of the spool 230 in the tightening direction. Accordingly, it is through the pivoting of the pivoting arms 250 that provide for the spool 230 to disengage from the housing teeth 221 and freely rotate in the loosening direction.

The pivoting arms 250 mechanically couple the pawl disc 240 to the spool 230 and in turn, mechanically couple the spool 230 to the housing 220. Axial posts 244 axially extend from a top surface of the circular section 243 of the pawl disc 240 towards the knob 202 and mechanically couple the pawl disc 240 with the pivoting arms 250. As illustrated in the assembled view of the lacing system 200 in FIG. 2C-D, the axial posts 244 of the pawl disc 240 engage with, and insert into, pivoting apertures 255 of the pivoting arms 250 so that the pawl disc 240 and the pivoting arms 250 function as a unitary component. The axial posts 244 mechanically couple the pawl disc 240 and the pivoting arms 250 such that when the pawl disc 240 rotates in the tightening direction, then the pivoting arms 250 also rotate in the tightening direction, and vice versa. Moreover, when the axial posts 244 are inserted into the pivoting apertures 255 in an assembled state, the pivoting arms 250 are able to pivot about the axial posts 244. It is the pivoting of the pivoting arms 250 that releases the spool 230 from engagement with the pawl disc 240, and in turn the housing teeth 221, and allows the spool 230 to rotate in the loosening direction.

Figure 2C:
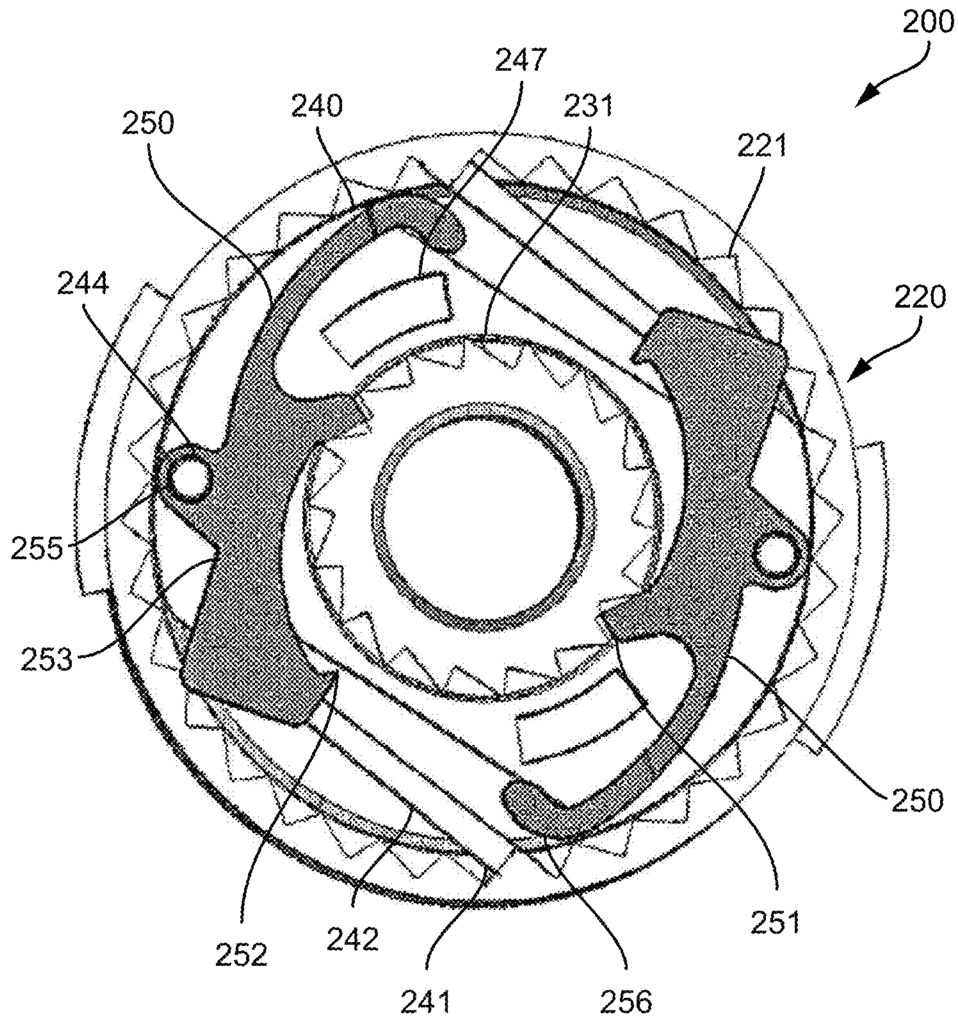
Figure 2D:
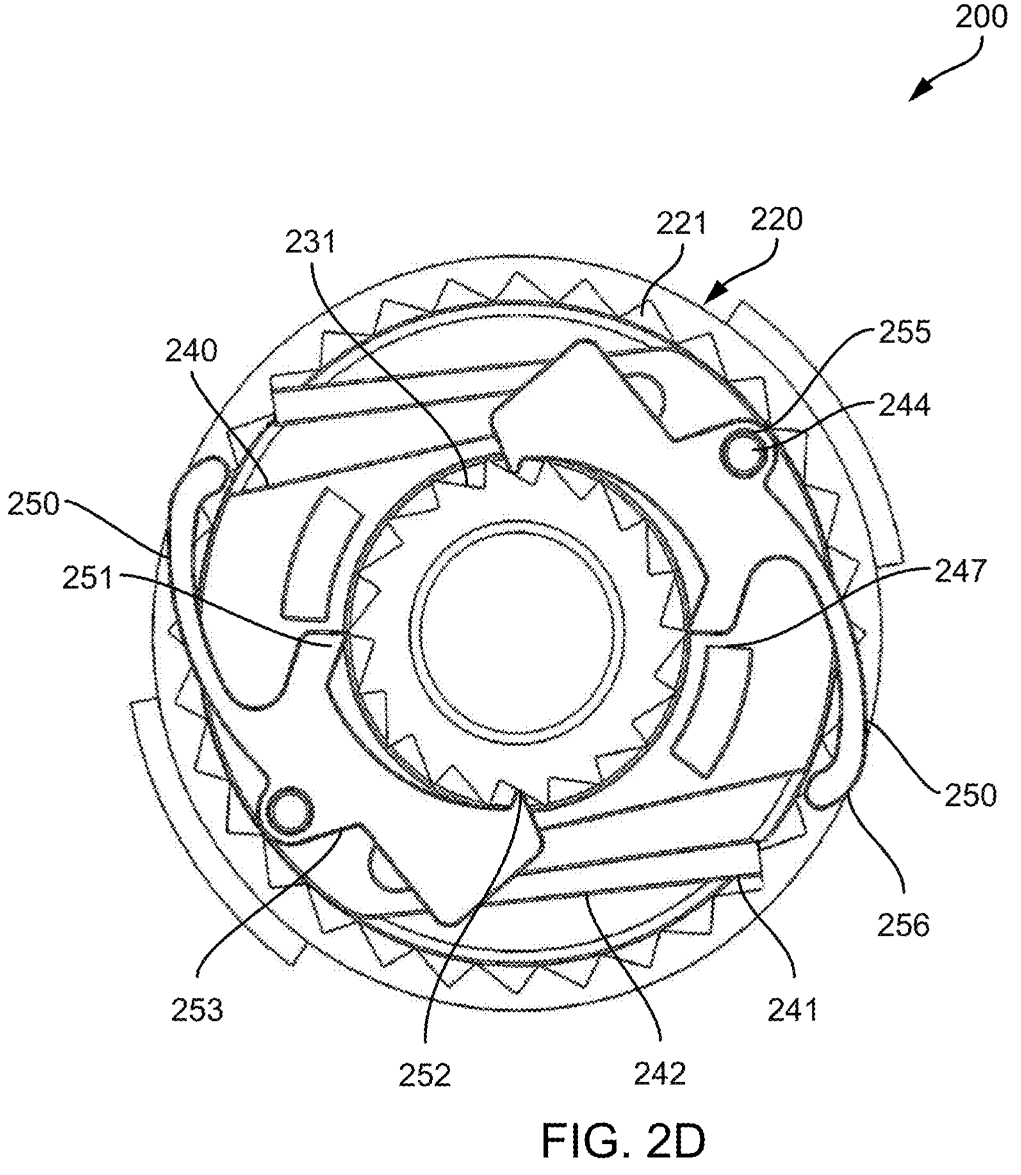

The pivoting arms 250 comprise a primary tooth 251, a secondary tooth 252, a pawl spring 256, and a pivoting notch 253. The primary tooth 251 and the secondary tooth 252 are positioned radially inwards and are configured to engage with the spool teeth 231, which, as discussed above, are inserted through the circular opening at the center of the circular section 243 of the pawl disc 240 and are flush with the pivoting arms 250 on the horizontal plane. As illustrated in FIGS. 2C and 2D, when the pivoting arms 250 are mechanically coupled to the pawl disc 240, the pair of pivoting arms 250 are positioned complementarily to each other, oriented clockwise. The pair of pivoting arms 250 are vertically and horizontally mirrored opposite of one another, with the primary tooth 251 and the secondary tooth 252 directed towards the spool teeth 231. As such, when the pair of pivoting arms 250 are arranged in the clockwise direction, a first end of a first pivoting arm 250 comprising the pawl spring 256 is directed towards a second end of the second pivoting arm 250. And a first end of a second pivoting arm 250 comprising the pawl spring 256 is directed towards a second end of the first pivoting arm 250.

The primary tooth 251 and secondary tooth 252 are positioned such that only one tooth may be engaged with the spool teeth 231 at a given time, depending on the orientation of the pivoting arms 250. As discussed above, the pivoting arms 250 are configured to pivot about the axial posts 244 of the pawl disc 240. In the tightening engagement position, the pivoting arms 250 are pivoted forward, in the clockwise direction, engaging the primary tooth 251 with the spool teeth 231 and disengaging the secondary tooth 252 from the spool teeth 231. However, when the pivoting arms 250 are pivoted backwards in the counterclockwise, loosening direction, then the secondary tooth 252 engages with the spool teeth 231, and the primary tooth 251 disengages from the spool teeth.

As illustrated, the pawl disc 240 includes two pawls 241 that are positioned on the distal ends of two diametrical cantilevered arms 242. The two diametrical cantilevered arms 242 extend radially in a counterclockwise (or loosening direction) from and in the same plane as the circular section 243. The two pawls 241 are biased radially outward so that they engage with housing teeth 221 of the housing 220 in a ratchet like manner to enable a one-way winding motion of the spool 230 within the housing 220. The sloped portion 227 of the housing teeth 221 allows the pawls 241 to slide up the housing teeth 221, causing the cantilevered arms 242 to deflect radially inwards as the pawl disc 240 is rotated in the tightening direction. When the pawls 241 reach the substantially radial surface 228 of the housing teeth 221, the cantilevered arms 242 deflect the pawls 241 back into an engaged state with the next housing tooth 221. The pawls 241 are deflected back down to the bottom of the sloped portion 227 of the next housing tooth 221. In contrast, the substantially radially surface 228 prevents rotation of the pawl disc 240 in the loosening direction When the pawls 241 are engaged with the housing teeth 221, the substantially radial surface 228 inhibits the pawl disc from rotating in the counterclockwise direction.

Although the pawls 241 are illustrated as projecting radially outward, in some embodiments the pawls 241 may project radially inward or axially upward or downward. In such embodiments, the housing teeth 221 that engage with the pawls 241 would also be positioned somewhere other than on the inner wall of the housing 220, such as on an exterior wall of an inner cylindrical wall, or on a separate toothed component or disc that is attachable to the housing 220. In such embodiments, the housing teeth 221 would face radially outward, axially upward, or axially downward in order to engage with the pawls 241 of the pawl disc 240. In yet another embodiment, the pawl disc 240 may be integrally formed with the knob 202, spool 230, or with the housing 220.

The pivoting arms 250 mechanically couple the spool 230 to the knob 202 by pivoting cams 203. The pivoting cams 203 extend axially down towards the pivoting arms 250 from the underside of the knob 202, and engage with the pivoting notches 253 on each of the pivoting arms 250. The pivoting cams 203 are positioned to insert into the pivoting notch 253 of the pivoting arms 250. The pivoting cams 203 transfer rotation forces or torque from the knob 202 as the knob 202 is turned or rotated by a user to the pivoting arms 250. Importantly, the pivoting cams 203 transfer the rotation forces to the pivoting arms 250 to cause the pivoting arms 250 to pivot on the axial posts 244.

The pivoting notches 253 are configured to be slightly larger than the pivoting cams 203 so that the pivoting cams 203 can rotate back and forth with the slight adjustments of the knob 202. For example, when the knob 202 is rotated in a clockwise direction (tightening direction), the pivoting cams 203 are also rotated in the same direction, engaging the pivoting notches 253 in the rotation, and pivoting the pivoting arms 250 forward in the clockwise direction. Similarly, when the knob 202 is rotated in the counterclockwise direction (loosening directions), the pivoting cams 203 rotate in the same direction, engaging the pivoting notches 253 in the rotation, and the pivoting cams 203 pivot the pivoting arms 250 backwards in the clockwise direction.

Rotation of the knob 202 is also transferred to the pawl disc 240 by drive cams 205. The driving cams 205 operationally couple the knob 202 with the pawl disc 240. The drive cams 205 extend axially down towards the pawl disc 240 and engage with, and are inserted into, drive apertures 247 on the circular section 243 of the pawl disc 240. The drive cams 205 transfer rotational forces or torque from the knob 202 to the pawl disc 240 via the drive apertures 247 as the knob 202 is turned or rotated by a user. Because of the engagement between the pawls 241 and the housing teeth 221, specifically the substantially radial surface 228, the drive cams 205 can only freely rotate the pawl disc 240 in the tightening direction. In the loosening direction, the drive cams 205 merely rotate slightly counterclockwise within the drive apertures 247 that are slightly oversized compared to the drive cams 205.

When the knob 202 is rotated in the tightening direction, here in a clockwise direction, the pivoting arms 250 engage with the spool 230 and cause the spool 230 to wind the tightening member. When rotated in the tightening direction, the pivoting cams 203 of the knob 202 engage the pivoting notch 253 of the pivoting arms 250, causing the pivoting arms 250 to pivot forward in the tightening direction. When the pivoting arms 250 are pivoted forward in the tightening direction, the primary tooth 251 engages with spool teeth 231 of the spool 230, transferring the rotational force or torque from the knob 202 to the spool 230.

However, when the knob 202 is rotated in the loosening direction, here the counterclockwise direction, the primary tooth 251 disengages from the spool teeth 231 and the spool 230 is free to rotate. When the spool 230 is free to rotate, the spool 230 rotates in the loosening direction because of the tension member. When the lacing system 200 is in an engaged state, the tension member maintains rotational tension on the spool 230 in the loosening direction. However, because of the spool 230's engagement with the knob 202 via the pivoting cams 203 and the primary tooth 251, when the closure system is engaged, the spool 230 is rotatably locked and unable to move in the loosening direction.

As discussed above, the pivoting arms 250 are operationally engaged with the spool 230 in a manner that enables the pivoting arms 250 and knob 202 to be supported in one of two positions: the tightening engagement position and the loosening engagement position. In the tightening engagement position, the knob 202, via the pivoting cams 203 and pivoting notches 253, pivot the pivoting arms 250 in the clockwise direction (or counterclockwise in embodiments where counterclockwise is the tightening direction), so that the primary tooth 251 and the spool teeth 231 contact and engage one another. In the loosening engagement position, the pivoting cams 203 of the knob 202 disengage from the pivoting notches 253, pivoting the pivoting arm 250 in the counterclockwise direction about the pivoting aperture 255.

Without the pivoting cams 203 supplying a radial force to the primary tooth 251 and causing the primary tooth 251 to engage the spool teeth 231, the spool 230 is disengaged from the pawl disc 240, and in turn the housing teeth 221. Instead, the spool 230 is free to rotate in the loosening direction until the primary tooth 251 reengages with the spool teeth 231. Because of the force exerted by the tension member on the spool 230, whenever the spool 230 becomes disengaged from the pawl disc 240, the spool 230 freely rotates in the loosening direction. As the tension member becomes wound about the spool 230, its tension increases and thereby imparts a rotation force to the spool 230 in the loosing direction. The loosening force is counteracted by the interference between the spool teeth 231 and the primary tooth 251, which in turn creates interference between the pawls 241 and the housing teeth 221. The combination of these interferences result in the spool 230 being unable to rotate in the loosing direction when the pawl disc 240 is engaged with the spool 230 via the primary tooth 251. However, once the spool 230 is disengaged from the primary tooth 251, the spool 230 may freely rotate according to the rotation force imparted by the tension member.

During a turning of the knob 202 in the tightening direction (clockwise in this example), the pivoting cams 203 on the knob 202 transfer the rotational force of the knob 202 to the pivoting notches 253 on each of the pivoting arm 250, which in turn pivots the pivoting arms 250 forward and engage the primary tooth 251 with the spool teeth 231. Specifically, the primary tooth 251 engages with the substantially radial surface 238 of the spool teeth 231. Simultaneously, as the pivoting cams 203 are rotated in the clockwise direction with the knob 202, so are the drive cams 205. As the knob 202 is rotated the drive cams 205 inserted into the drive apertures 247 of the pawl disc 240 also rotate forward and engage the pawl disc 240, transferring the rotation force or torque of the knob 202 to the pawl disc 240. Once the pivoting cams 203 cause the primary tooth 251 to engage with the spool teeth 231, any rotation of the knob 202 in the clockwise direction is transferred to the spool 230 via the pawl disc 240's rotation, which in turn rotates the pivoting arms 250 that are operationally coupled to the pawl disc 240 via the axial posts 244.

In order to effectuate unwinding of the spool 230, the spool 230 must become free of the primary tooth 251. In the illustrated embodiment, this is accomplished by rotating the knob 202 in a counterclockwise, or loosening, direction through a predetermined angular displacement, which in one embodiment, is one quarter turn. As the knob 202 is rotated counterclockwise, the pivoting cams 203 disengage the pivoting notch 253 from pivoting the pivoting arms 250 in the clockwise direction, and instead engage the pivoting notches 253 in the clockwise direction, causing the pivoting arms 250 to pivot backwards. As noted above, once the pivoting arms 250 are pivoted backwards, the primary tooth 251 disengages from the spool teeth 231, and spool 230 is free to rotate in the loosening direction. The tension on the spool 230 rotates the spool 230 in the loosening direction while the primary tooth 251 of the pivoting arms 250 remains stationary. The pivoting arms 250 remain stationary when the spool 230 rotates in the loosening direction because the pivoting arms 250 are operationally coupled to the pawl disc 240, which is in turn engaged with the housing teeth 221 and unable to rotate in the counterclockwise position.

To stop the spool 230 from completely unwinding, the secondary tooth 252 is forced into engagement with the spool teeth 231 when the knob is rotated in the loosening direction, and the pivoting arms 250 are pivoted backwards accordingly. A small gap in spacing between the secondary tooth 252 and the spool teeth 231 allows the spool 230 to slightly rotate before the primary tooth 251 reengages with the next subsequent spool tooth 231.

As the pivoting arms 250 are pivoted backwards in the counterclockwise direction by rotation of the knob 202, the pawl spring 256 attached to the end of the pivoting arms 250 opposite of the secondary tooth 252 contacts and radially flexes against the housing teeth 221. The force exerted by the flexing pawl spring 256 deflects the pivoting arms 250 to pivot forward, back in the clockwise direction, causing the primary tooth 251 to reengage with the spool teeth 231.

In this manner, the spool 230 can be incrementally unwound by slight counterclockwise rotation of the knob 202. Each counterclockwise rotation of the knob 202 pivots the pivoting arms 250 backwards, releasing the spool 230 to rotate in the loosening direction. As the spool 230 rotates counterclockwise, the pawl spring 256 is forced to flex against the housing teeth 221 as the primary tooth 251 slides up the sloped portion 237 of the spool teeth 231. The flexed pawl spring 256 then deflects the pivoting arms 250 into the forward pivoting position upon the primary tooth 251 reaching the edge of the sloped portion 237. At this point, the primary tooth 251 reengages with the spool teeth 231 and the spool 230 is inhibited from rotating further in the clockwise direction.

During disengagement or loosening of the spool 230, the drive cams 205 positioned within the drive apertures 247 are allowed to slightly rotate in the loosening direction along with the slight rotation of the knob 202. The drive apertures 247 are slightly elongated to accommodate this rotation of the drive cams 205 in the counterclockwise direction without being impeded by the pawl disc 240. Since the pawl disc 240 is inhibited from rotating in the counterclockwise direction due to engagement between the pawls 241 and the housing teeth 221, the elongation of the drive apertures 247 allows the drive cams 205 to rotate in the counterclockwise direction with the knob 202 without being inhibited by the pawl disc 240.

Figure 3A:
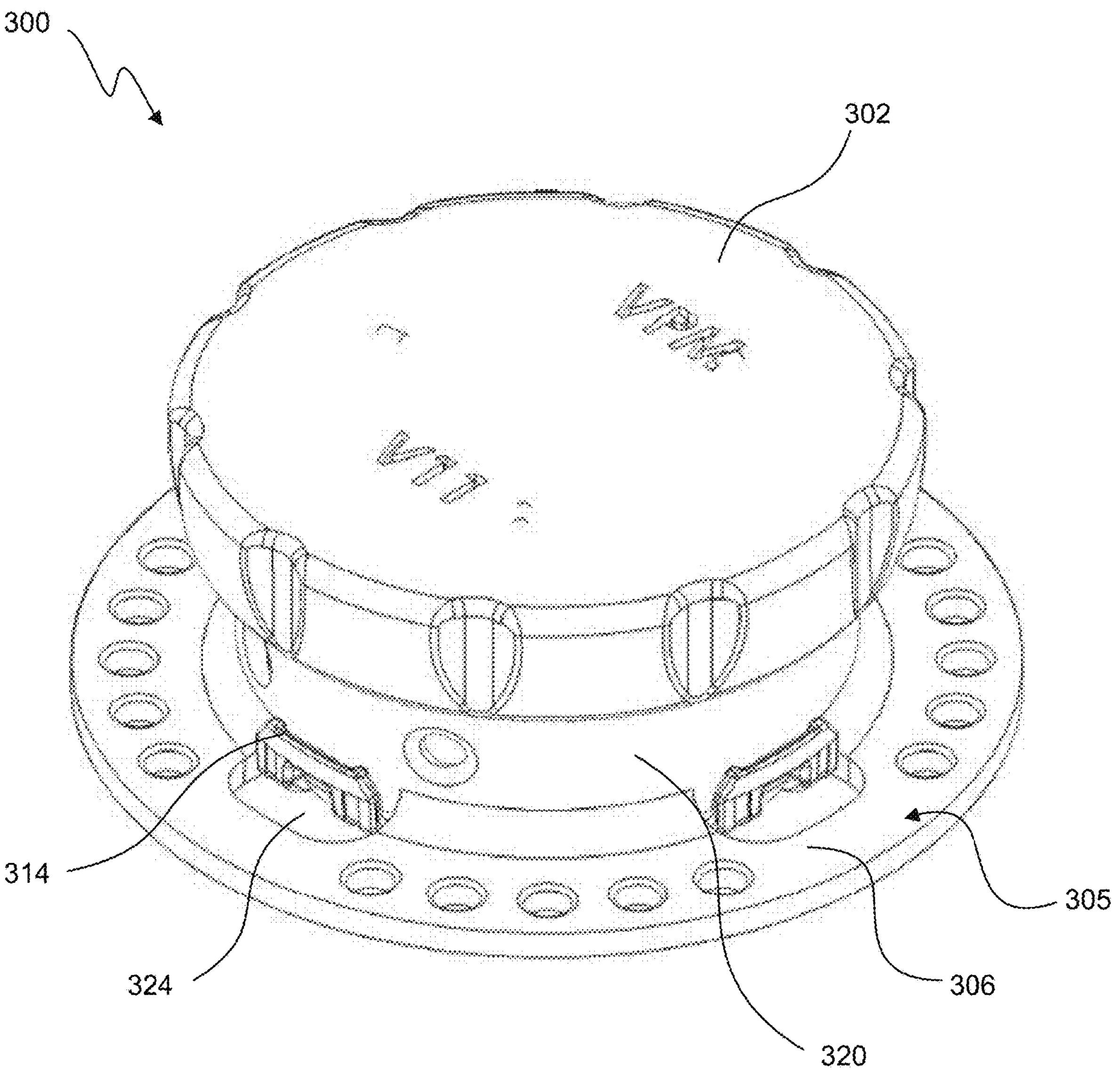
FIGS. 3A-F illustrate another embodiment of a reel based closure device that may be used to tighten an article.

Referring now to FIG. 3A, illustrated is a perspective view of a reel based closure device or system 300 (hereinafter closure system 300) in an assembled state. The closure system 300 includes a tightening component 302, such as a reel or knob (hereinafter knob 302), that is designed to be grasped and rotated by a user. The knob 302 is positioned with respect to the closure system 300 so that it is easily accessible to a user. The knob 302 is illustrated as having a circular profile or shape when viewed from a top surface, although various other knob shapes or configurations may be employed, such as hexagonal, octagonal, triangular, and the like. The knob 302 is rotatably attached to a housing or housing component 320 (hereinafter housing 320) that is in turn attached to a housing base member or bayonet 305 (hereinafter housing base 305). The housing 320 includes an interior region within which one or more components of the closure system 300 are positioned. The housing base 305 is configured to be attached to the article (e.g., shoe, boot, etc.) that employs the closure system 300 for adjusting the tightness or fit of the article. For example, the housing base 305 includes a flange 306 that may be stitched, adhered, adhesively bonded, welded (RF, ultrasonic, etc.), or otherwise attached to the article. In some instances, the housing base 305 or flange 306 may be insert molded onto the article that employs the closure system 300. Details of the attachment or coupling of the knob 302, housing 320, and housing base 305 are provided in greater detail below.

Figure 3B:
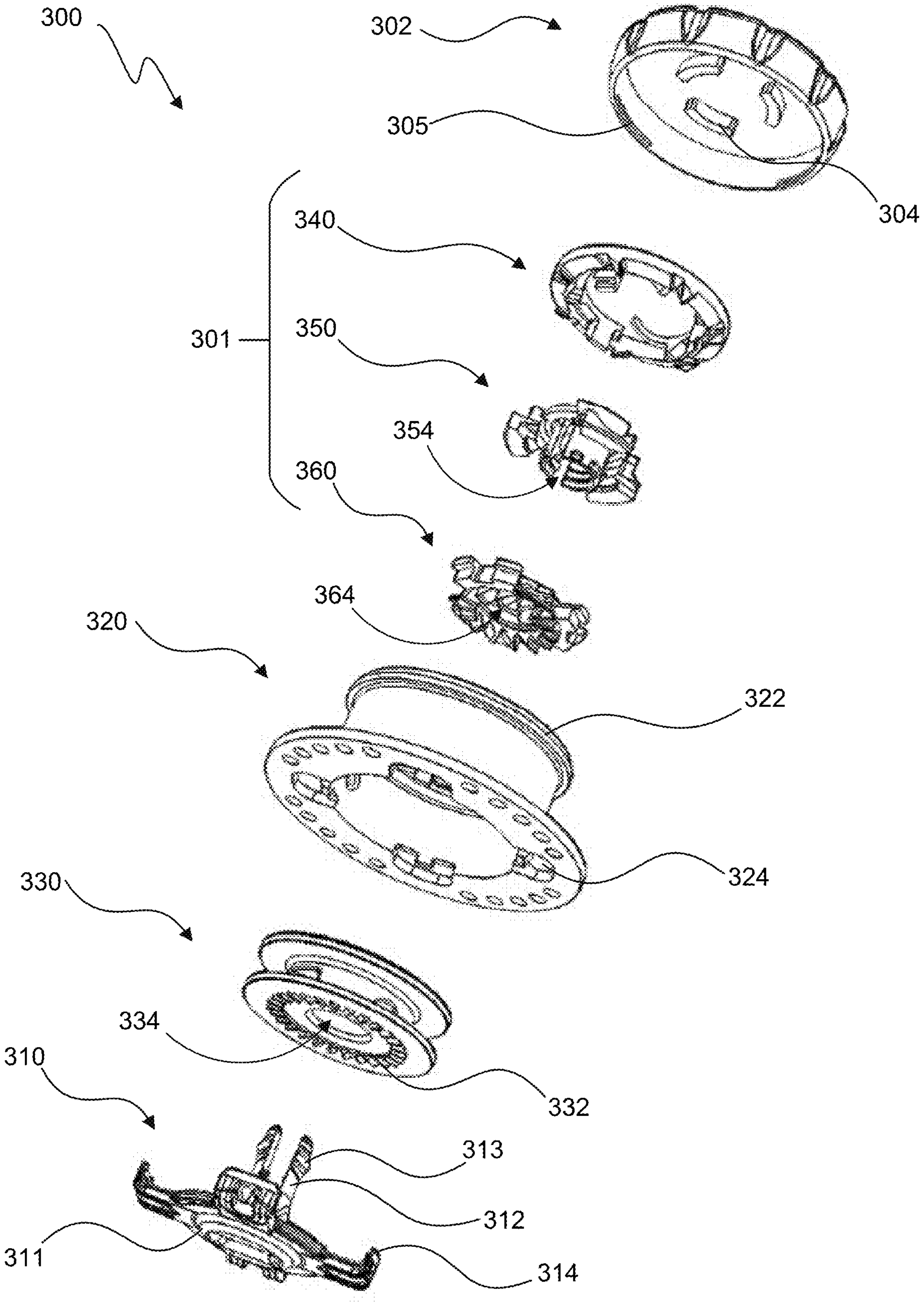
Figure 3C:
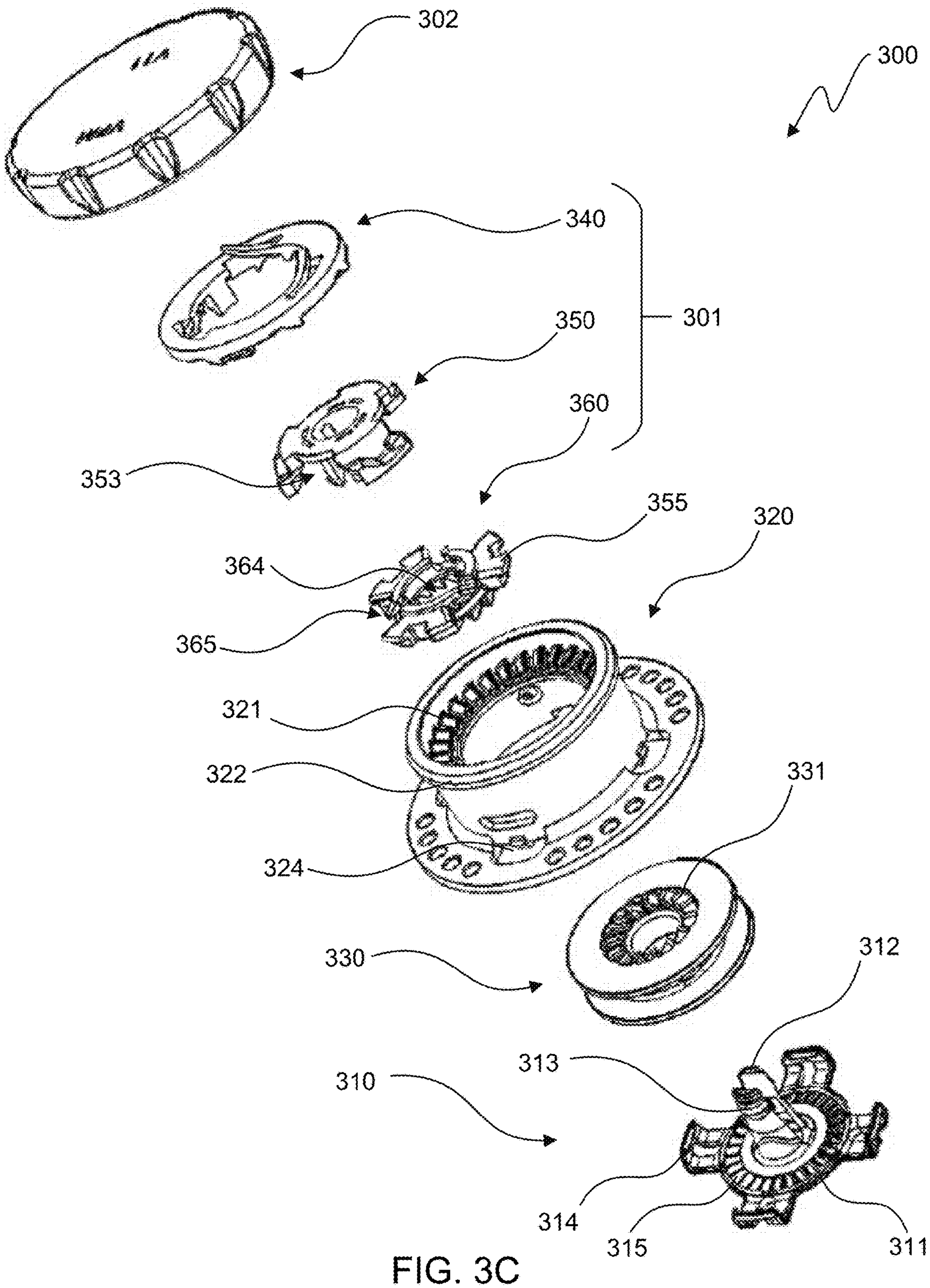
Figure 3D:
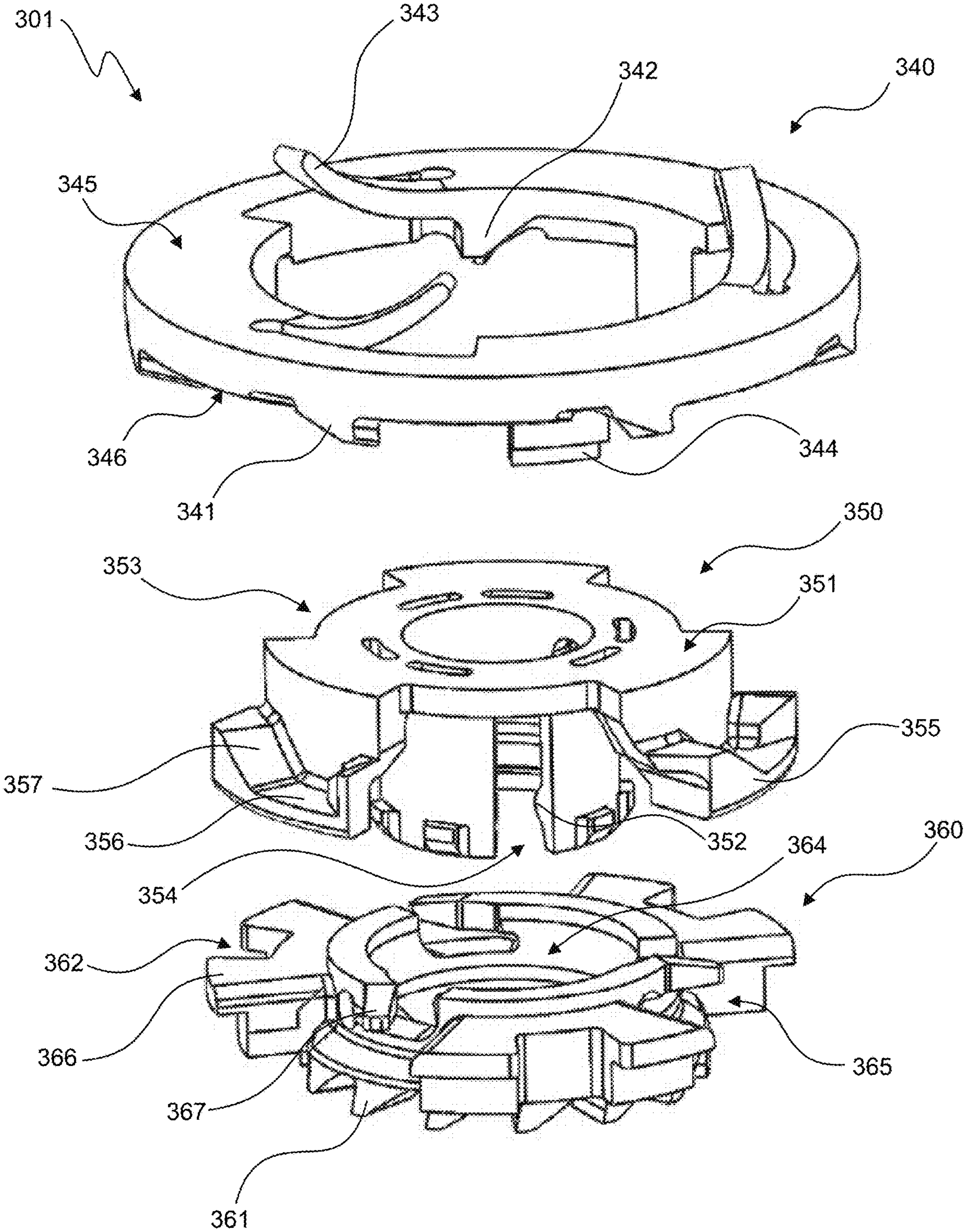

FIGS. 3B and 3C illustrate exploded perspective views of the closure system 300. Additional details of the knob 302, housing 320, and the housing base 305 are evident in the exploded perspective views of FIGS. 3B-C. Additional components of the closure system 300 are also illustrated in the exploded perspective views of FIGS. 3B-C. These additional components are housed or contained within the housing 320 of the closure system 300 when the system is assembled and thus, these additional components are typically not visible in the assembled view of the closure system 300. The additional components include a spool component 330, a coupling component 310, and a clutch mechanism 301. The clutch mechanism 301 includes a clutch disc 340, a knob core 350, and a face clutch 360. The clutch mechanism 301 is provided and discussed in greater detail in FIG. 3D.

The spool component 330 (hereinafter spool 330) is rotatably positioned within the interior region of the housing 320 and is configured so that a tension member (not shown) is windable about the spool 330 to tension the tension member and tighten the article. The clutch mechanism 301 is positioned axially above the spool 330 within the interior region of the housing 320. The clutch mechanism 301 operably couples the spool 330 with the housing 320 and the knob 302 to allow the spool 330 to rotate in a first direction while preventing rotation of the spool in the second direction.

The spool 330 is rotatably coupled with the housing 320 by the coupling component 310. The coupling component 310 is positioned axially below the spool 330 and includes a central boss 312 that protrudes axially upward from a base 311 of the coupling component 310 into the interior region of the housing 320. The spool 330 is rotationally positioned about the coupling component 310 by inserting the central boss 312 through a central aperture or opening 334 of the spool 330. The spool 330 is able to spin or rotate about the central boss 312 with negligible friction or drag. A top or distal portion of the central boss 312 is inserted through the clutch mechanism 301 and frictionally engages with a face clutch aperture or opening 364 of the face clutch 360 and a knob core aperture or opening 354 of the knob core 350 to rotationally position the spool 330 about the central boss 312.

The knob core 350 operably engages with the top end of the boss 312 in a manner that enables the clutch mechanism 301 to be supported in two positions. The coupling component 310 frictionally engages with the clutch mechanism 301—specifically the knob core 350—to maintain the clutch mechanism 301 in a first position or a second position. The clutch mechanism 301 may move or transition to the first position in response to a first operation of the knob 302 and may similarly move or transition to the second position in response to a second operation of the knob 302. For example, the first operation of the knob 302 may be pushing or pressing the knob 302 downwards towards the housing 320, which may cause the clutch mechanism 301 to engage with the housing 320. Alternatively, the first operation of the knob 302 may be rotating the knob 302 in a second direction, actuation a button or lever mechanism, or some other operation of the knob or another component. The second operation of the knob 302 may be pulling the knob 302 upward and away from the housing 320, which may cause the clutch mechanism 301 to disengage the housing 320. Alternatively, the second operation of the knob 302 may be rotating the knob 302 in a first direction, actuation a button or lever mechanism, or some other operation of the knob or another component. The coupling component 310 may maintain the clutch mechanism 301 in the first position (i.e., in an engaged state) so that the clutch mechanism 301 remains engaged with the housing 320 and/or may maintain the clutch mechanism 301 in the second position (i.e., in a disengaged state) so that the clutch mechanism 301 remains disengaged from the housing 320.

A plurality of coupling arms 314 are positioned radially around the annular periphery of the base 311 of the coupling component 310. The coupling arms 314 removably couple the coupling component 310 with the housing 320. As illustrated in FIGS. 3B and 3C, the coupling arms 314 extend axially upward from the base 311. When the closure system 300 is assembled, the coupling arms 314 are inserted through a plurality of coupling apertures or openings 324 on the housing 320 to removably couple the coupling component 310 to the housing 320. As depicted in FIG. 3A, the coupling arms 314 may be inserted through coupling apertures 324 of the housing base 305 such that the base 311 functions as a bottom end of the housing 320 and a bottom surface of the base 311 is flush or aligned with a bottom surface of the housing base 305. In some instances, the coupling arms 314 may be configured to frictionally engage an exterior surface of the housing 320 to affix the coupling component 310 to the housing 320.

Figure 3E:
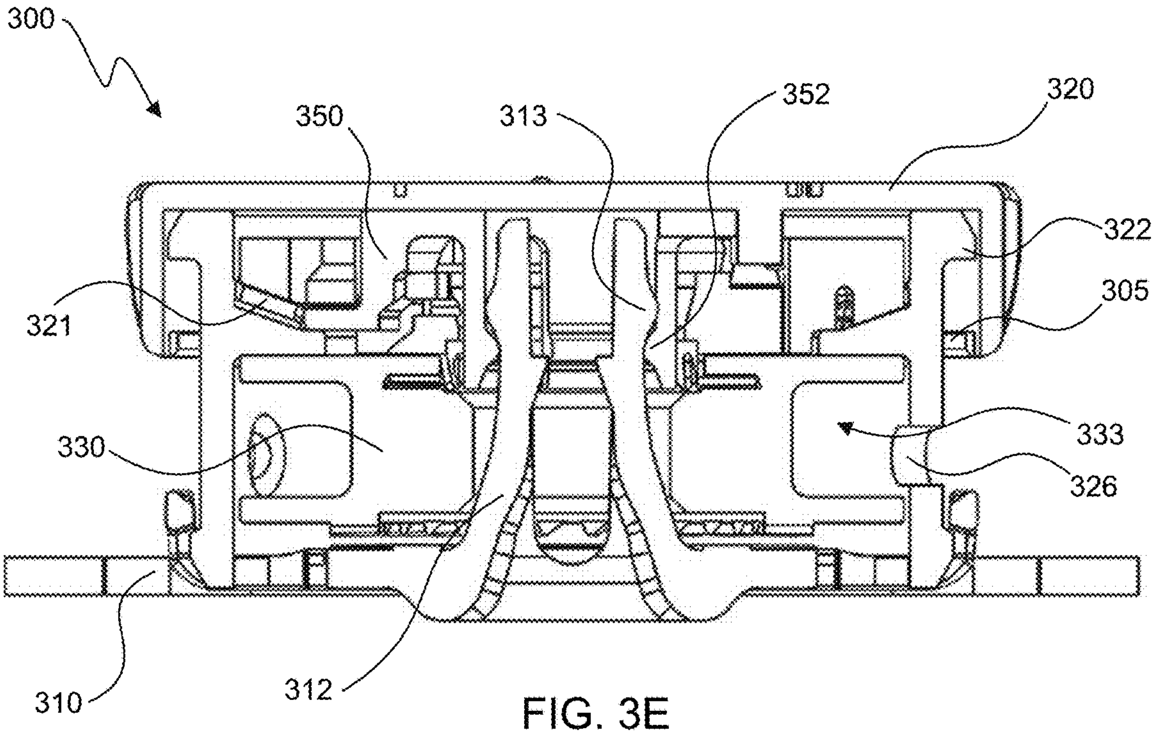
Figure 3F:
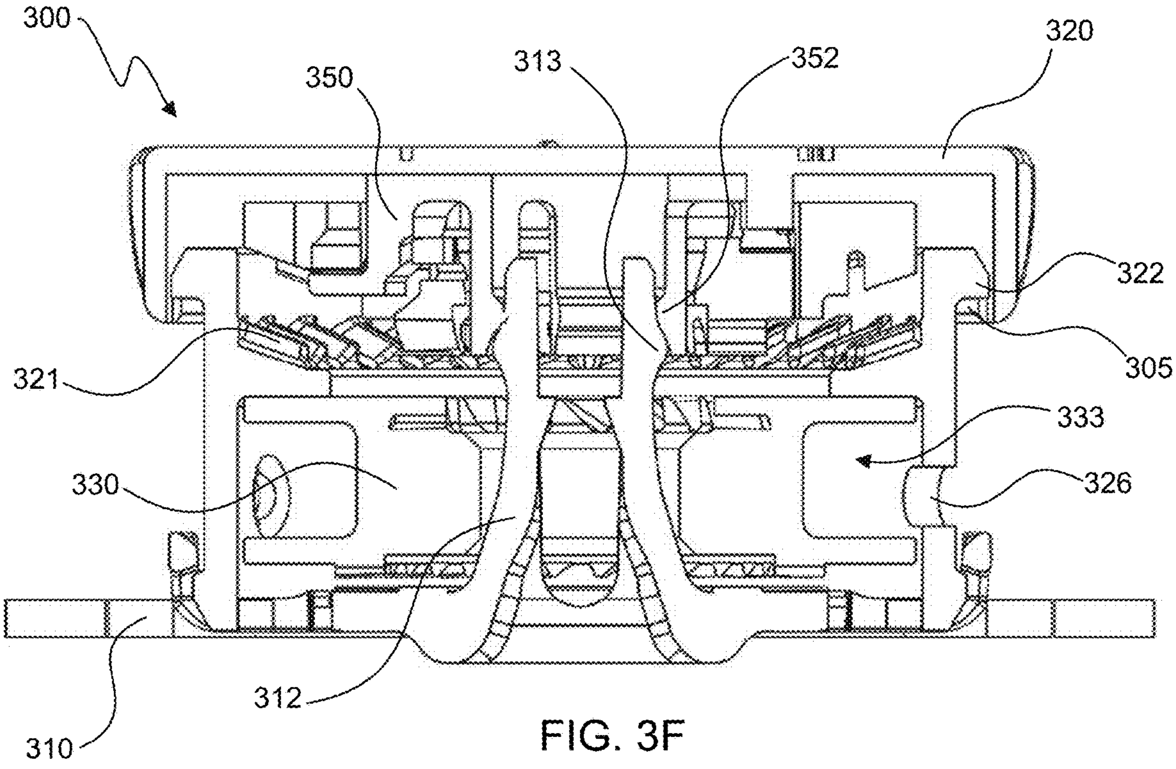

FIGS. 3E and 3F illustrate the closure system 300 in the first position and the second position, respectively. As illustrated in FIG. 3E, the knob core 350 includes an engagement tab or feature 352 and the distal end of the central boss 312 includes an annular projection 313. The engagement tab 352 and the annular projection 313 are configured to maintain the clutch mechanism 301 in the first position in which a plurality of clutch teeth 361 on the face clutch 360 engage with a plurality of spool teeth 331 on the spool 330 and/or in which disc teeth 341 of the clutch disc 340 engage with housing teeth 321 of the housing 320. Engagement of said teeth operably couple the spool 330 to the housing 320. The disc teeth 341 may be coupled with the housing teeth 321 in a ratchet-like manner. The clutch disc 340 operably couples the housing 320 with the spool 330, which allows the spool 330 to rotate in a first direction, while preventing rotation of the spool 330 in a second direction.

In the first position, the engagement tab 352 is positioned axially below the central boss's annular projection 313. The annular projection 313 has a diameter that is larger than a diameter of, or defined by, the engagement tab 352. Since the diameter of the engagement tab 352 is smaller than the diameter of the annular projection 313, the annular projection 313 interferes with, or impedes, the engagement tab 352 and knob core 350 from being moved axially upward and above the annular projection. In this manner, the knob core 350 is maintained in a downward position relative to the annular projection 313, which maintains the closure system 300 in the first position illustrated in FIG. 3E.

FIG. 3F illustrates the closure system 300 in the second position. In the second position, the clutch mechanism 301 and/or the knob 302 are positioned axially upward with respect to the housing 320 and the spool 330. In the second position, the plurality of clutch teeth 361 are disengaged from the plurality of spool teeth 331 and/or the disc teeth 341 are disengaged from the housing teeth 321, which decouples the spool 330 from the housing 320 and allows the spool 330 to freely rotate in a second or loosening direction. In the second position, the engagement tab 352 of the knob core 350 is positioned axially above the annular projection 313 of the coupling component 310. The smaller diameter of the engagement tab 352 relative to the annular projection 313 causes the annular projection 313 to interfere with, or impede, the engagement tab 352 and knob core 350 from being moved axially downward and below the annular projection 313. In this manner, the knob core 350 is maintained in an upward position relative to the annular projection 313, which maintains the closure system 300 in the second position illustrated in FIG. 3F.

The closure system 300 may be maintained in the second position by engagement of the engagement tab 352 and annular projection 313 until a force is applied by a user, or otherwise, that causes the engagement tab 352 and knob core 350 to move axially downwards relative the housing 320. The downward movement of the knob core 350 causes the engagement tab 352 to slide over the annular projection 313, which forces distal ends of the central boss 312 to flex radially inwards, thereby reducing a diameter of the annular projection 313. The reduced diameter of the annular projection allows the engagement tab 352 to slide over the annular projection 313 to the first position illustrated in FIG. 3E. Similarly, the closure system 300 may be maintained in the first position by engagement of the engagement tab 352 and annular projection 313 until a force is applied by a user, or otherwise, that causes the engagement tab 352 and knob core 350 to move axially upwards relative the housing 320. The upward movement of the knob core 350 causes the distal ends of the central boss 312 to flex radially inwards, which allows the engagement tab 352 to slide upward and over the annular projection 313 to the second position illustrated in FIG. 3F.

To keep the knob 302 from decoupling from the housing 320, the housing 320 includes an annular ledge 322 that extends around the exterior circumference of the top of the housing 320. The annular ledge 322 is configured to engage with one or more tabs 307 on the knob 302, via an interference fit, to maintain the coupling of the knob 302 and housing 320. Stated differently, the engagement of the one or more tabs 307 with the annular ledge 322 prevents the knob 302 from being decoupled or detached from the housing 320 unless an exceptional force is applied to the knob 302.

Engagement between the clutch mechanism 301 and the housing 320 is configured to allow the spool 330 to rotate in the first direction (i.e., tightening direction) while preventing rotation of the spool 330 in the second direction (e.g., a loosening direction) within the housing 320. The tightening direction may be a clockwise or a counterclockwise direction as desired while the loosening direction would be an opposite direction. As the spool 330 is rotated in the tightening direction, a lace, cord, or tension member (not shown) that is attached to the spool 330 is wound around a central portion or channel 333 of the spool 330. FIGS. 3E and 3F provide a cross-sectional view of the closure system 300, specifically illustrating the central channel 333 of the spool 330 and the configuration of the central channel 333 in relation to an entry hole 326 for the lace, cord, or tension member (hereinafter tension member). When assembled, the tension member is inserted through the entry hole 326 and is configured to wind about the spool 330 within the central channel 333 when the spool 330 is rotated in the tightening direction. In some cases, the tension member is fixed, either removably or nonremovably to the spool 330.

One-way ratcheting of the spool is provided by engagement between the disc teeth 341 and the housing teeth 321. In the first position illustrated in FIG. 3E, the disc teeth 341 engage with the housing teeth 321 that are positioned about the circumference of the interior region of the housing 320 to allow the clutch disc 340 to rotate in the first direction, while preventing rotation of the clutch disc 340 in the second direction. When the closure system 300 is in the second position, the disc teeth 341 disengage from the housing teeth 321, thereby allowing for the spool 330 to be rotated in the second direction.

The knob 302 is operably coupled to the spool 330 via the clutch mechanism 301 to allow for incremental tightening and incremental loosening of the closure system 300. On a bottom surface of the knob 302 are a plurality of drive components 304. The plurality of drive components 304 are configured to fit within a plurality of drive recesses 353 on the knob core 350. When the closure system 300 is positioned in the first position and the knob 302 is rotated in either the first direction (i.e., tightening direction) or the second direction (i.e., loosening direction), the drive components 304 on the bottom surface of the knob 302 engage with corresponding surfaces or edges of the drive recesses 353 to transfer rotational forces or torque to the knob core 350. Because of the engagement between the drive recesses 353 and the drive components 304, the knob core 350 is operably coupled to the knob 302 such that rotation of the knob 302 results in a corresponding rotation of the knob core 350. When in the first position, the knob core 350 transfers rotational forces or torque to the spool 330 due to the operational coupling of the knob core 350 and the spool 330. When in the second position, the knob core 350 does not transfer rotational forces or torque to the spool 330 due to the uncoupling of the knob core 350 and spool 330.

The knob core 350 is operably coupled with the face clutch 360 to transfer rotation or torque from the knob 302 to the spool 330. The knob core 350 is operably coupled to the face clutch 360 by a plurality of tabs that extend radially outward from a central cylindrical hub of the knob core. Along the radial periphery of the knob core 350 are a plurality of ramp arms 355 that extend axially downwards from a top surface 351 of the knob core 350 towards the face clutch 360. The ramp arms 355 are configured to fit into a plurality of recesses 365 positioned along the periphery of the face clutch 360. The recesses 365 on the face clutch 360 are slightly oversized (i.e., elongated) compared to the ramp arms 355 which allows slight rotation of the knob core 350 with respect to the face clutch 360. The slight elongation of the recesses 365 allows the knob 302 to rotate the knob core 350 slightly in either the first direction (i.e., tightening direction) or the second direction (i.e., the loosening direction) without transferring the rotational force to the face clutch 360. A spring mechanism is typically positioned between the knob core 350 and the face clutch 360 when the closure system 300 is assembled. In such embodiments, the spring mechanism isolates the face clutch 360 from the knob 302 such that a user rotating the knob 302 is unable to feel any axial movement of the clutch mechanism 301 as the spool 330 is incrementally tightened or loosened.

On a bottom surface of the face clutch 360 are a plurality of clutch teeth 361 that are configured to operably couple with a plurality of spool teeth 331 positioned on a top surface of the spool 330. Both the clutch teeth 361 and the spool teeth 331 include sloped surfaces and wall surfaces that engage with each other in a ratchet-like manner. The sloped surfaces of the clutch teeth 361 match the sloped surfaces of the spool teeth 331 such that the teeth are able to slide over one another during rotation in the second direction while preventing rotation in the opposite (i.e., first) direction. During rotation of the knob 302 in the first direction, the face clutch 360 is also rotated in the first direction due to the coupling of the knob 302, knob core 350, and face clutch 360. Due to the orientation of the clutch teeth 361, when the face clutch 360 rotates in the first direction, the wall surfaces of the clutch teeth 361 engage with the wall surfaces on the spool teeth 331. This engagement between the clutch teeth 361 and the spool teeth 331 allows the face clutch 360 to transfer the rotational force or torque from the knob 302 to the spool 330. Stated differently, when the closure system is positioned in in the first position and the knob 302 is rotated in the first direction, the spool 330 rotates in the first direction due to the spool 330 being engaged with the face clutch 360.

To provide for incremental rotation of the spool 330 in the first direction (i.e., incremental tightening of the spool 330), the face clutch 360 is operably coupled with the clutch disc 340, which provides the one-way ratchet mechanism between the housing 320 and the spool 330 described herein. As illustrated, the clutch disc 340 is configured in an essentially radially flat annular configuration, having a radially interior circumference and a radially exterior circumference. The clutch disc 340 includes a top surface 345 and a bottom surface 346. Along the radially exterior circumference on the bottom surface 346 are a plurality of disc teeth 341. The plurality of disc teeth 341 are oriented axially downwards towards the spool 330 and housing 320 and are configured to engage with the housing teeth 321. Along the radially interior circumference of the bottom surface 346 are a plurality of clutch engagement members 344 and a plurality of ramp teeth 342. Along the radially interior circumference of the top surface 345 of the clutch disc 340 are a plurality of cantilevered arms 343 which extend axially upwards towards the knob 302 from the top surface 345.

Engagement between the housing teeth 321 and the disc teeth 341 allows for one-way ratcheting of the spool 330. As described above, when the closure system is in the first position and the knob 302 is rotated in the first direction, rotation of the knob 302 is transferred by the face clutch 360 to the spool 330. As the knob 302 rotates in the first direction, the spool 330 also rotates in the first direction due to engagement between the clutch teeth 361 and the spool teeth 331. The clutch disc 340 also rotates in the first direction as the knob 302 rotates due to coupling between the knob 302 and the face clutch 360, and coupling between the face clutch 360 and the clutch disc 340. As illustrated on FIG. 3D, the clutch engagement members 344 extend axially downwards from the clutch disc 340 along the radially interior circumference of the bottom surface 346. The clutch engagement members 344 are configured to operably couple and engage with a plurality of clutch engagement recesses 362 that are formed in radial arms that extend radially outward from a circumference of the face clutch 360. The clutch engagement recesses are configured to fit or mate with one of the clutch engagement members 344. When the closure system 300 is assembled, the clutch engagement members 344 fit into the clutch engagement recesses 362, which rotationally couples the clutch disc 340 to the face clutch 360 such that the clutch disc 340 and the face clutch 360 function as a unitary component.

The housing teeth 321 and the disc teeth 341 include sloped surfaces and wall surfaces. Similar to the sloped surfaces of the clutch teeth 361 and the spool teeth 331, the sloped surfaces of the housing teeth 321 and the disc teeth 341 allow the teeth to slide over one another during rotation of the knob 302 in the first direction, which allows the clutch disc 340 to rotate in the first direction relative to the housing 320. The housing teeth 321 and the disc teeth 341 prevent rotation of the clutch disc 340 in the opposite (i.e., second) direction relative to the housing 320. The sloped surfaces of the housing teeth 321 and the disc teeth 341 allow the disc teeth 341 to axially slide up, deflecting over the housing teeth 321 as the clutch disc 340 rotates in conjunction with the rotation of the face clutch 360. As the clutch disc 340 rotates in the first direction along with the face clutch 360 and the knob 302, the disc teeth 341 on the clutch disc 340 slide over the sloped surfaces of the housing teeth 321.

As the disc teeth 341 slide up and over the housing teeth 321, the clutch disc 340 is driven axially upwards towards the knob 302. The cantilevered arms 343 on the clutch disc 340, positioned and oriented to extend between the clutch disc 340 and the knob 302, deflect axially downwards as the clutch disc 340 is driven axially upwards. The cantilevered arms 343 provide a downward biasing force to the clutch disc 340 as the clutch disc 340 moves axially within the housing 320. As the clutch disc 340 is driven upwards towards the knob 302 as the disc teeth 341 slide up and over the sloped surfaces of the housing teeth 321, the cantilevered arms 343 flex or compress against the bottom surface of the knob 302, generating recoil or downward biasing force. Once the disc teeth 341 slide over the top of the housing teeth 321, the recoil or biasing force generated by the cantilevered arms 343 drives the clutch disc 340 downwards again, causing the disc teeth 341 to reengage with the housing teeth 321. The face clutch 360 rotates in the first direction with the clutch disc 340 due to the rotational coupling of the two components. The face clutch 360 drives a rotation of the spool 330 in the first direction due to the coupling of the two components. In this manner, rotation of the knob 302 in the first direction allows for incremental rotation of the spool 330 in the first direction, which enables incremental tightening of a tension member that is attached to the spool 330.

Tension on the tension member that is wound around the spool 330 exerts a rotational force or torque on the spool 330 in the second direction (i.e., the loosening direction). To prevent the spool 330 from rotating in the second direction (i.e., the loosening direction) due to the rotational force exerted by the tension member, the disc teeth 341 engage with the housing teeth 321. Engagement of the wall surfaces of the housing teeth 321 and the disc teeth 341 prevents rotation of the clutch disc 340 in the second direction (i.e., loosening direction). Because the clutch disc 340 is rotationally coupled to the face clutch 360, the engagement of the housing teeth 321 and the disc teeth 341 prevent rotation of the face clutch 360 as well. The force or torque exerted by the tension member on the spool 330 drives the spool teeth 331 to engage with the clutch teeth 361, which prevents the spool 330 from rotating in the loosening direction due to the rotational coupling of the spool 330, face clutch 360, clutch disc 340, and housing 320. Stated differently, because the clutch disc 340 is operably coupled with the spool 330, any force preventing the clutch disc 340 from rotating in the second direction, likewise prevents the spool 330 from rotating in the second direction. In this manner, the spool 330 is prevented from rotating in the second direction (i.e., the loosening direction), when the disc teeth 341 engage with the housing teeth 321.

To enable incremental loosening of the tension member, the closure system 300 is configured to allow incremental rotation of the spool 330 in the second direction (i.e., the loosening direction). As noted above, a counter force or torque is exerted on the spool 330 due to tension imparted by the tension member. To allow the spool 330 to rotate in the second direction, the disc teeth 341 may be temporarily disengaged from the housing teeth 321. To disengage the disc teeth 341, the clutch disc 340 includes a plurality of ramp teeth 342 that are positioned along the radially interior circumference of the bottom surface 346 of the clutch disc 340. The ramp teeth 342 engage with corresponding recesses 356 formed on the ramp arms 355 of the knob core 350. The recesses 356 each include a sloped surface 357 that mirrors a sloped surface of the ramp teeth 342, which enables the ramp teeth 342 to slide up the sloped surface 357 as the knob core 350 is rotated in the second direction relative to the clutch disc 340. Movement of the ramp teeth 342 up the sloped surface 357 causes the disc teeth 341 to disengage from the housing teeth 321. As the knob 302 is rotated in the second direction (i.e., the loosening direction), the knob core 350 also rotates in the second direction due to the rotational coupling of the knob 302 and knob core 350. Because the clutch disc 340 and the face clutch 360 are engaged with the housing teeth 321 and rotationally locked to the housing 320, the clutch disc 340 and the face clutch 360 remain stationary as the knob 302 and the knob core 350 begin to rotate in the second direction. The elongation of the recesses 365 on the face clutch 360 allow the knob core 350 to rotate relative to the face clutch 360 and clutch disc 340 without rotating either component.

Rotation of the knob 302 in the second direction, causes the knob core 350 to rotate along with the knob 302 within the recesses 365 of the face clutch 360. Rotation of the knob core 350 relative to the clutch disc 340 causes the sloped surface 357 to contact and engage the ramp teeth 342 on the clutch disc 340. Further rotation of the knob 302 in the second direction causes the ramp teeth 342 to slid up the sloped surface 357, which causes the clutch disc 340 to move axially upwards and away from the knob core 350. When the clutch disc 340 is driven axially upwards, the disc teeth 341 on the clutch disc 340 move axially away from the housing teeth 321, thereby disengaging the clutch disc 340 from the housing 320. Once the disc teeth 341 become disengaged from the housing teeth 321, the clutch disc 340 and the face clutch 360 are able to rotate along with the knob 302 and the knob core 350 in the second direction. Rotation of the clutch disc 340 and the face clutch 360 in the second direction is typically caused by the torque or force that is exerted on the spool 330 by the tension member. Specifically, one the disc teeth 341 disengage from the housing teeth 321, the spool 330 is no longer rotationally locked to the housing 320 and thus, the spool 330 is able to spin in the second direction due to the torque or force exerted on the spool 330 by the tension member.

To prevent complete loosening of the spool 330 and to provide incremental loosening of the spool 330, the cantilevered arms 343 positioned on the clutch disc 340 bias the clutch disc 340 downwards and towards the knob core 350. As the spool 330 rotates in the second direction due to the torque or force exerted on the spool 330 by the tension member, the rotation of the spool 330 causes the knob core 350 and clutch disc 340 to rotate in the second direction. Rotation of the clutch disc 340 in the second direction causes the ramp teeth 342 to rotate out of engagement with the sloped surface 357, which allows the clutch disc 340 to move axially downward relative to the knob core 350 and housing 320. The cantilevered arms 343 force or bias the clutch disc 340 to move downward relative to the knob core 350 and housing 320, which reengages the disc teeth 341 and the housing teeth 321, thereby rotationally locking the spool 330 to the housing 320, which arrests further rotation of the spool 330 in the second direction. The clutch mechanism 301 is typically configured so that the disengagement and reengagement of the disc teeth 341 and the housing teeth 321 occurs on a tooth by tooth basis. As such, the degree of loosening can be adjusted by adjusting the number of disc teeth 341 and housing teeth 321.

In some embodiments, it may be desirable to add a resistance member 367 to the face clutch 360 to provide a desired level of resistance during incremental loosening of the closure system 300. The level of resistance may be selected to eliminate or minimize accidental incremental loosening of the spool 330. For example, without the use of a resistance member 367, the knob 302 may be able to brush against an object as a user passes by the object, which may cause the knob 302 to rotate in the second direction (i.e., loosening direction) and incrementally loosen the spool 330. The resistance member 367 may minimize such accidentally loosening by resisting rotation of the knob 302 in the second direction. To resist rotation of the knob 302 in the second direction, the resistance member 367 may be positioned within the recesses 365 of the face clutch 360 so that the resistance member 367 extends radially at an angle from the face clutch 360 into the recess 365. The resistance member 367 may engage a radially angled surface on the underside of the ramp arms 355 of the knob core 350 as the face clutch 360 is rotated in the second direction (i.e., loosening direction) relative to the knob core 350. As the face clutch 360 rotates in the second direction relative to the knob core 350, the resistance member 367 may be flexed or deflected radially inward by the radially angled surface of the ramp arms 355. The inward flexing or deflection of the resistance member 367 provides a slight biasing forces that is counter to rotation of the face clutch 360 in the second direction. As such, the resistance member 367 provides a resistive force that resists rotation of the face clutch 360 in the second direction relative to the knob core 350 and in turn resists rotation of the knob 302 in the second direction. This resistive force minimizes or prevents accidental loosening of the closure system 300. The resistive force may be selected or set so that accidental loosening is prevented while user initiated loosening is not substantially impacted.

To prevent the spool 330 from unwinding past the end of the tension member, and thereby causing the tension member to wind around the central channel 333 in a wrong direction, the coupling component 310 includes a plurality of teeth 315 that are arranged circumferentially around the central boss 312. The plurality of teeth 315 are configured to engage with a plurality of bottom teeth 332 that are positioned on a bottom surface of the spool 330. The plurality of teeth 315 function in a similar manner to the spool engagement feature 138 described herein so that when the tension member is ejected from the central channel 333, the spool 330 moves axially downward within the housing 320 and the bottom teeth 332 engage the plurality of teeth 315 of the coupling component. Engagement of the two sets of teeth prevents the spool 330 from rotating in the second direction, thereby preventing unwinding of the spool 330 past the end of the tension member.

Figure 4A:
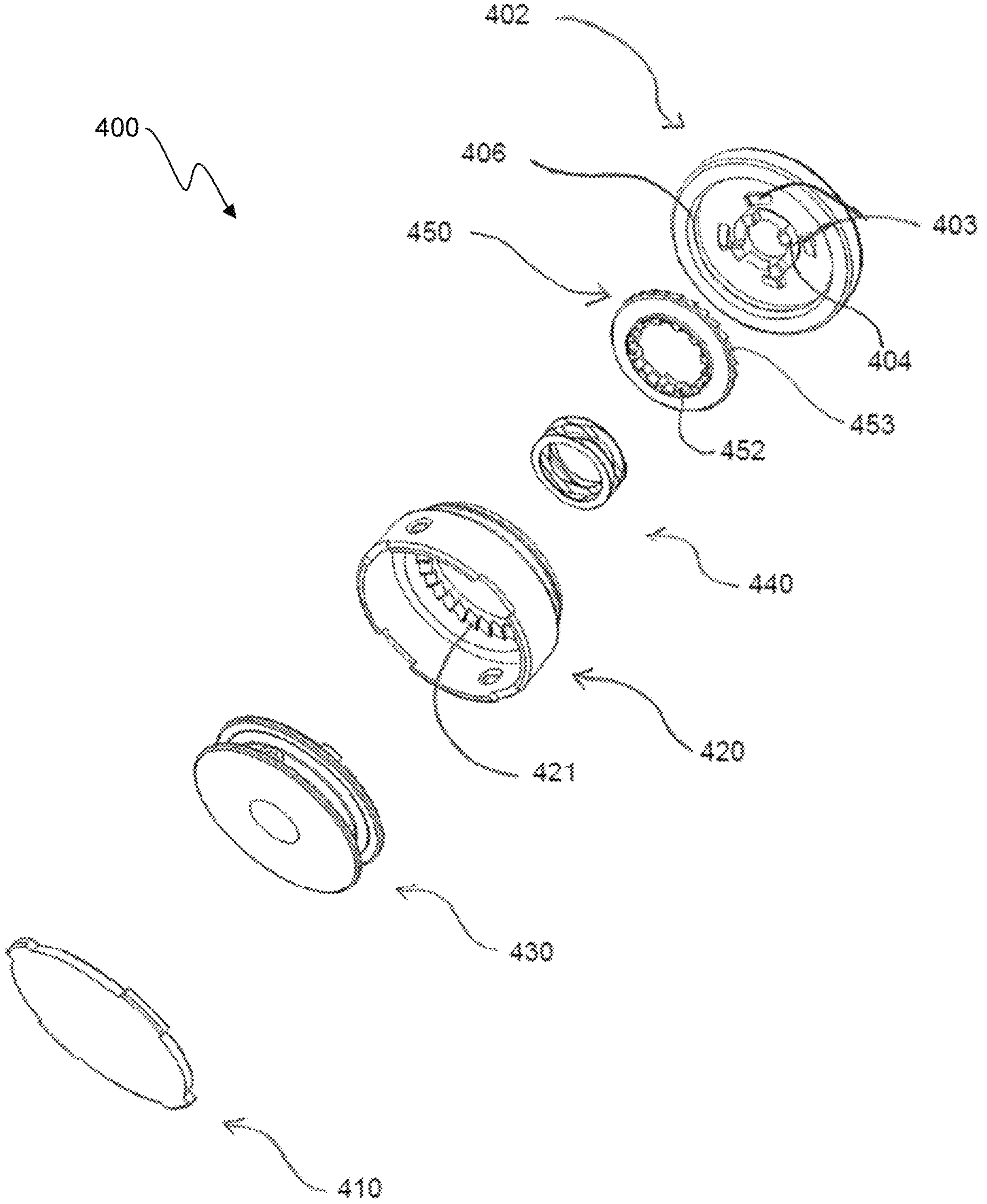
FIGS. 4A-B illustrate another embodiment of a reel based closure device that may be used to tighten an article.
Figure 4B:
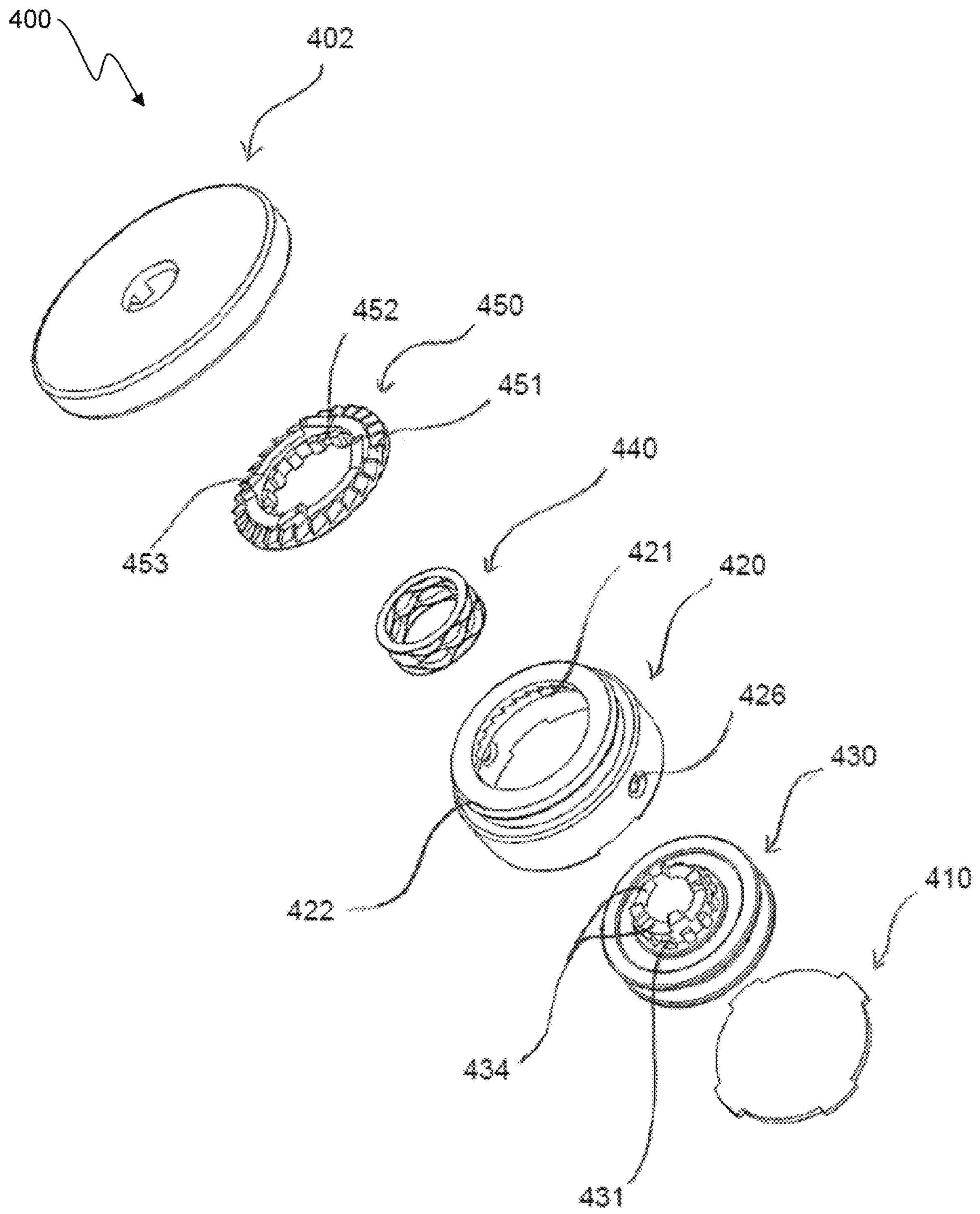

Turning now to FIGS. 4A and 4B which illustrate exploded perspective views of a reel based closure device or system 400 (hereinafter closure system 400). The closure system 400 includes a tightening component 402, such as a reel or knob (hereinafter knob 402), that is designed to be grasped and rotated by a user. The knob 402 is positioned with respect to the closure system 400 so that it is easily accessible to a user. The knob 402 is illustrated as having a circular profile or shape when viewed from a top surface, although various other knob shapes or configurations may be employed, such as hexagonal, octagonal, triangular, and the like. The knob 402 is attached to a housing or housing component 420 (hereinafter housing 420) that is in turn removably attached to a housing base member or bayonet 410 (hereinafter housing base 410). The housing base 410 is configured to be attached to the article (e.g., shoe, boot, etc.) that employs the closure system 400 for adjusting the tightness or fit of the article. For example, the housing base

410 may include a flange (not shown) that may be stitched, adhered, adhesively bonded, welded (RF, ultrasonic, etc.), or otherwise attached to the article. In some instances, the housing base 410 or the flange may be insert molded onto the article that employs the closure system 400.

The housing 420 includes an interior region within which one or more components of the closure system 400 are positioned when the closure system 400 is assembled. The one or more components of the closure system 400 are illustrated in the exploded perspective views of FIGS. 4A and 4B. These components are housed or contained within the housing 420 of the closure system 400 when the system is assembled. Thus, when the closure system 400 is assembled, the one or more components are typically not visible. These components include a spool component 430 (hereinafter spool 430), a spring component 440, and a clutch disc 450.

The spool 430 is rotatably positioned within the interior region of the housing 420 and is configured so that a tension member (not shown) is windable about the spool 430 in order to tension the tension member and tighten the article. The spool 430 is positioned axially above the housing base 410 such that the spool 430 is able to spin or rotate with negligible friction or drag within the interior region of the housing 420. The spool 430 is operably coupled with the knob 402. A plurality of drive cams 404 positioned on a bottom surface of the knob 402 and axially oriented towards the spool 430, operably couple and engage with a plurality of drive recesses 434 on the spool 430. The plurality of drive recesses 434 are positioned on a top surface of the spool 430 and oriented axially towards the knob 402. The drive cams 404 are configured to fit into and engage with the drive recesses 434 such to transfer rotational force or torque from the knob 402 to the spool 430 so that the knob 402 drives, or otherwise rotates the spool 430 as the knob 402 rotates when the drive cams 404 engage with the drive recesses 434. The drive recesses 434 are elongated to allow movement of the drive cams 404 within the drive recesses 434 without engaging the spool 430. For example, the drive cams 404 may be able to partially rotate along with the knob 402 without engaging with the drive recesses 434 to rotate the spool 430.

The spool 430 is also operably coupled with the clutch disc 450. The clutch disc 450 is positioned axially above the spool 430 and between the knob 402 and the spring component 440. The clutch disc 450 comprises a plurality of radially oriented splines 452 (hereinafter splines 452) configured to engage with a plurality of spool splines 431 (hereinafter spool splines 431) positioned radially about the peripheral circumference of the drive recesses 434 on the top surface of the spool 430. The splines 452 on the clutch disc 450 are configured to interlock with the spool splines 431 on the spool 430 such that the spool 430 and the clutch disc 450 function as a unitary component. The spool splines 431 engage with the splines 452 such that the spool 430 drives, or in other words causes rotation of the clutch disc 450 when the spool 430 rotates. Unlike the coupling between the spool 430 and the knob 402, the splines 452 and the spool splines 431 engage such that any rotation of the spool 430 transfers to and rotates the clutch disc 450, and vice versa. In other words, neither the clutch disc 450 nor the spool 430 include elongated recesses for the splines 452 and spool splines 431, respectively, to allow for rotation of either component without transferring the rotational force or torque to the other component. As noted above, the knob 402 is operably coupled with the spool 430 such to drive the spool 430 along with rotation of the knob 402 when the drive cams 404 on the knob 402 engage with the drive recesses 434 on the spool 430. Thus, because of the coupling between the clutch disc 450 and the spool 430, rotation of the knob 402 also rotates the clutch disc 450 via the spool 430 when the knob 402 engages with the spool 430.

The clutch disc 450 is operably coupled with the housing 420 in a ratchet-like manner such to allow rotation of the spool 430 in a tightening direction while preventing rotation of the spool 430 in the loosening direction. A plurality of clutch teeth 451 positioned about the axial periphery of the clutch disc 450 on a top surface and oriented towards the knob 402 are configured to engage with a plurality of housing teeth 421 positioned on the housing 420. The plurality of housing teeth 421 are circumferentially positioned within the interior region of the housing 420 and are radially downward facing such to engage with the clutch teeth 451 of the clutch disc 450. The clutch teeth 451 and the housing teeth 421 function as a ratchet mechanism that provides for one-way rotation of the spool 430 within the interior region of the housing 420. To provide the one-way ratchet mechanism, the clutch teeth 451 are configured to deflect radially downward relative to the knob 402 as the clutch teeth 451 rotate in a tightening direction, which for the present discussion is the clockwise direction, relative to the housing teeth 421. In other cases, the tightening direction may be counterclockwise. The clutch teeth 451 are biased axially upwards such to form a sloped surface and a wall surface between each tooth, forming complementary teeth to the housing teeth 421. Thus, as the clutch disc 450 is rotated along with the spool 430 because of rotation of the knob 402 in the tightening direction, the clutch teeth 451 slide up the complementing sloped surface of the housing teeth 421, being pushed downwards by the sloped nature of both the housing teeth 421 and the clutch teeth 451. When the peak of the sloped surface of the clutch teeth 451 reaches the peak of the sloped surface of the housing teeth 421, the clutch disc is pushed back up by the spring component 440 causing the clutch teeth 451 to reengage with the housing teeth 421. As the clutch disc 450 and the clutch teeth 451 are rotated relative to the housing teeth 421, an audible "click" sound may be produced by the clutch teeth 451 deflection over the housing teeth 421 and "snapping" into reengagement with the housing teeth 421 as the knob 402 is incrementally rotated in the tightening direction.

As noted above, the engagement of the clutch teeth 451 with the housing teeth 421 provides for one-way ratcheting of the spool 430 such that the closure system 400 can be incrementally tightened. The one-way ratcheting of the spool 430 in the tightening direction allows for incremental rotation of the spool 430 to tighten the tension member about the spool 430, while preventing rotation of the spool 430 in the loosening direction (i.e., direction opposite of the tightening direction). When the clutch teeth 451 are engaged with the housing teeth 421, the clutch disc 450 is prevented from rotating in the loosening direction (i.e., counterclockwise direction). Because the housing 420 is stationary with respect to the knob 402, the spool 430, and the clutch disc 450, when a force in the loosening direction (i.e., counterclockwise direction) is applied to the clutch teeth 451, the housing teeth 421 engage with the clutch teeth 451 preventing rotation of the clutch disc 450 in the loosening direction. The tension member exerts a tension force on the spool 430 in the loosening direction, thereby exerting the tension force on the clutch disc 450 in the loosening direction. Thus, under stationary conditions when the knob 402 is not undergoing an operation, such as rotation, the clutch disc 450 is engaged with the housing 420 to prevent rotation of the spool 430 in the loosening direction.

To disengage the clutch teeth 451 from the housing teeth 421 to allow the spool 430 to rotate in the loosening direction and to loosen (unwind) the tension member, the knob 402 includes a plurality of ramps 403 (hereinafter ramps 403). The ramps 403 are positioned on a bottom surface of the knob 402 and oriented axially towards the clutch disc 450. The ramps 403 operably engage with a plurality of clutch ramps 453 (hereinafter clutch ramps 453) positioned on a top surface of the clutch disc 450 when the knob 402 is rotated in the loosening direction. The clutch ramps 453 extend axially upwards from the surface of the clutch disc 450 towards the knob 402. The clutch ramps 453 are biased axially upwards such to create ramped surfaces that complement the ramps 403 of the knob 402. To decouple the spool 430 from the housing 420 to allow the spool 430 to rotate in the loosening direction, when the knob 402 is rotated in the loosening direction, the ramps 403 on the knob 402 drive the clutch disc 450 downwards with respect to the knob 402. As the knob 402 rotates, the ramps 403 slide up the ramped surfaces of the clutch ramps 453, pushing the clutch ramps 453 downwards and away from the knob 402. As the clutch disc 450 is driven downwards and away from the knob 402 by the ramps 403 sliding over the clutch ramps 453, the clutch teeth 451 disengage from the housing teeth 421, allowing the clutch disc 450 to rotate. Because the clutch disc 450 is operably coupled with the spool 430, once the clutch disc 450 is able to rotate in the loosening direction, the tension force exerted on the spool 430 causes the spool 430 to rotate in the loosening direction.

As noted above, the drive recesses 434 are elongated to allow movement of the drive cams 404 within the drive recesses 434 without engaging the spool 430. The elongation of the drive recesses allow the knob 402 to rotate in the loosening direction without engaging the clutch disc 450. This allows the knob 402 to be rotated in the loosening direction without being prevented by a clutch disc 450. Since the clutch teeth 451 engage with the housing teeth 421 whenever a force is applied to the spool 430 and thereby the clutch disc 450 in the loosening direction, without elongation of the drive recesses 434, the knob 402 would be prevented from rotating in the loosening direction by the clutch disc 450.

To prevent the closure system 400 from fully loosening and to allow for incremental loosening of the closure system 400, the spring component 440 is positioned axially between the clutch disc 450 and the spool 430. The spring component 440 deflects axially upwards and downwards to provide an axially upward force on the clutch disc 450. The spring component 440 holds or otherwise maintains the clutch disc 450 in an axially raised position within the housing 420. In the axially raised position, the clutch teeth 451 are engaged with the housing teeth 421, thereby preventing rotation of the spool 430 in the loosening direction. When the knob 402 is rotated in the loosening direction, the ramps 403 on the knob 402 drive the clutch disc 450 to push against the spring component 440, compressing the spring component 440. Once the ramps 403 pass over the clutch ramps 453, the generated recoil force caused by compressing the spring component 440 drives the clutch disc 450 axially upwards again towards the knob 402, reengaging the clutch teeth 451 with the housing teeth 421. In this manner, the spool 430 is incrementally allowed to rotate in the loosening direction.

Figure 5A:
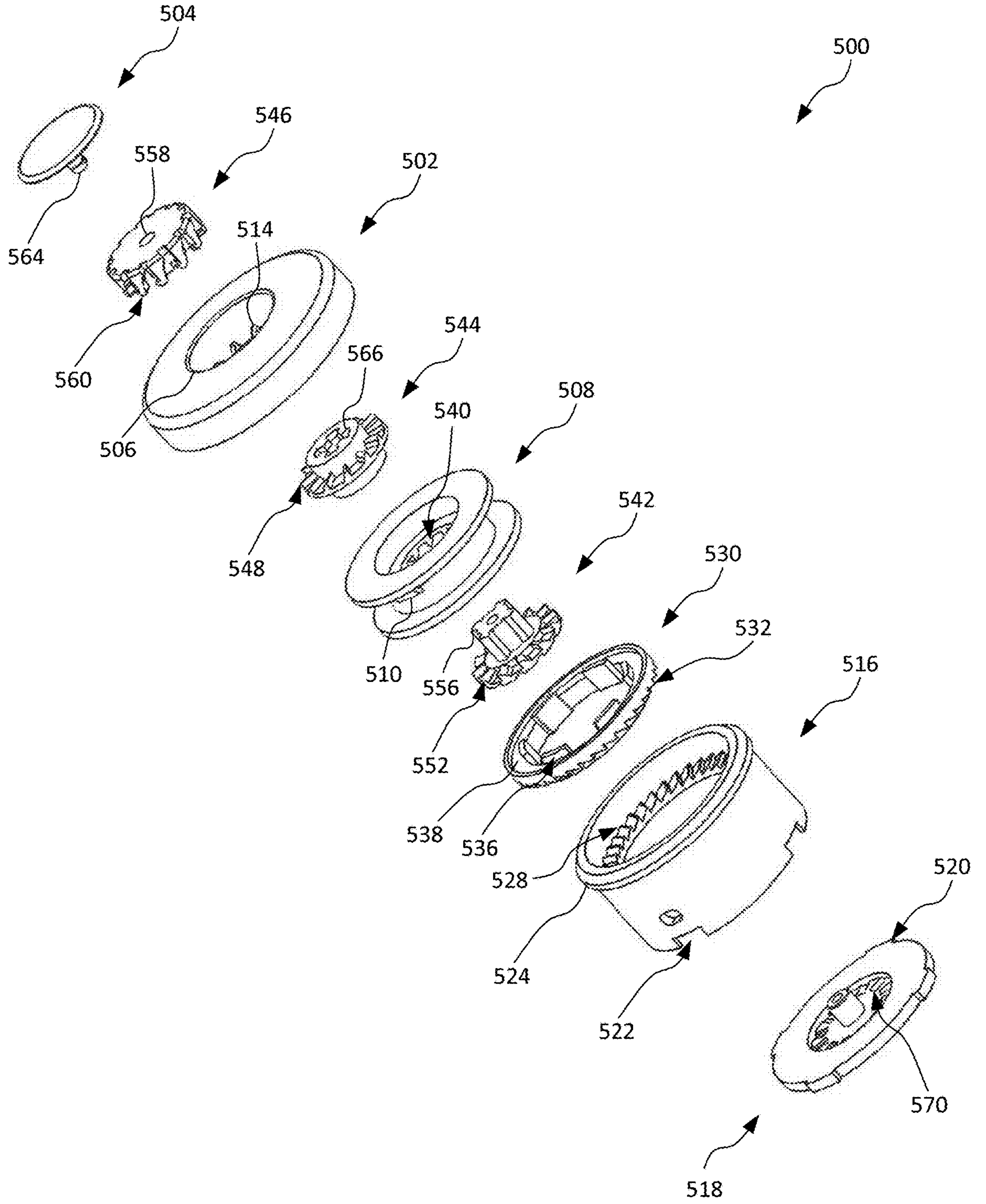
FIGS. 5A-B illustrate another embodiment of a reel based closure device that may be used to tighten an article.
Figure 5B:
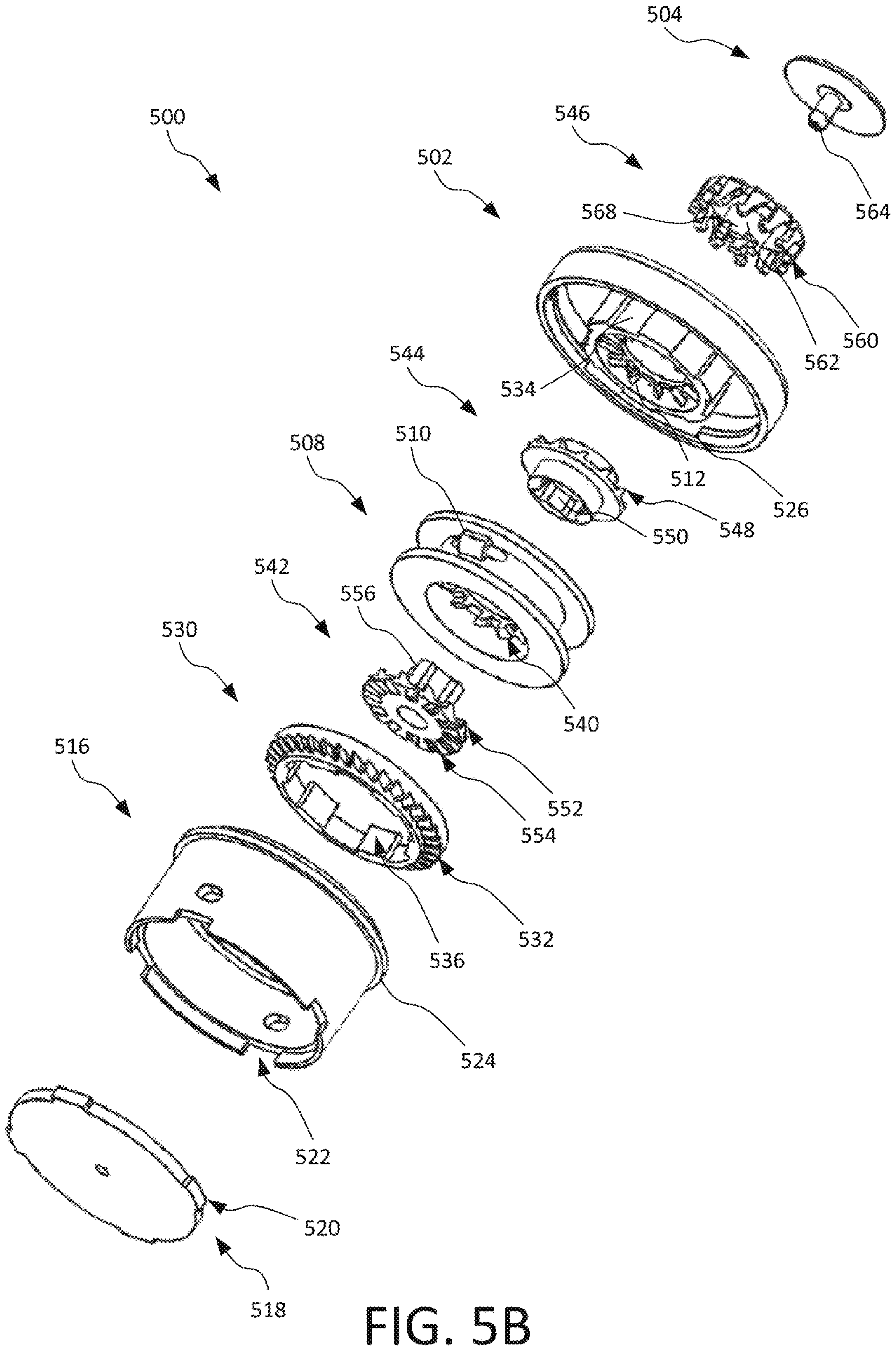

Referring now to FIGS. 5A and 5B, illustrated are exploded perspective views of the lacing system 500. Lacing system 500 includes a knob 502, that is designed to be grasped and rotated by a user. Knob 502 is positioned with respect to lacing system 500, as well as a particular article to which lacing system 500 is attached, so that it is easily accessible to a user of the particular article. Knob 502 is illustrated as having a cylindrical profile or shape when viewed from its top surface, although various other shapes or configurations may be employed, such as hexagonal, octagonal, triangular, and the like. Additionally, knob 502 may include surface features such as knurling or raised features which make knob 502 easier to grasp and apply torque to (turn/rotate).

A button 504 is disposed within a cavity 506 in knob 502. While rotating knob 502 in the clockwise direction a lace (not shown) attached to spool 508 at connection point 510 wraps around spool 508, thereby tightening the lace about the particular article to which lacing system 500 is attached. The workings of lacing system 500, as will be described below, prevents spool 508 from rotating counterclockwise, and thereby loosening, unless button 504 is depressed. Thus, tightening the lace by rotating knob 502 in a clockwise direction acts in a "ratcheting" manner, preventing any unintentional loosening of the lace. However, once button 504 is depressed, the lace may be pulled from lacing system 500, unwinding spool 508, and thereby loosening the lace about the particular article to which lacing system 500 is attached.

To further describe the operation of lacing system 500, knob 502 includes lower knob teeth 512 and upper knob teeth 514. Lower knob teeth 512 are positioned on an annular partition and are oriented axially downward. Upper knob teeth 514 are also positioned on the annular partition but extend axially upward. Upper knob teeth 514 may have a sloped profile as shown.

Lacing system 500 further includes a housing 516. Housing 516 includes an interior region within which one or more components of lacing system 500 are positioned. Housing 516 is configured to be attached to a base component 518 such that housing 516 does not rotate relative to base component 518. This may be accomplished by interlocking tabs 520 on base component 518 and cavities 522 on housing 516. Base component 518 is configured to be attached to the particular article by any means known in the art, thereby coupling lacing system 500 to the particular article. A first ridge 524 about the perimeter of housing 516 is configured to rotatably couple with a second ridge 526 inside the perimeter of knob 502 so that knob 502 may be rotated about housing 516, but so knob 502 cannot easily be removed vertically away from housing 516.

The interior region of housing 516 includes housing teeth 528 that extend axially upward from an annular partition. Housing teeth 528 may be formed during a molding process, or may be subsequently cut into housing 516 after molding. A coupling ring 530 is housed within the interior region of housing 516. Coupling ring 530 includes coupling teeth 532 that extend axially downward from an outer circumferential surface of the coupling ring 530. Housing teeth 528 are configured to engage with coupling teeth 532 to allow for a one-way rotation of spool 508 as described below.

Specifically, housing teeth 528 and coupling teeth 532 are sloped or tapered in an opposite orientation relative to each other as shown. The opposite orientation of housing teeth 528 and coupling teeth 532 allows coupling ring 530 to rotate in a clockwise direction relative to housing 516, while not allowing coupling ring 530 to rotate in a counterclockwise direction relative to housing 516 (i.e., attempted counter-clockwise rotation will "lock" coupling teeth 532 against housing teeth 528).

The number and spacing of housing teeth 528 control the incremental amount or degree of tightening that is achievable with lacing system 500. The specific number and spacing of the teeth can be designed to suit an intended use or purpose of the lacing system. In various embodiments, housing teeth 528 and coupling teeth 532 may include between 20 and 40 teeth each.

Knob 502 also includes spline receivers 534 that engage with spline teeth 536 of coupling ring 530 such that coupling ring 530 is rotatably locked or keyed to knob 502. Thus, a rotation of knob 502 in either direction will at least attempt to cause a corresponding rotation of coupling ring 530 within the interior region of housing 516. Due to the ratchet like engagement of housing teeth 528 with coupling teeth 532 as discussed above, coupling ring 530 allows for knob 502 to rotate clockwise (the lace tightening direction), while preventing the knob 502 from rotating in the loosening direction (the lace loosening direction).

Coupling ring 530 further includes an annular channel 538 that is formed on an upper surface of coupling ring 530. Annular channel 538 houses a compression spring (not shown) that contacts annular channel 538 and an inner surface of knob 502, such that the spring is compressed between knob 502 and coupling ring 530. This spring biases knob 502 and coupling ring 530 axially apart. In this manner, a downward force is imparted on coupling ring 530, which biases coupling teeth 532 into engagement with the housing teeth 528.

Spool 508 is rotatably positioned within the interior region of housing 516 so that spool 508 is able to rotate therein. Spool 508 includes spool teeth 540 that extend axially downward from an annular rim that is positioned within a central aperture of spool 508.

Lacing system 500 further includes a lower clutch component 542, an upper clutch component 544, a rotation limiter 546, and button 504. Lower clutch component 542 and upper clutch component 544 are contained within housing 516 when lacing system 500 is assembled.

Upper clutch component 544 includes upper clutch teeth 548 that extend axially upward from a radially extending lip of upper clutch component 544. Upper clutch component 544 also includes a keyed channel 550 that extends axially through upper clutch component 544. Keyed channel 550 is illustrated as having a cross-shape when viewed from a bottom surface of upper clutch component 544, although any other various shapes or configurations may be employed.

Lower clutch component 542 includes lower clutch teeth 552 raised from a top surface of the lower clutch component 542 as well as brake teeth 554 raised from a bottom surface of lower clutch component 542. Lower clutch component 542 is configured with a key 556 which extends from a top surface of lower clutch component 542. Key 556 is illustrated as having a cross-shape when viewed from a top surface of lower clutch component 542, although any other various shapes or configurations may be employed such that they match keyed channel 550 in upper clutch component 544.

Rotation limiter 546 is configured with an inner cavity 558 which extends through a horizontal section of rotation limiter 546. Rotation limiter 546 is also configured with rotation limiter teeth 560 extending away from a bottom of rotation limiter 546. Rotation limiter 546 also includes a shaft 562 extending away from a bottom center of rotation limiter 546. A compression spring (not shown), is disposed between rotation limiter 546 and knob 502, thereby biasing rotation limiter 546, and all components axially bound to rotation limiter 546, upward. This results in button 504 being biased upward. When rotation limiter 546 is biased upward, rotation limiter teeth 560 do not interface with upper knob teeth 514.

Button 504 includes an axle 564 which extends from a bottom surface of button 504. In some embodiments, axle 564 is circular in shape when viewed from the bottom surface, and is located at the center of a horizontally planar section of button 504. Button 504 is designed to be pressed by a user as described above. Button 504 is axially fixed to rotation limiter 546 and therefore depressing button 504 results in movement of the rotation limiter 546.

Axle 564 of button 504 extends through inner cavity 558 of rotation limiter 546. In some embodiments, a top surface of rotation limiter 546 contacts a bottom surface of button 504. In some embodiments, button 504 and rotation limiter 546 may rotate relative to each other. Button 504 and rotation limiter 546 are axially fixed, i.e., they are at a fixed distance along the axis of the axle 564 but may be free to rotate with respect to one another. Button 504 is positioned at the center of knob 502 so that button 504 is easily accessible to a user. In some embodiments, a top surface of knob 502 is flush with a top surface of button 504, when button 504 is not being depressed.

Rotation limiter 546 is housed in cavity 506 of knob 502. The slope orientation of rotation limiter teeth 560 and upper knob teeth 514 are the same as each other. In this way, when upper knob teeth 514 are engaged with rotation limiter teeth 560, the sloped portion of the rotation limiter teeth 560 allows rotation limiter 546 to slide up upper knob teeth 514 when rotation limiter 546 is rotated in a counterclockwise direction relative to knob 502. In this way, when a rotational force or torque acts on rotation limiter 546 in the counter-clockwise/loosening direction relative to knob 502, the engagement of upper knob teeth 514 with rotation limiter teeth 560 creates an upward force on rotation limiter 546. When button 504 is not pressed, rotation limiter teeth 560 of rotation limiter 546 are above upper knob teeth 514 such that rotation limiter teeth 560 cannot engage with upper knob teeth 514 of knob 502.

Upper clutch component 544 is configured with a key receiver 566. Key receiver 566 is shaped to a key 568 on a bottom surface of shaft 562 of rotation limiter 546 such that upper clutch component 544 and rotation limiter 546 do not rotate relative to one another. Key receiver 566 is also shaped to receive axle 564 of button 504 such that upper clutch component 544 and button 504 are axially coupled. In some embodiments, upper clutch component 544 rotates relative to button 504.

During operations of lacing system 500 when button 504 is not depressed, upper clutch teeth 548 engage with lower knob teeth 512 of knob 502. When upper clutch teeth 548 are engaged with lower knob teeth 512, upper clutch component 544 is inhibited from rotating in the loosening direction relative to knob 502. Likewise, upper clutch component 544 is also inhibited from rotating in the loosening direction relative to housing 516 because knob 502 is thus inhibited by coupling ring 530 as described above. Meanwhile, when button 504 is not depressed, lower clutch teeth 552 are engaged with spool teeth 540, where thereby, clockwise rotation of knob 502 causes rotation of upper clutch component 544 and lower clutch component 542, and consequently spool 508, thereby tightening a lace around spool 508.

Keyed channel 550 of upper clutch component 544 is shaped to correspond to key 556 of lower clutch component 542 such that key 556 extends through a central opening in a horizontally planar circular section of spool 508 and is keyed into keyed channel 550. In this way, lower clutch component 542 does not rotate relative to upper clutch component 544 but is free to move axially with respect to upper clutch component 544. Key 556 and keyed channel 550 are configured to allow axial movement of upper clutch component 544 relative to lower clutch component 542. When key 556 is fully inserted into keyed channel 550, a top surface of lower clutch component 542 engages with a bottom surface of upper clutch component 544. During such engagement, lower clutch component 542 transfers upward axial force to upper clutch component 544, and upper clutch component 544 transfers downward axial force to lower clutch component 542.

During some operations of lacing system 500, lower clutch teeth 552 engage with spool teeth 540 of spool 508. When lower clutch teeth 552 are engaged with spool teeth 540, spool 508 is inhibited from rotating in the loosening direction relative to lower clutch component 542. Likewise, spool 508 is also inhibited from rotating in the loosening direction relative to upper clutch component 544 because lower clutch component 542 is keyed to rotate with upper clutch component 544.

During some operations of lacing system 500, lower clutch teeth 552 engage with spool teeth 540 of spool 508 while upper clutch teeth 548 engage with lower knob teeth 512 of knob 502. In this way, spool 508 is inhibited from rotating in the loosening direction relative to knob 502 because spool 508 is inhibited from rotating in the loosening direction relative to lower clutch component 542 which is keyed to rotate with upper clutch component 544 which is inhibited from rotating in the loosening direction relative to knob 502. When spool 508 is thus inhibited from rotating in the loosening direction relative to knob 502, an operation of knob 502 in the tightening direction will cause spool 508 to rotate in the tightening direction. When spool 508 is rotated in the tightening direction, a lace is wound about spool 508 which creates tension in the lace and tightens the article.

Tension in the lace creates rotational force or torque on spool 508 in the loosening direction. When spool teeth 540 are engaged with lower clutch teeth 552, rotational force or torque on spool 508 in the loosening direction causes rotational force or torque on lower clutch component 542 in the loosening direction. Key 556 housed within keyed channel 550 of upper clutch component 544 causes rotational force or torque on upper clutch component 544 when there is rotational force or torque on lower clutch component 542. When upper clutch teeth 548 are engaged with lower knob teeth 512, rotational force or torque on upper clutch component 544 in the loosening direction causes rotational force or torque on knob 502 in the loosening direction. When upper clutch teeth 548 are not engaged with lower knob teeth 512, key receiver 566 which is keyed to rotate with rotation limiter 546, causes rotational force or torque on rotation limiter 546 when there is rotational force or torque on upper clutch component 544.

Turning knob 502 in the tightening position results in increasing tension in the lacing system. Turning knob 502 causes the upper clutch component 544 to rotate due to the engagement of the lower knob teeth 512 and the upper clutch teeth 548. The upper clutch component 544 causes the lower clutch component 542 to rotate at the same time due to the interaction of the key receiver 566 and the key 556 which prevent axial rotation of the lower clutch component 542 relative to the upper clutch component 544 when engaged. As the lower clutch component 542 is rotated, the lower clutch teeth 552 engage with the spool teeth 540 to rotate the spool 508. To maintain the torque or rotational force and thereby hold the load within the lacing system 500, the spline receivers 534 of the knob and the spline teeth 536 cause the coupling ring 530 to rotate as the knob 502 is turned. As the coupling ring 530 turns, the coupling teeth 532 slip past the housing teeth 528. The coupling teeth 532 slip past the housing teeth 528 due to the direction of the sloped surface of the housing teeth 528 and the coupling teeth 532. In the tightening direction, the angled surfaces of the housing teeth 528 and the coupling teeth 532 slide against each other and increase a distance between the coupling ring 530 and the housing 516 until the housing teeth 528 and the coupling teeth 532 slip past one another. The vertical surfaces of the housing teeth 528 and the coupling teeth 532 abut one another in a load bearing arrangement when the lacing system 500 is under force. The compression spring (not shown) between the coupling ring and the knob 502 applies pressure to the coupling ring 530 in a direction away from the knob 502 and towards the housing 516, to ensure the coupling teeth 532 and the housing teeth 528 are engaged.

Lacing system 500 includes an incremental loosening arrangement and a continuous loosening arrangement. In the incremental loosening arrangement, button 504 is pressed a first distance downward toward knob 502. Because rotation limiter 546 is axially coupled to button 504, the axial movement of button 504 results in axial movement of rotation limiter 546 downward into knob 502. The downward axial movement of rotation limiter 546 causes the upper clutch component 544 to move axially as well. The downward axial movement of the upper clutch component 544 causes the lower knob teeth 512 to disengage from the upper clutch teeth 548. When the upper clutch teeth 548 and the lower knob teeth 512 are disengaged, the upper clutch component 544, rotation limiter 546, lower clutch component 542, and spool 508 rotate together, due to the torque in the lacing system 500, until the rotation limiter teeth 560 contact the upper knob teeth 514. The sloped shape of the rotation limiter teeth 560 and the contact with the upper knob teeth 514 under tension, due to the tension in the lacing system 500, cause the rotation limiter 546 to move axially in the opposite direction of the initial depression of the button 504, i.e., axially upwards. The rotation limiter 546 moves axially upwards and causes the upper clutch component 544, to which it is coupled, to contact and engage with the knob 502 via the upper clutch teeth 548 and the lower knob teeth 512. When upper clutch component 544 is moved only a partial distance in the axially downward direction, a bottom surface of upper clutch component 544 does not contact an upper surface of lower clutch component 542. Thus, the downward force on upper clutch component 544 is not transferred from upper clutch component 544 to lower clutch component 542. Thus, lower clutch component 542 is not moved in an axial direction, and lower clutch teeth 552 remain engaged with spool teeth 540.

With further reference to the incremental loosening arrangement, when upper clutch component 544 is moved a partial axial distance away from knob 502 and toward spool 508, upper clutch teeth 548 disengage from lower knob teeth 512. Thus, upper clutch component 544 is not inhibited from rotating in the loosening direction relative to knob 502. The rotational force or torque created by the lace and transferred to upper clutch component 544, as discussed above, causes upper clutch component 544 to rotate in the loosening direction relative to knob 502. Rotation of upper clutch component 544 causes rotation of rotation limiter 546 in the same direction because rotation limiter 546 is keyed to rotate with upper clutch component 544. Upon rotation of rotation limiter 546 in the loosening direction relative to knob 502, rotation limiter teeth 560 engage with upper knob teeth 514. The matching slope orientations of rotation limiter teeth 560 and upper knob teeth 514 create an upward force on rotation limiter 546 as the rotational force or torque from upper clutch component 544 acts on rotation limiter 546 and causes rotation limiter teeth 560 to rotate in the loosening direction relative to upper knob teeth 514. Thus, rotation limiter 546 is moved a partial axial distance upward away from knob 502. Because button 504 is axially coupled to rotation limiter 546, button 504 moves a partial axial distance upward away from knob 502. Because upper clutch component 544 is axially coupled to rotation limiter 546, upper clutch component 544 moves a partial axial distance upward toward knob 502 and away from spool 508. When upper clutch component 544 moves a partial axial distance upward toward knob 502, upper clutch teeth 548 engage with lower knob teeth 512 which inhibits upper clutch component 544 from rotating in the loosening direction relative to knob 502. Rotation limiter 546, lower clutch component 542, and spool 508 are likewise inhibited from rotating in the loosening direction relative to knob 502.

In the continuous loosening arrangement, button 504 may be pressed a full distance into knob 502, i.e., as far as possible. Because rotation limiter 546 is axially coupled to button 504, the full axial movement of button 504 results in full axial movement of rotation limiter 546 downward toward knob 502. The full axial downward movement of rotation limiter 546 allows for rotation limiter teeth 560 to engage with upper knob teeth 514. The rotation limiter teeth 560 with their hooked ends engage with the upper knob teeth and are hooked together. The button 504 is reengaged or moved back to the load bearing position when the knob 502 is rotated after being in the continuous loosening arrangement due to the compression spring between the base component 518 and the lower clutch component 542. Because upper clutch component 544 is axially coupled to rotation limiter 546, the full axial movement of rotation limiter 546 results in full axial movement of upper clutch component 544 downward away from knob 502 and toward spool 508. When upper clutch component 544 moves a full axial distance away from knob 502, upper clutch teeth 548 disengage from lower knob teeth 512 which allows upper clutch component 544 to rotate in the loosening direction relative to knob 502.

With further reference to the continuous loosening arrangement, when upper clutch component 544 is moved a full axial distance away from knob 502, a bottom surface of upper clutch component 544 contacts an upper surface of lower clutch component 542. Thus, the downward force of upper clutch component 544 is transferred from upper clutch component 544 to lower clutch component 542 and lower clutch component 542 is moved axially downward away from spool 508. Thus, lower clutch teeth 552 disengage from spool teeth 540 which allows spool 508 to rotate relative to lower clutch component 542, and relative to all members of lacing system 500. In this way, rotational force or torque created by the lace causes spool 508 to rotate in the loosening direction relative to all members of lacing system 500.

With further reference to the continuous loosening arrangement, when lower clutch component 542 is moved axially downward, as discussed above, brake teeth 554 engage with base teeth 570 through the compression spring to prevent rotational movement between the base component 518 and the lower clutch component 542. Thus, lower clutch component 542 is inhibited from rotating. Thus, upper clutch component 544 is inhibited from rotating because upper clutch component 544 is keyed to rotate with lower clutch component 542 and rotation limiter 546 is inhibited from rotating because rotation limiter 546 is keyed to rotate with upper clutch component 544.

With further reference to the continuous loosening arrangement, when rotation limiter 546 moves a full axial distance toward knob 502, a lower portion of rotation limiter teeth 560 engage with an interior surface of knob 502. This engagement inhibits rotation limiter 546 from moving axially upward, away from knob 502. Upper clutch component 544 is also inhibited from moving axially upward, toward knob 502 and away from spool 508 because upper clutch component 544 is axially coupled to rotation limiter 546. Lower clutch component 542 is also inhibited from moving axially upward, toward spool 508 because a lower surface of upper clutch component 544 contacts an upper surface of lower clutch component 542 when upper clutch component 544 has moved a full axial distance downward. Thus, lower clutch teeth 552 are inhibited from engaging with spool teeth 540. Lacing system 500 will remain in this state until operated upon by a user as discussed below. Thus, spool 508 is allowed to rotate relative to lower clutch component 542 and relative to all members of lacing system 500 until lacing system 500 is operated upon by a user.

Figure 6A:
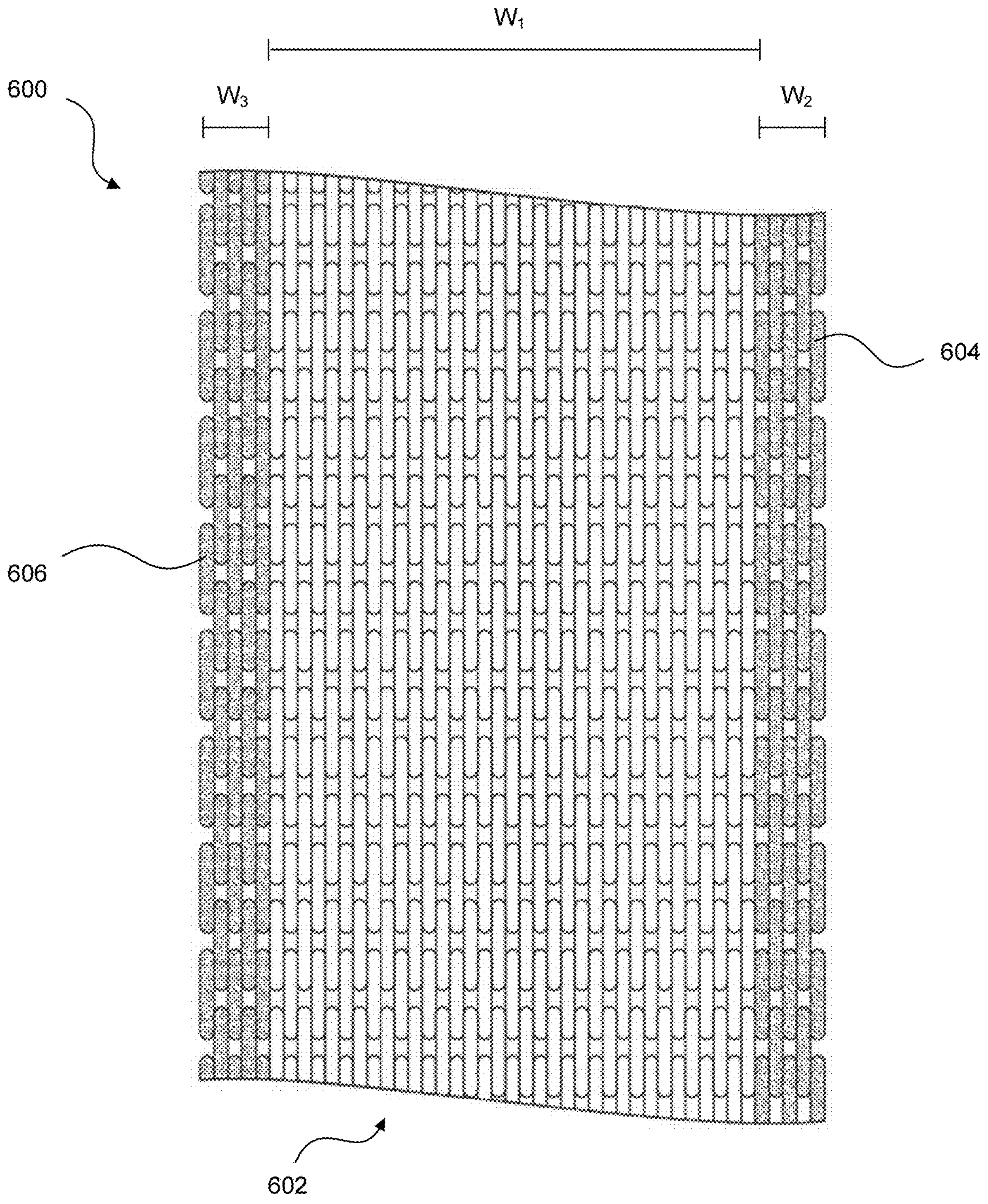
FIGS. 6A-C illustrate a guide that may be attached to an article to guide a lace or tension member about a path along the article.
Figure 6B:
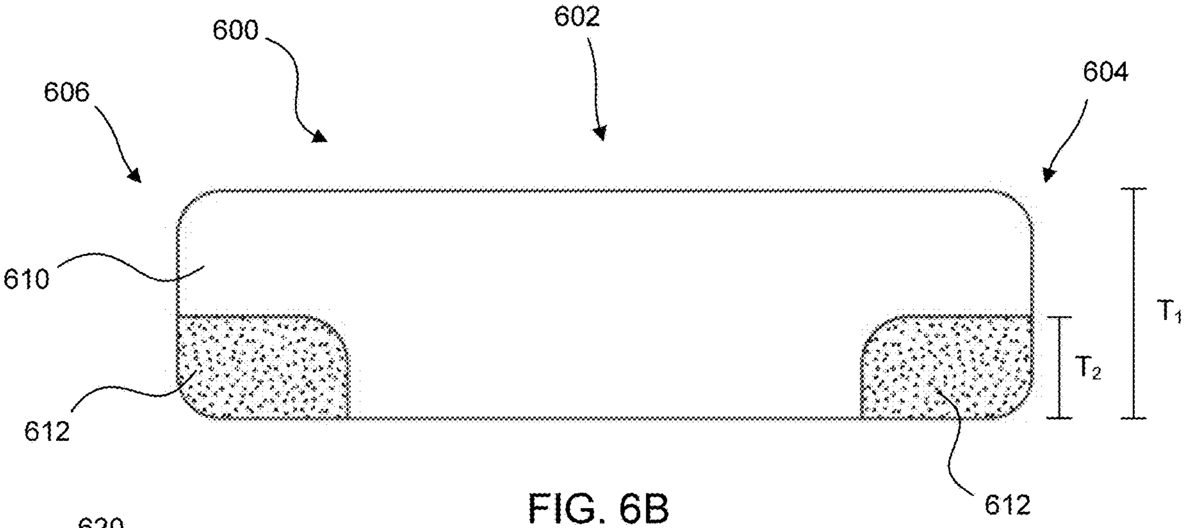
Figure 6C:
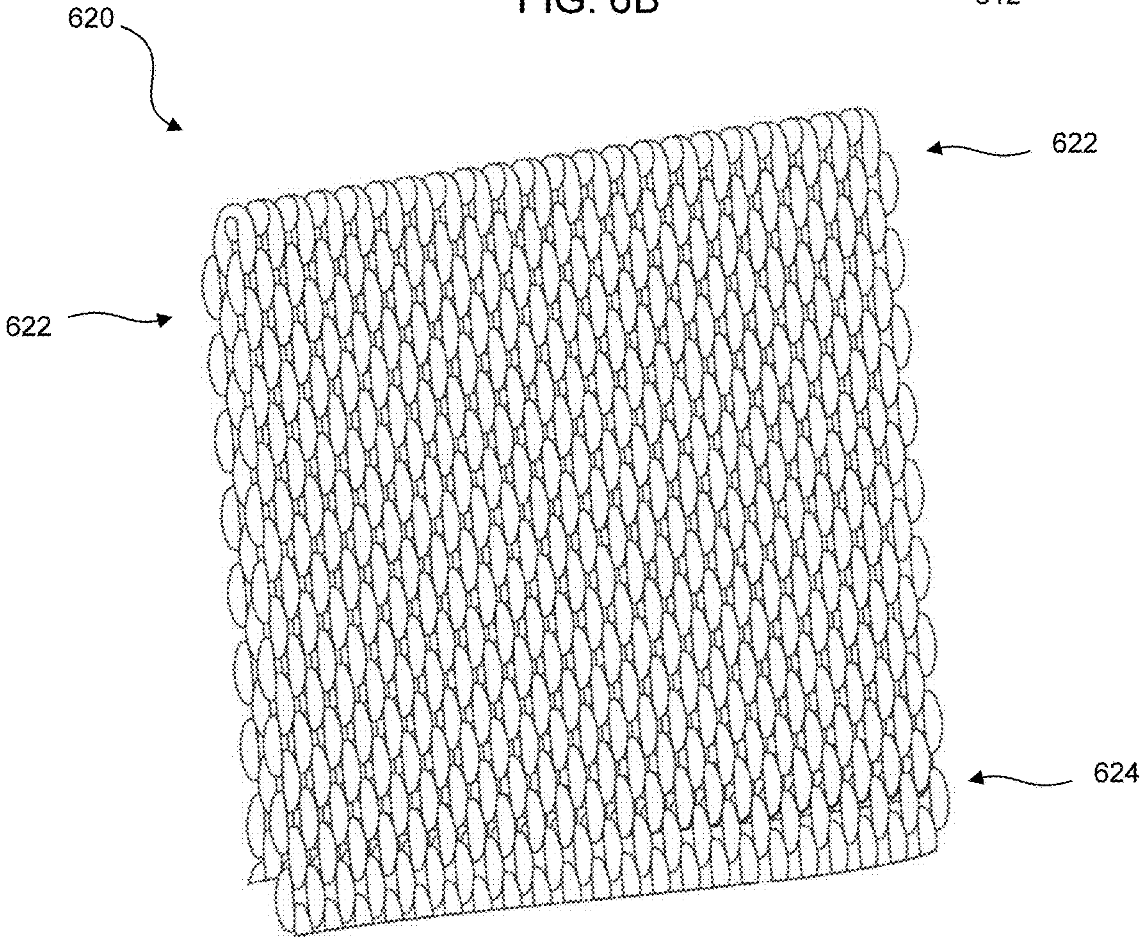

Referring now FIGS. 6A-C, illustrated is a guide 600 that may be attached to an article to guide a lace or tension member (hereinafter tension member) about a path along the article. The guide 600 is formed from a flexible piece of webbing and includes a first end region 604, a second end region 606, and a center region 602 that is located between the first and second end regions 604, 606. The guide 600 is typically made of a flexible material such as woven webbing made of polyester, nylon, or any other suitable material or blend of materials. The guide 600 is designed to reduce friction between the tension member (not shown) and an inner surface of the guide 600 as the tension member slides or moves along the inner surface of the guide 600. The reduced friction is achieved by positioning a low friction material on a portion of the inner surface of the guide 600.

As tension is applied to the tension member, the first end region 604 and the second end region 606 may flex or curve slightly to create a slight curved lace pathway for the tension member. The center region 602 can assist in keeping the first end region 604 and the second end region 606 separated and can prevent the guide 600 from bunching together under load from the tension member. The center region 602 may prevent bunching without the use of a rigid material which may be undesirable in certain applications.

The guide 600 can be formed from one or more woven materials and can be attached to a shoe or other article (not shown) by stitching, an adhesive, rivets, mechanical fasteners, or in any other suitable manner. As illustrated in FIG. 6C, the guide 600 can be a strip of woven material that is folded to create a loop 620. Opposing ends 624 of the strip of woven material can be stitched together and the loop 620 can be attached to the shoe or other article. For example, the loop 620 can be stitched to a shoe, thereby securing the loop 620 to the shoe with the loop 620 facing inward generally toward a center of the shoe. An upper end of the loop 620 includes openings 622 through which the tension member is inserted to couple the tension member with the guide 600.

In some embodiments, the guide 600 can have a width of between 10 mm and 45 mm, although widths outside this range can also be used. The first end region 604 may have a width $W_2$ and the second end region 606 may have a width $W_3$. The first and second end regions 604, 606 can have the same width $W_2$, $W_3$, or different widths as desired. The widths $W_2$, $W_3$ of the first and/or second end regions 604, 606 can be between about 1 mm and 15 mm, and more commonly between about 2 mm and 10 mm or between about 3 mm and 7 mm. The center region 602 can have a width $W_1$ of between 15 mm and 43 mm, and more commonly between about 15 mm and 40 mm or between about 20 mm and 35 mm. The guide 600 can have a thickness $T_1$ of between about 0.5 mm and 2 mm, and more commonly between about 0.5 mm and 1.0 mm, although other thicknesses may be employed depending on the strength and durability required for the guide 600. In some embodiments, the center region 602 can be thicker than the first and/or second end regions 604, 606.

As briefly described above, the guide 600 is designed to provide a low friction and durable sliding surface for the tension member to move across during tensioning. To provide the low friction surface, the first end region 604 and the second end region include a low friction material 612 (see FIG. 6B), which is illustrated by the end regions having a darkened appearance in FIG. 6A. The center region 602 does not include the low friction material 612, resulting in the center region 602 having a lighter appearance in FIG. 6A. Various low friction materials may be employed in the first and second end regions 604, 606 to provide the low friction surface 612. The first and second end regions 604, 606 may employ the same low friction material, different low friction materials, or a combination of low friction material as desired. In a specific embodiment, the low friction material 612 that is used in the first and/or second end regions 604, 606 may be a polytetrafluoroethylene material, such as the material sold under the tradename Teflon.

The center region 602 does not include a low friction material 612 because the center region 602 does not experience the same degree of frictional engagement with the tension member as the first and second end regions 604, 606. For example, because the tension member engages the first and second end regions 604, 606 upon entry and exit of the guide 600, the first and second end regions 604, 606 are the primary portions of the guide 600 that are responsible for altering a path of the tension member. As such, a majority of the force that is exerted on the tension member from the guide 600 is concentrated at or near the first and second end regions 604, 606. Therefore, a majority of the friction or drag that the tension member experiences is due to frictional engagement with the first and second end regions 604, 606. Positioning the low friction material 612 primarily or solely on the first and second end regions 604, 606 greatly reduces friction between the tension member and guide 600. While some additional reduction in friction may be achieved by positioning the low friction material 612 on the center region 602 of the guide 600, the friction reduction is minimal and often does not justify the expense or manufacturing burden that is involved in producing such a configuration, especially when the low friction material is substantially more expensive than that material that is used elsewhere on the guide 600. The low friction material 612 of the guide 600 greatly reduces wear on both the tension member and the guide 600. Preferably, the center region 602 has sufficient strength so as to resist bending of buckling of the guide 600, thus maintaining a degree of separation between first and second end regions 604, 606.

The low friction material 612 is typically positioned on the first and second end regions 604, 606 so that it extends along an entire longitudinal length of the guide 600 and along an entire width $W_2$, $W_3$ of the first and second end regions 604, 606. In some embodiments, however, the low friction material 612 may only extend along a portion of the longitudinal length of the guide 600 and/or along a portion of the width $W_2$, $W_3$ of the first and second end regions 604, 606. In addition, as illustrated in FIG. 6B, the low friction material 612 may be positioned only on a single side or surface of a guide body 610. Specifically, the low friction material 612 may be positioned only on an inner surface of the guide body 610 and not on an exterior side or surface of the guide body 610. As such, the guide 600 may be composed of, or consist of, multiple material sections or segments.

The guide body 610 may be composed of a first material that may be formed of one or more woven materials as previously described. In a specific embodiment, the guide body 610 may be composed of, or consist of, a nylon material. The low friction material 612 is coupled with the guide body 610 so that is positioned on the first and/or second end regions 604, 606 and faces an interior side or surface of the guide body 610. As such, the center region 602 of the guide body 610 has a thickness that is greater than a thickness of the guide body 610 at the first and/or second end regions 604, 606 and the material of the guide body 610 covers the low friction material 612 and encloses or encases the low friction material 612 within the interior of the loop 620 formed in the guide 600. Since the guide body 610 covers the low friction material 612, the material of the guide body 610 extends from the first end region 604 to the second end region 606 on the exterior surface of the guide 600. In contrast, the material of the guide body 610 only extends only the center region 602 on the inner surface of the guide 600. Covering the low friction material 612 with the material of the guide body 610 may make the guide 600 appear more uniform, may reduce manufacturing costs, may reinforce the low friction material 612, and the like.

The thickness $T_1$ of guide 600 may remain essentially uniform across the width of the guide 600, or may vary between the first and second end regions 604, 606 as desired. The low friction material 612 may have a thickness $T_2$ of between 10% and 80% of the thickness $T_1$ of guide 600, and more commonly a thickness $T_2$ of between 15% and 60%, or between 20% and 40%, of the thickness $T_1$ of guide 600. The low friction material 612 may be coupled with the guide body 610 in various ways. For example, the low friction material 612 may be woven into the guide body 610 during formation of the guide 600. In other embodiments, the low friction material 612 may be formed separately from the guide body 610 and may be adhered into recesses that are formed in the first and second end regions 604, 606 of the guide body 610. Various other means or coupling or attaching the low friction material 612 to the guide body 610 may also be employed. While FIG. 6B illustrates the low friction material 612 as only being positioned on the inner side or surface of the guide body 610, in some embodiments, the low friction material 612 may be positioned on both the inner side or surface of the guide body 610 and on the exterior side or surface of the guide body 610. The low friction material 612 on the inner and exterior surfaces may be separated by a strip or material of the guide body 610 or may be a uniform strip or segment of material that forms the first and/or second end regions 604, 606 of the guide 600. The low friction material 612 may have similar material properties as the material that is used for the guide body 610, or may have different material properties, such as increased stiffness or increased flexibility, as desired.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms “a”, “an”, and “the” include plural referents unless the context clearly dictates otherwise. Thus, for example, reference to “a process” includes a plurality of such processes and reference to “the device” includes reference to one or more devices and equivalents thereof known to those skilled in the art, and so forth.

Also, the words “comprise,” “comprising,” “include,” “including,” and “includes” when used in this specification and in the following claims are intended to specify the presence of stated features, integers, components, or steps, but they do not preclude the presence or addition of one or more other features, integers, components, steps, acts, or groups.

What is claimed is:

1. A reel system comprising:

a housing having an interior;

a spool positioned within the interior of the housing, the spool being rotatable in a tightening direction to wind a tension member about the spool and being rotatable in a loosening direction to unwind the tension member from about the spool;

a knob supported by the housing and operationally coupled with the spool such that rotation of the knob causes the spool to rotate in the tightening direction;

a plurality of teeth formed on or coupled with the housing; and a pawl component that is separate from the knob and the spool and that is removably couplable with the knob and the spool, the pawl component including a central base and a plurality of pawls that are each connected to the central base, each pawl having a pawl arm and a pawl beam integrally formed with the pawl arm, the pawl arm extending from the central base in a first direction and the pawl beam extending from the pawl arm in a second direction that is different than the first direction, wherein the pawl beam is movable between an engaged position in which the pawl beam is engaged with at least one tooth of the plurality of teeth and a disengaged position in which the pawl beam is disengaged from the at least one tooth, and wherein the pawl arm is configured to bias the pawl beam toward the engaged position;

wherein when the pawl beam is in the engaged position, the spool is prevented from rotating in the loosening direction;

wherein a proximal end of each pawl arm is fixedly attached to the central base, wherein each pawl arm curves away from the proximal end to a pivot end; and wherein the pawl beam extends from the pivot end in the second direction.

2. The reel system of claim 1, wherein the central base of the pawl component is an annular ring.

3. The reel system of claim 2, wherein the reel system further comprises a knob core that is coupleable with the pawl component to support or reinforce the pawl component, and wherein the annular ring is shaped and sized to fit around a central aperture of the knob core.

4. The reel system of claim 1, wherein the pawl component includes three pawls.

5. The reel system of claim 1, wherein the reel system further comprises a knob core that is separate from the pawl component and that is coupleable therewith, the knob core being configured to support or reinforce the pawl component.

6. The reel system of claim 5, wherein when the pawl component is coupled with the knob core, a distal end of each pawl beam extends radially outward of an outer circumference or perimeter of the knob core.

7. The reel system of claim 5, wherein the knob core includes a support wall that is shaped and sized to support or reinforce a pivot end of each pawl of the plurality of pawls.

8. The reel system of claim 5, wherein the knob core is snap together coupleable with the knob, and wherein when the knob core is coupled with the knob, the pawl component is sandwiched between the knob and the knob core.

9. The reel system of claim 1, wherein the plurality of teeth are formed on an inner surface of the housing.

10. A reel system comprising:

a housing having an interior;

a spool positioned within the interior of the housing;

a knob supported by the housing and operationally coupled with the spool such that rotation of the knob causes the spool to rotate within the interior of the housing;

a plurality of teeth formed on or coupled with the housing;

a pawl disc separate from the knob and the spool, the pawl disc including one or more curved pawl arms, each pawl arm extending circumferentially from the pawl disc toward a pivot end of a corresponding pawl that is engagable with the plurality of teeth to lock or secure the spool in a rotational position relative to the housing; and a knob core that is separate from the pawl disc and that is removably coupled therewith, the knob core being configured to support or reinforce the pawl disc;

wherein the pawl disc and the knob core are configured so that a distal end of each pawl extends radially outward of an outer circumference or perimeter of the knob core;

wherein each pawl arm is configured to bias the corresponding pawl into engagement with the plurality of teeth;

wherein the knob core is snap together coupleable with the knob; and wherein when the knob core is coupled with the knob, the pawl disc is sandwiched between the knob and the knob core.

11. The reel system of claim 10, wherein the knob core includes a support wall that is shaped and sized to support or reinforce a pivot end of the one or more pawls.

12. The reel system of claim 11, wherein the support wall is semi-circular and has a radius corresponding to a radius of the pivot end of the one or more pawls such that the pivot end of the pawls contacts the support wall when a sufficient load is exerted on the pawl disc.

13. The reel system of claim 10, wherein the knob core includes a pivot boss that is configured to couple with a pivot end of the one or more pawls.

14. The reel system of claim 13, wherein the pivot end of the one or more pawls includes an aperture within which the pivot boss of the knob core is inserted.

15. The reel system of claim 10, wherein the knob includes a plurality of axially extending tabs that snap together couple with a main body of the knob core.

16. The reel system of claim 15, wherein a distal end of each axially extending tab includes a lip that is shaped and sized to be positioned within a recess or pocket formed or defined on the main body of the knob core.

17. The reel system of claim 16, wherein each recess or pocket has a circumferential length that is greater than a circumferential width of each axially extending tab, which enables the knob to be rotated relative to the knob core and pawl disc.

18. The reel system of claim 10, wherein each pawl is integrally formed with one of the pawl arms, and wherein each pawl arm extends circumferentially from a central base of the pawl disc in a first direction and each pawl extends from the pawl arm in a second direction that is different than the first direction.

* * * * *